United States Patent
Hatakama et al.

(10) Patent No.: US 7,107,238 B2
(45) Date of Patent: Sep. 12, 2006

(54) METHOD AND APPARATUS FOR PROVIDING RELATIVE-EVALUATIONS OF COMMODITIES TO USER BY USING COMMODITY-COMPARISON MAP

(75) Inventors: Hiroshi Hatakama, Kawasaki (JP); Kazuo Misue, Kawasaki (JP); Isamu Watanabe, Kawasaki (JP); Hiromi Kato, Yokohama (JP); Junichi Wako, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 09/977,200

(22) Filed: Oct. 16, 2001

(65) Prior Publication Data

US 2002/0184108 A1 Dec. 5, 2002

(30) Foreign Application Priority Data

Jun. 1, 2001 (JP) ............................. 2001-166263

(51) Int. Cl.
*G06F 17/30* (2006.01)

(52) U.S. Cl. ........................... 705/27; 705/26; 283/115
(58) Field of Classification Search ................ 705/26, 705/27; 283/115
See application file for complete search history.

(56) References Cited

U.S. PATENT DOCUMENTS

| | | | | |
|---|---|---|---|---|
| 4,122,895 A | * | 10/1978 | Sitton et al. ............. | 166/252.3 |
| 6,055,513 A | * | 4/2000 | Katz et al. ................. | 705/26 |
| 6,191,799 B1 | * | 2/2001 | Purdy ........................ | 345/473 |
| 6,203,932 B1 | * | 3/2001 | Hisakatu .................... | 428/677 |
| 2005/0049941 A1 | * | 3/2005 | Kaplan ....................... | 705/27 |

FOREIGN PATENT DOCUMENTS

WO WO 02/063424 A2 * 8/2002

OTHER PUBLICATIONS

Alterman, Bill, "Are producer prices good proxies for export prices?", Monthly labor review, Oct. 1997.*
Japanese patent abstract for publication number 2000-148848, publication date May 30, 2000.
Japanese patent abstract for publication number 08030799 A, publication date Feb. 2, 1996.
"DSUI Systems: Decision Support for Internet Users" by Fujimoto et al. published on Journal of Japanese Society for Artificial Intelligence, vol. 15, No. 1 pp. 61-64.
"Do you Think Content on the Internet is Easy to Understand?" by Fujimoto et al., in Proceedings of the Tenth Annual Internet Society Conference (INET-2000).

* cited by examiner

*Primary Examiner*—Mark Fadok
(74) *Attorney, Agent, or Firm*—Staas & Halsey LLP

(57) ABSTRACT

In a method for providing information on commodities to a user by using a computer, commodity-comparison information indicating at least one result of at least one comparison between the commodities is acquired and stored. Next, a commodity-comparison map which visually indicates at least one relationship between the commodities is produced by using the commodity-comparison information stored above, in such a manner that at least one coordinate axis of the commodity-comparison map corresponds to at least one evaluation criterion used in evaluation of the commodities, respectively. Then, relative-evaluation information which indicates at least one relative evaluation of the commodities is produced by using the commodity-comparison map. Finally, the relative-evaluation information is provided to the user.

3 Claims, 43 Drawing Sheets

COMMODITY-COMPARISON INFORMATION 103

| USER ID | DATE AND TIME OF EVALUATION | EVALUATION CRITERION | NAME OF (SUPERIOR) COMMODITY | NAME OF (INFERIOR) COMMODITY | COMMENT ON (SUPERIOR) COMMODITY | COMMENT ON (INFERIOR) COMMODITY |
|---|---|---|---|---|---|---|
| 002362 | 2001.4.17 | UNDER-STANDABILITY | Biginner's JAVA | Introduction to JAVA | Through Explanation are provided. | |
| 003652 | 2001.4.18 | RICHNESS IN CONTENT | Complete Explanation of JAVA | Understandable JAVA | | |
| 001021 | 2001.4.21 | UNDER-STANDABILITY | Understandable JAVA | Introduction to JAVA | | |
| 002298 | 2001.4.23 | UNDER-STANDABILITY | Beginner's JAVA | Understandable JAVA | Many illustrations are included. | Too many technical terms are used. |
| ... | ... | ... | ... | ... | ... | ... |

COMMODITY-COMPARISON-INFORMATION STORAGE UNIT — 20d

FIG. 7

COMMODITY-COMPARISON-INPUT SCREEN
111

> Pleaes input your evaluation criterion for and commodity-comparison infromation on books relating to Java.
>
> ◎ REGARDING UNDERSTANDABILITY
>
> SELECTION OF BOOK — 111a: [Introduction to JAVA ▼]  <  SELECTION OF BOOK — 111b: [Understandable JAVA ▼]
>
> COMMENT (ON INFERIORITY) 111g: [ ]
> COMMENT (ON SUPERIORITY) 111h: [Easy to understand due to many illustrations.]
>
> ○ REGARDING RICHNESS IN CONTENT   111d
>
> SELECTION OF BOOK — 111c: [ ▼]  <  SELECTION OF BOOK: [ ▼]
>
> COMMENT (ON INFERIORITY) 111i: [ ]
> COMMENT (SUPERIORITY) 111j: [ ]
>
> ○ REGARDING OTHER EVALUATION CRITERION   OUTLINE OF EVALUATION CRITERION: [ ]
>
> SELECTION OF BOOK — 111e: [ ▼]  111f  <  SELECTION OF BOOK: [ ▼] 111m
>
> COMMENT (ON INFERIORITY) 111k: [ ]  111l  COMMENT (ON SUPERIORITY): [ ]

FIG. 14

COMMODITY-COMPARISON-INPUT SCREEN
112

With what other book or books did you compre the book you recenty purchased, when you chose to purchase the book? Please inform us about your primary interest and other book or books you compared.

◎REGARDING UNDERSTANDABILITY

SELETION OF BOOK

112a — [UNDERSTANDABLE JAVA ▼]  <  "Beginner's JAVA" (the book you recently purchased)

COMMENT (ON INFERIORITY)          COMMENT (SUPERIORITY)

112e [Too many technical terms are used.]

112f

○REGARDING RICHNESS IN CONTENT

SELETION OF BOOK

112b — [          ▼]  <  "Beginner's JAVA" (the book you recently purchased)

COMMENT (ON INFERIORITY)          COMMENT (SUPERIORITY)

| USER ID | DATE AND TIME OF EVALUATION | EVALUATION CRITERION | NAME OF (SUPERIOR) COMMODITY | NAME OF (INFERIOR) COMMODITY |
|---|---|---|---|---|
| 0001 | 2001.04.04 | RICHNESS IN CONTENT | BOOK A | BOOK B |
| 0002 | 2001.04.04 | RICHNESS IN CONTENT | BOOK A | BOOK B |
| 0003 | 2001.04.04 | RICHNESS IN CONTENT | BOOK D | BOOK B |
| 0004 | 2001.04.04 | UNDERSTAND-ABILITY | BOOK B | BOOK C |
| 0005 | 2001.04.04 | RICHNESS IN CONTENT | BOOK D | BOOK C |
| 0006 | 2001.04.04 | RICHNESS IN CONTENT | BOOK A | BOOK D |
| 0007 | 2001.04.04 | RICHNESS IN CONTENT | BOOK A | BOOK D |
| 0008 | 2001.04.04 | RICHNESS IN CONTENT | BOOK A | BOOK D |
| 0009 | 2001.04.04 | UNDERSTAND-ABILITY | BOOK B | BOOK D |
| 0010 | 2001.04.04 | UNDERSTAND-ABILITY | BOOK B | BOOK D |
| 0011 | 2001.04.04 | RICHNESS IN CONTENT | BOOK G | BOOK D |
| 0012 | 2001.04.04 | UNDERSTAND-ABILITY | BOOK C | BOOK E |
| 0013 | 2001.04.04 | UNDERSTAND-ABILITY | BOOK D | BOOK E |
| 0014 | 2001.04.04 | RICHNESS IN CONTENT | BOOK F | BOOK E |
| 0015 | 2001.04.04 | UNDERSTAND-ABILITY | BOOK D | BOOK F |
| 0016 | 2001.04.04 | RICHNESS IN CONTENT | BOOK G | BOOK F |
| 0017 | 2001.04.04 | RICHNESS IN CONTENT | BOOK G | BOOK F |
| 0018 | 2001.04.04 | RICHNESS IN CONTENT | BOOK G | BOOK F |
| 0019 | 2001.04.04 | RICHNESS IN CONTENT | BOOK H | BOOK F |
| 0020 | 2001.04.04 | RICHNESS IN CONTENT | BOOK H | BOOK F |
| 0021 | 2001.04.04 | UNDERSTAND-ABILITY | BOOK A | BOOK G |
| 0022 | 2001.04.04 | RICHNESS IN CONTENT | BOOK H | BOOK G |
| 0023 | 2001.04.04 | UNDERSTAND-ABILITY | BOOK F | BOOK H |
| 0024 | 2001.04.04 | UNDERSTAND-ABILITY | BOOK G | BOOK H |
| 0025 | 2001.04.04 | UNDERSTAND-ABILITY | BOOK B | BOOK A |

FIG.26

[COMMENTS]

COMMENTS ON BOOK A

·<u>Advanced</u> <u>explanations</u> are provided.

·<u>Profound</u> explanations are provided.

·There is no such an <u>advanced</u> book as this book.

·<u>Explanations</u> are <u>profound</u>.

COMMENTS ON BOOK B

·<u>Color printing</u> gives a good impression.

·This book is <u>easy to view</u> due to appropriate <u>arrangements</u>.

COMMENTS ON BOOK D

·<u>Illustrations</u> are <u>easy to see</u>.

·This book is good due to ample <u>explanation</u>.

·<u>Explanations</u> are comprehensive.

FIG. 27

601 SELECTED-CRITERIA STATISTICS DISPLAY SCREEN

Aggregate statistics of evaluation criteria selected by users for the "books relating to Java" are obtained as follows. Please select at least one axis of a map in which the "books relating to Java" are displayed.

◎ UNEDERATNDABILITY · · · 168 USERS (48%)

◉ RICHNESS IN CONTENT · · · 84 UESRS (24 %)

○ EASE OF VIEW DUE TO STYLE · · · 42 USERS (12%)

○ SUITABILITY FOR C USERS · · · 21 USERS (6%)

FIG. 29

METHOD AND APPARATUS FOR PROVIDING RELATIVE-EVALUATIONS OF COMMODITIES TO USER BY USING COMMODITY-COMPARISON MAP

1. BACKGROUND OF THE INVENTION

1.1 Field of the Invention

The present invention relates to a method and an apparatus for providing information on commodities (i.e., commodity information) to a user by using a computer. The present invention also relates to a method and an apparatus for utilizing commodity information provided to a purchaser by using a computer.

1.2 Description of the Related Art

Conventionally, when a purchaser wishes to buy a commodity, the purchaser obtains information on the commodity from newspaper, magazines, television commercials, or the like. In addition, due to the recent development in telecommunications technologies such as the Internet technologies, it has become possible to obtain commodity information from homepages on the Internet. Generally, the commodity information is provided to consumers in various manners. For example, information items on individual commodities may be separately provided to a purchaser, or information on comparisons between a plurality of commodities may be provided to a purchaser.

For example, information items on individual commodities are separately provided to a purchaser with advertising leaflets, television commercials, advertisement banners indicated on homepages, and the like. Information items on individual commodities can also be separately provided to a purchaser by information delivery services, which collect evaluations of the individual commodities from consumers through the Internet, and deliver information on the collected evaluations to the consumers. Commodity rating services provided on commodity transaction sites on the Internet are examples of the information delivery services. Since the commodity information provided as above is produced based on the information collected from the consumers, purchasers can obtain impartial information on evaluations of commodities. In addition, some services collect information on commodities which have been sold, and deliver to purchasers information on recommendation of a commodity which have been sold most. K. Fujimoto et al. ("DSIU Systems: Decision Support for Internet Users," Journal of Japanese Society for Artificial Intelligence, Vol. 15, No. 1, pp. 61–64, January 2000) proposes, as a new attempt to provide commodity information, an arrangement for collecting information on commodities through a network and making an inference from the collected information.

On the other hand, information on comparisons between a plurality of commodities are provided to consumers with magazine articles, television programs, and the like. That is, the consumers can obtain from the magazine articles and the television programs information on the comparison between the specific commodity and other commodities, for example, superiority or inferiority of the specific commodity to other commodities. Japanese Unexamined Patent Publication, No. 2000-148848 discloses commodity comparison and sales supporting system. The system processes commodity information in such a manner that comparisons between commodities become easy. However, when the conventional methods of providing commodity information are used, it is difficult for consumers to obtain information on relative evaluations of the commodities, and it is particularly difficult when the relative evaluations of the commodities are requested to be made based on at least one specific evaluation criterion.

When information items on individual commodities are separately provided, the purchasers have to make sorting, analysis, and comparison of the collected information by themselves. Generally, the amount of commodity information provided through the Internet is great. Therefore, it is not easy to appropriately collect the commodity information, and make appropriate analysis and comparison of the collected commodity information. In addition, usually, information provided by an advertisement of a commodity emphasizes only the merits of the commodity, and does not mention the demerits of the commodity. Further, the information items on the individual commodities are displayed in various manners. Thus, it is very difficult to appropriately derive the relative evaluations of the commodities from the information items on the individual commodities which are provided separately.

In addition, although the inference from the collected information can be made for evaluating features of commodities as proposed in the K. Fujimoto reference, the inference cannot be made based on a specific evaluation criterion. For example, the technique proposed in the K. Fujimoto reference cannot answer the question what is a commodity useful for a specific purpose.

Further, even in the case where information on comparisons between a plurality of commodities is provided, the information is produced by predetermined experts and the like. Therefore, only limited types of information can be provided, and the time and cost necessary for the production of the information are great. Often, a price for the information is charged to each purchaser who receives the information. In addition, although the impartial, overall evaluations of commodities can be obtained when the aforementioned commodity rating services are used, purchasers are not informed of what evaluation criterion is used for the evaluation. Generally, each purchaser requires relative evaluations made based on an evaluation criterion which the purchaser prefers. However, in this case, such a requirement is not satisfied. Even in the system disclosed in JPP. No. 2000-148848, relative evaluations of commodities are not obtained by the processing of commodity information.

2. SUMMARY OF THE INVENTION

An object of the present invention is to provide a method for providing commodity information to a user by using a computer so that the user can easily obtain information on relative evaluations of commodities.

Another object of the present invention is to provide an apparatus for providing commodity information to a user by using a computer so that the user can easily obtain information on relative evaluations of commodities.

Still another object of the present invention is to provide a method for utilizing commodity information by using a computer so that the user can easily acquire information on relative evaluations of commodities.

A further object of the present invention is to provide an apparatus for utilizing commodity information by using a computer so that the user can easily acquire information on relative evaluations of commodities.

(1) According to the first aspect of the present invention, there is provided a method for providing information on commodities to a user by using a computer, comprising the steps of: (a) acquiring commodity-comparison information indicating at least one result of at least one comparison between the commodities; (b) storing the commodity-comparison information acquired in step (a); (c) producing a commodity-comparison map which visually indicates at least one relationship between the commodities by using the commodity-comparison information stored in step (b) in such a manner that at least one coordinate axis of the commodity-comparison map corresponds to at least one evaluation criterion used in evaluation of the commodities, respectively; (d) producing relative-evaluation information which indicates at least one relative evaluation of the commodities by using the commodity-comparison map; and (e) providing the relative-evaluation information to the user.

In the first aspect of the present invention, commodity-comparison information which indicates at least one result of at least one comparison between commodities is acquired and stored. By using the stored commodity-comparison information, a commodity-comparison map is produced, where the commodity-comparison map visually indicates at least one relationship between commodities in such a manner that at least one coordinate axis of the commodity-comparison map corresponds to at least one evaluation criterion used in evaluation of the commodities, respectively. Then, by using the commodity-comparison map, relative-evaluation information indicating at least one relative evaluation of the commodities is produced and provided to the user. Therefore, the user can easily obtain the information on the at least one relative evaluation of the commodities by viewing the relative-evaluation information.

(2) According to the second aspect of the present invention, there is provided a method for providing information on commodities to a user by using a computer, comprising the steps of: (a) acquiring commodity-comparison information indicating at least one result of at least one comparison between the commodities, from at least one first terminal through a communication means, where the commodity-comparison information is input into the at least one first terminal; (b) storing in a storage device the commodity-comparison information acquired in step (a); (c) producing a commodity-comparison map which visually indicates at least one relationship between the commodities by using the commodity-comparison information stored in the storage device in such a manner that at least one coordinate axis of the commodity-comparison map corresponds to at least one first evaluation criterion used in evaluation of the commodities, respectively; (d) producing relative-evaluation information which indicates at least one relative evaluation of the commodities by using the commodity-comparison map; and (e) transmitting the relative-evaluation information to one of at least one second terminal through a communication means.

The method according to the second aspect of the present invention may also have one or any possible combination of the following additional features (i) to (vii).

(i) The relative-evaluation information may be arranged for display of the commodity-comparison map on the one of the at least one second terminal.

(ii) The method according to the second aspect of the present invention may further comprise the step of acquiring possessed-commodity information which indicates at least one first commodity possessed by the user. In this case, the commodity-comparison map is produced in step (c) in such a manner that the commodity-comparison map visually indicates information on at least one feature in which at least one second commodity is superior to one of the at least one first commodity, at least one relationship between the one of the at least one first commodity and the at least one second commodity is indicated by locations of the one of the at least one first commodity and the at least one second commodity in the commodity-comparison map, and the at least one feature respectively corresponds to the at least one coordinate axis of the commodity-comparison map.

(iii) In addition to the additional feature (ii), the relative-evaluation information may be arranged for display of information on the at least one second commodity and the at least one feature on the one of the at least one second terminal.

(iv) The method according to the second aspect of the present invention may further comprise the step of acquiring evaluation-criterion-selection information which indicates at least one second evaluation criterion, from the one of the at least one second terminal through a communication means. In this case, the evaluation-criterion-selection information is input from the one of the at least one second terminal, and the commodity-comparison map is produced in step (c) in such a manner that the at least one second evaluation criterion corresponds to the at least one coordinate axis of the commodity-comparison map, respectively.

(v) The method according to the second aspect of the present invention may further comprise the steps of: (h) acquiring evaluation-criterion-selection information which indicates at least one second evaluation criterion, from the at least one second terminal through a communication means; (i) storing in a storage device the evaluation-criterion-selection information acquired in the step (h); (j) obtaining aggregate statistics of the evaluation-criterion-selection information stored in the step (h); and (k) transmitting the aggregate statistics to the one of the at least one second terminal through a communication means.

(vi) The relative-evaluation information may include the commodity-comparison map and information on sales amounts of the commodities indicated in the commodity-comparison map.

(vii) The step (c) may comprise the substeps of: (c1) defining at least one virtual force acting on at least one edge each of which has a direction indicating at least one relationship between the commodities, so as to control the direction of the at least one edge; (c2) generating a virtual physical model representing the commodities and the at least one relative evaluation of the commodities and having the virtual force incorporated therein; and (c3) producing the commodity-comparison map by obtaining a stable state of the virtual physical model.

(3) According to the third aspect of the present invention, there is provided an apparatus for providing information on commodities to a user, comprising: a comparison-information acquisition unit which acquires commodity-comparison information indicating at least one result of at least one comparison between the commodities, from at least one first terminal through a communication means, where the commodity-comparison information is input into the at least one first terminal; a storage unit which stores the commodity-comparison information acquired by the comparison-information acquisition unit; a commodity-comparison-map production unit which produces a commodity-comparison map which visually indicates at least one relationship between the commodities by using the commodity-comparison information stored in the storage unit in such a manner that at least one coordinate axis of the commodity-comparison map corresponds to at least one evaluation criterion used in evaluation of the commodities, respectively; a relative-evaluation-information production unit which produces relative-evaluation information which indicates at least one relative evaluation of the commodities by using the commodity-comparison map; and a transmission unit which transmits the relative-evaluation information to one of at least one second terminal through a communication means.

(4) According to the fourth aspect of the present invention, there is provided a method for utilizing information on commodities, which is provided to a user by using a computer, comprising the steps of: (a) acquiring, by a terminal, relative-evaluation information through a communication means; and (b) displaying the relative-evaluation information on the terminal. The relative-evaluation information indicates at least one relative evaluation of the commodities by using a commodity-comparison map which visually indicates at least one relationship between the commodities in such a manner that at least one coordinate axis of the commodity-comparison map corresponds to at least one evaluation criterion used in evaluation of the commodities, respectively.

(5) According to the fifth aspect of the present invention, there is provided a terminal for utilizing information on commodities, which is provided to a user by using a computer, comprising: a relative-evaluation-information acquisition unit which acquires relative-evaluation information through a communication means, where the relative-evaluation information indicates at least one relative evaluation of the commodities by using a commodity-comparison map which visually indicates at least one relationship between the commodities in such a manner that at least one coordinate axis of the commodity-comparison map corresponds to at least one evaluation criterion used in evaluation of the commodities, respectively; and a display unit which displays the relative-evaluation information.

(6) According to the sixth aspect of the present invention, there is provided a system for providing information on commodities to a user, comprising: at least one first terminal; a commodity-information provision apparatus; and at least one second terminal. Each of the at least one first terminal includes a comparison-information reception unit which receives commodity-comparison information indicating at least one result of at least one comparison between the commodities, and a comparison-information transmission unit which transmits the commodity-comparison information to the commodity-information provision apparatus through a first communication means. The commodity-information provision apparatus includes a comparison-information acquisition unit which acquires the commodity-comparison information from the at least one first terminal through the first communication means, a storage unit which stores the commodity-comparison information acquired by the comparison-information acquisition unit, a commodity-comparison-map production unit which produces a commodity-comparison map which visually indicates at least one relationship between the commodities by using the commodity-comparison information stored in the storage unit in such a manner that at least one coordinate axis of the commodity-comparison map corresponds to at least one evaluation criterion used in evaluation of the commodities, respectively, a relative-evaluation-information production unit which produces relative-evaluation information which indicates at least one relative evaluation of the commodities by using the commodity-comparison map, and a relative-evaluation-information transmission unit which transmits the relative-evaluation information to one of the at least one second terminal through a second communication means. Each of the at least one second terminal includes a relative-evaluation-information acquisition unit which acquires the relative-evaluation information from the commodity-information provision apparatus through the second communication means, and a display unit which displays the relative-evaluation information.

(7) According to the seventh aspect of the present invention, there is provided a computer-readable storage medium storing a program which makes a computer execute a method for providing information on commodities to a user, the method comprising the steps of: (a) acquiring commodity-comparison information indicating at least one result of at least one comparison between the commodities, from at least one first terminal through a communication means, where the commodity-comparison information is input into the at least one first terminal; (b) storing in a storage device the commodity-comparison information acquired in step (a); (c) producing a commodity-comparison map which visually indicates at least one relationship between the commodities by using the commodity-comparison information stored in the storage device in such a manner that at least one coordinate axis of the commodity-comparison map corresponds to at least one first evaluation criterion used in evaluation of the commodities, respectively; (d) producing relative-evaluation information which indicates at least one relative evaluation of the commodities by using the commodity-comparison map; and (e) transmitting the relative-evaluation information to one of at least one second terminal through a communication means.

The computer-readable storage medium according to the seventh aspect of the present invention may also have one or any possible combination of the aforementioned additional features (i) to (vii).

(8) As described above, according to the second to seventh aspects of the present invention, commodity-comparison information which is input from the at least one first terminal and indicates results of comparisons between commodities is acquired (by the commodity-information provision apparatus) through a communication means, and stored in the storage unit. By using the commodity-comparison information stored in the storage unit, a commodity-comparison map is produced (by the commodity-information provision apparatus), where the commodity-comparison map visually indicates at least one relationship between commodities in such a manner that at least one coordinate axis of the commodity-comparison map corresponds to at least one evaluation criterion used in evaluation of the commodities, respectively. Then, by using the commodity-comparison map, relative-evaluation information indicating at least one relative evaluation of the commodities is produced (by the commodity-information provision apparatus), and transmitted to one of the at least one second terminal through a communication means. Therefore, the user can easily obtain the information on the at least one relative evaluation of the commodities by viewing the relative-evaluation information (supplied from the commodity-information provision apparatus), on the one of the at least one second terminal.

(9) According to the eighth aspect of the present invention, there is provided a method for providing information on commodities to a user by using a computer, comprising the steps of: (a) acquiring commodity-comment information indicating at least one comment the commodities, from at least one first terminal through a communication means, where the commodity-comment information is input into the at least one first terminal; (b) storing in a storage device the commodity-comment information acquired in step (a); (c)

acquiring from a second terminal through a communication means commodity-selection information indicating at least one of the commodities, where the at least one of the commodities is input into the second terminal; (d) extracting from the storage device a portion of the commodity-comment information corresponding to the at least one of the commodities; (e) producing a keyword map visually indicating the portion of the commodity-comment information and the at least one of the commodities; and (f) transmitting information arranged for display of the keyword map on the second terminal, to the second terminal through a communication means.

(10) According to the ninth aspect of the present invention, there is provided a commodity-information provision apparatus for providing information on commodities to a user, comprising: a commodity-comment-information acquisition unit which acquires commodity-comment information indicating at least one comment the commodities, from at least one first terminal through a communication means, where the commodity-comment information is input into the at least one first terminal; a storage unit which stores in a storage device the commodity-comment information acquired by the commodity-comment-information acquisition unit; a commodity-selection information acquisition unit which acquires from a second terminal through a communication means commodity-selection information indicating at least one of the commodities, where the at least one of the commodities is input into the second terminal; a selected-information extraction unit which extracts from the storage device a portion of the commodity-comment information corresponding to the at least one of the commodities; a keyword-map production unit which producing a keyword map visually indicating the portion of the commodity-comment information and the at least one of the commodities; and a transmission unit which transmits information arranged for display of the keyword map on the second terminal, to the second terminal through a communication means.

(11) According to the tenth aspect of the present invention, there is provided a computer-readable storage medium storing a program which makes a computer execute a method for providing information on commodities to a user, the method comprising the steps of: (a) acquiring commodity-comment information indicating at least one comment the commodities, from at least one first terminal through a communication means, where the commodity-comment information is input into the at least one first terminal; (b) storing in a storage device the commodity-comment information acquired in step (a); (c) acquiring from a second terminal through a communication means commodity-selection information indicating at least one of the commodities, where the at least one of the commodities is input into the second terminal; (c) extracting from the storage device a portion of the commodity-comment information corresponding to the at least one of the commodities; (d) producing a keyword map visually indicating the portion of the commodity-comment information and the at least one of the commodities; and (e) transmitting information arranged for display of the keyword map on the second terminal, to the second terminal through a communication means.

The above and other objects, features and advantages of the present invention will become apparent from the following description when taken in conjunction with the accompanying drawings which illustrate preferred embodiment of the present invention by way of example.

3. BRIEF DESCRIPTION OF THE DRAWINGS

In the drawings:

FIG. 5 is a diagram illustrating an example of a data structure of the personal information 101 stored in the personal-information storage unit 20a;

FIG. 7 is a diagram illustrating an example of a data structure of the commodity-comparison information 103 stored in the commodity-comparison-information storage unit 20d;

Figure 16:
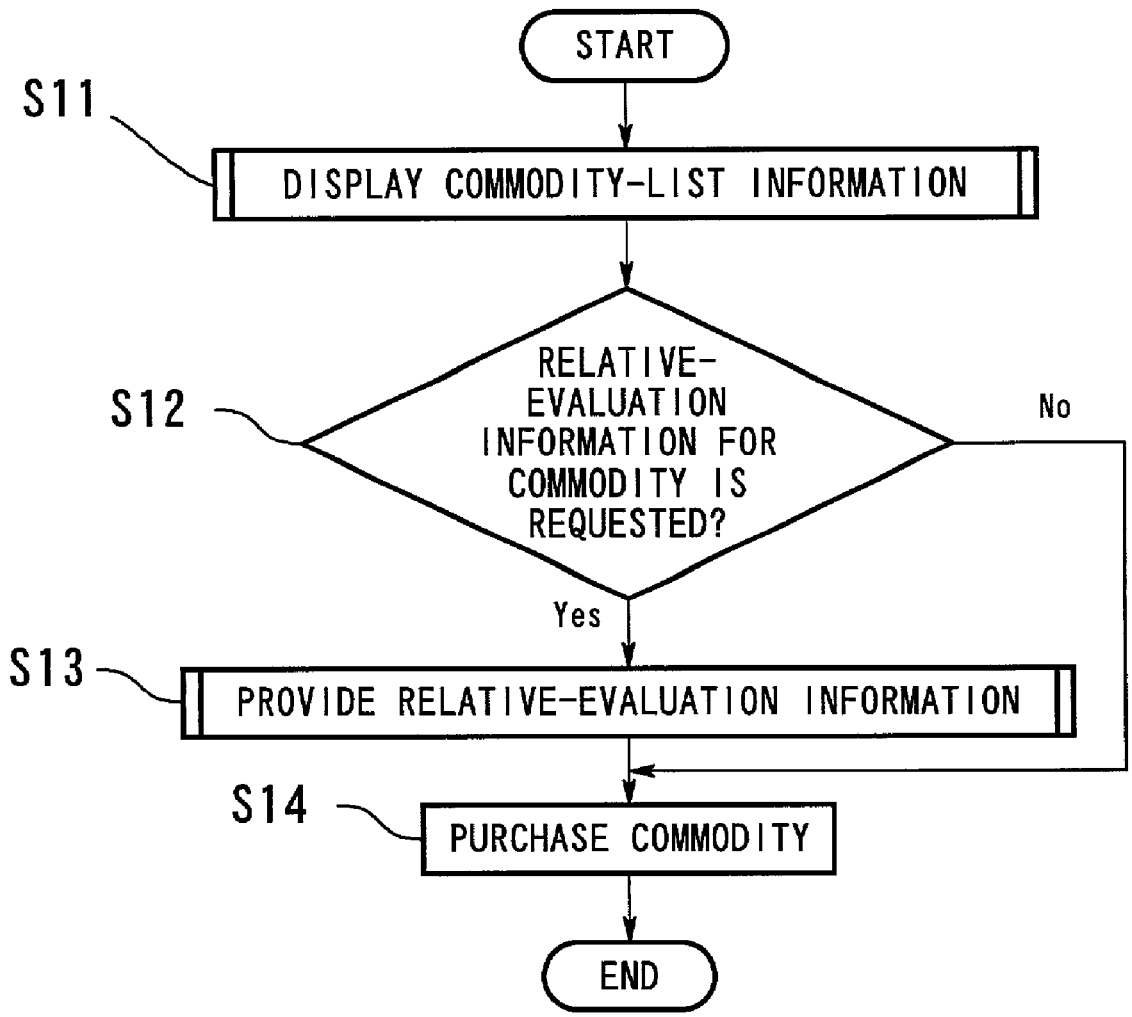
Figure 17:
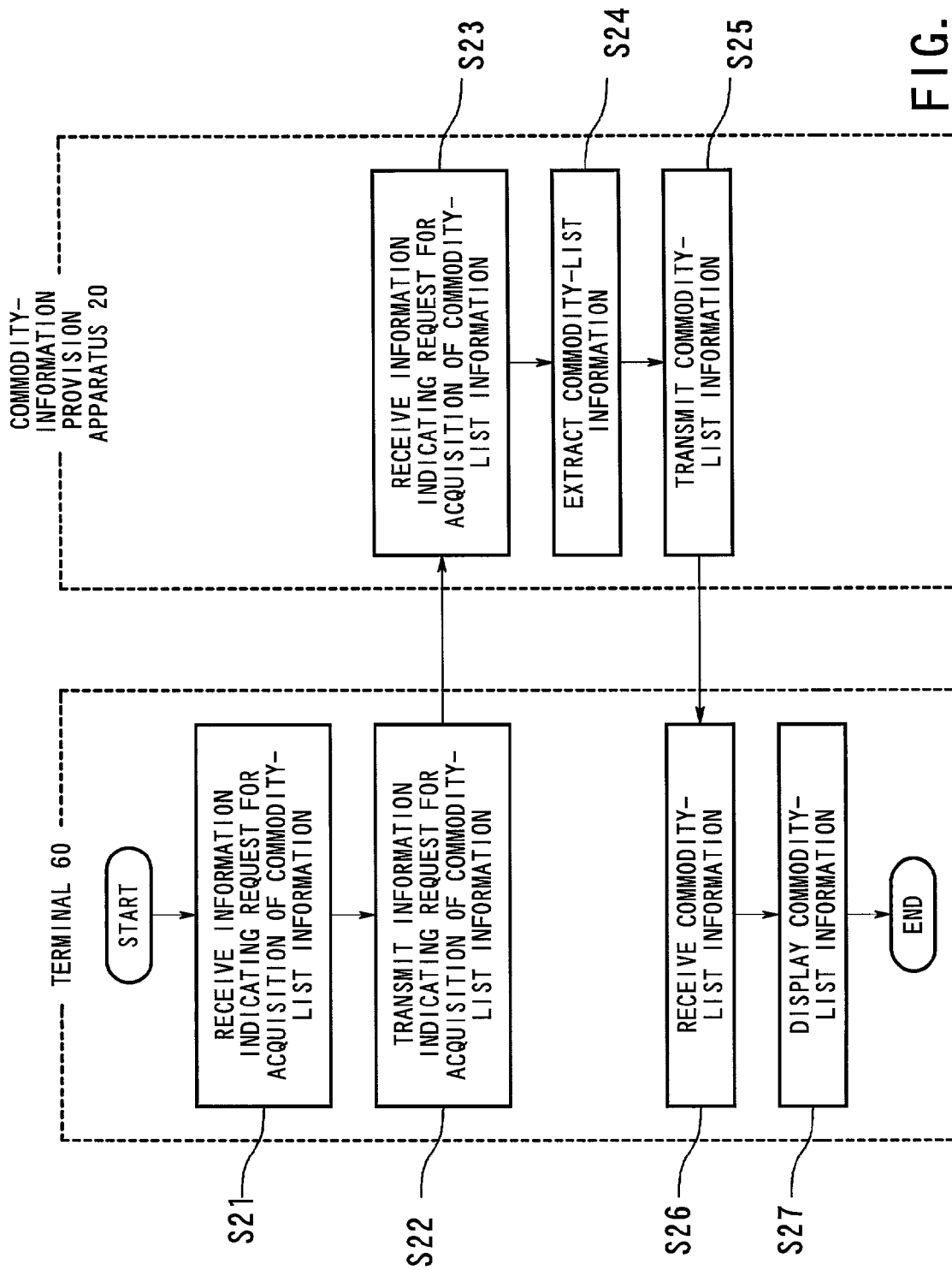
Figure 18:
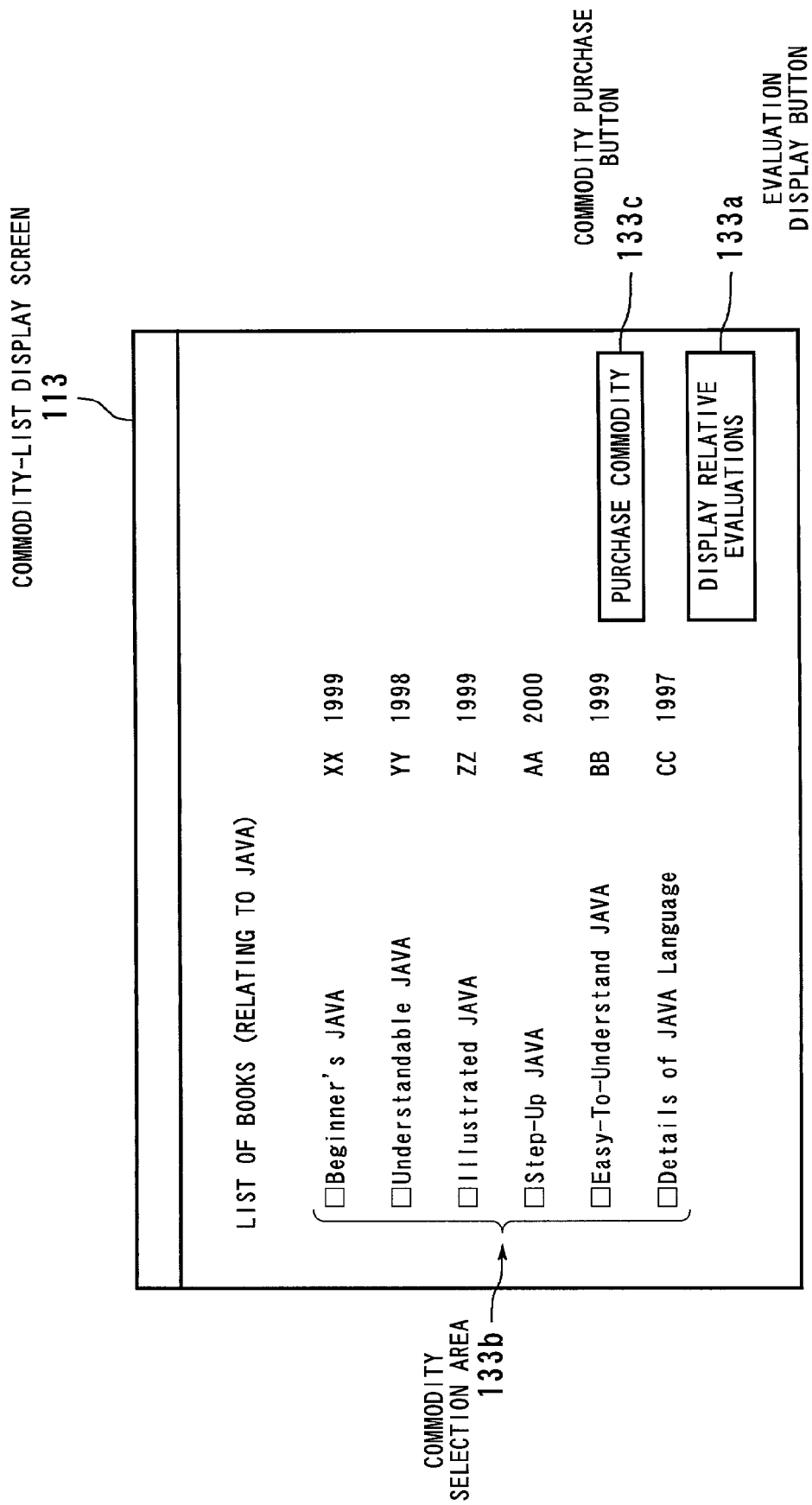
Figure 19:
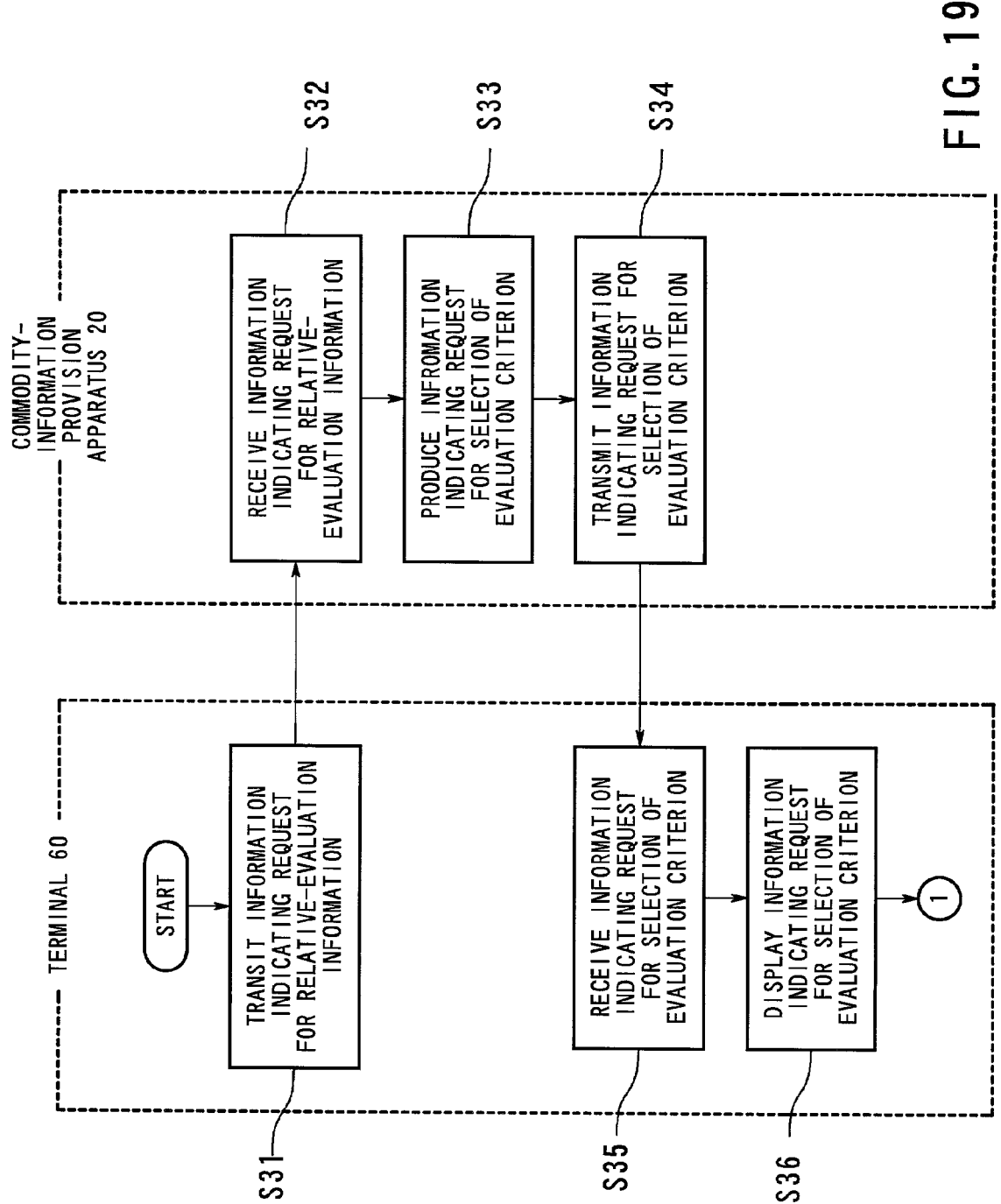
Figure 20:
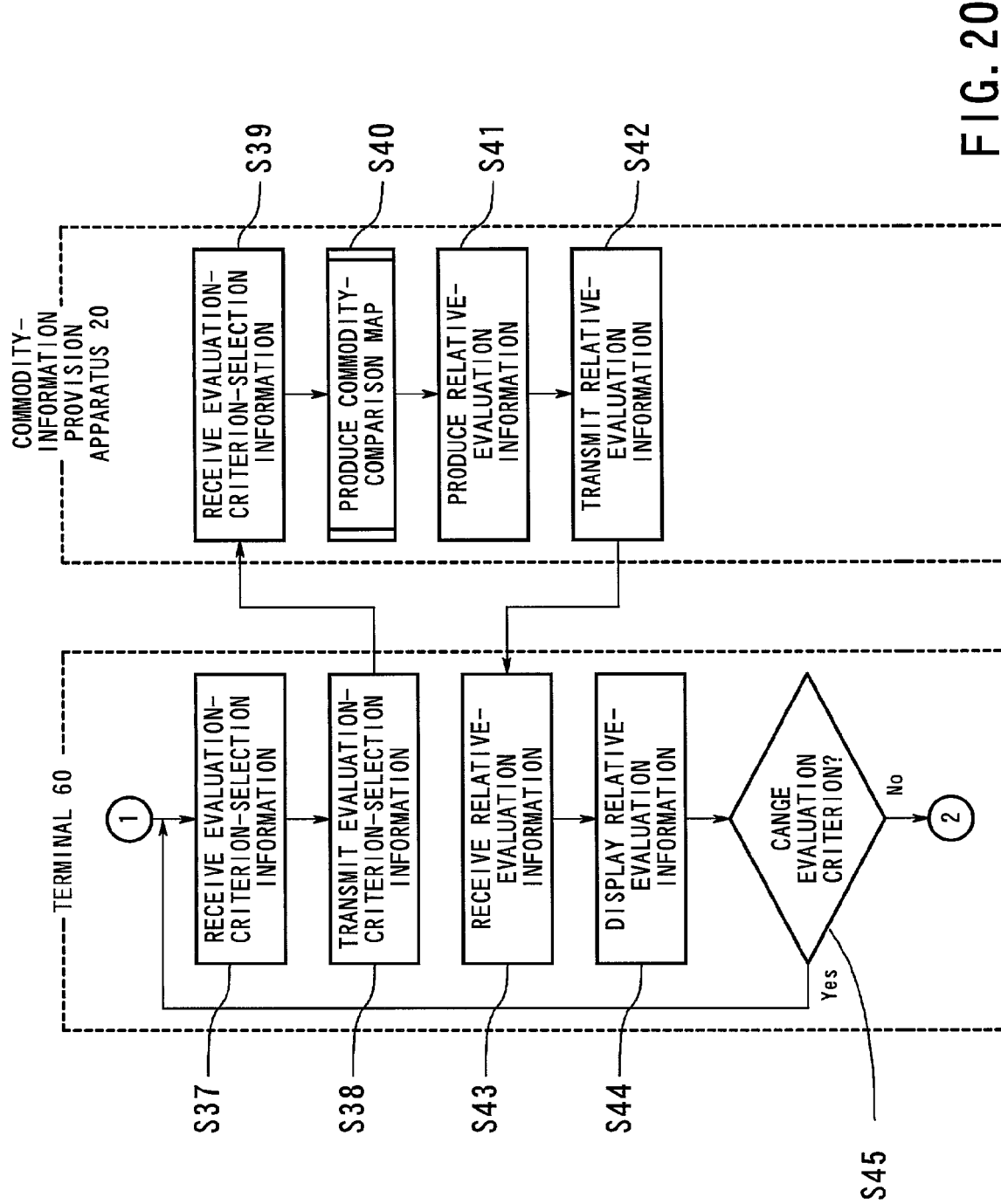
Figure 21:
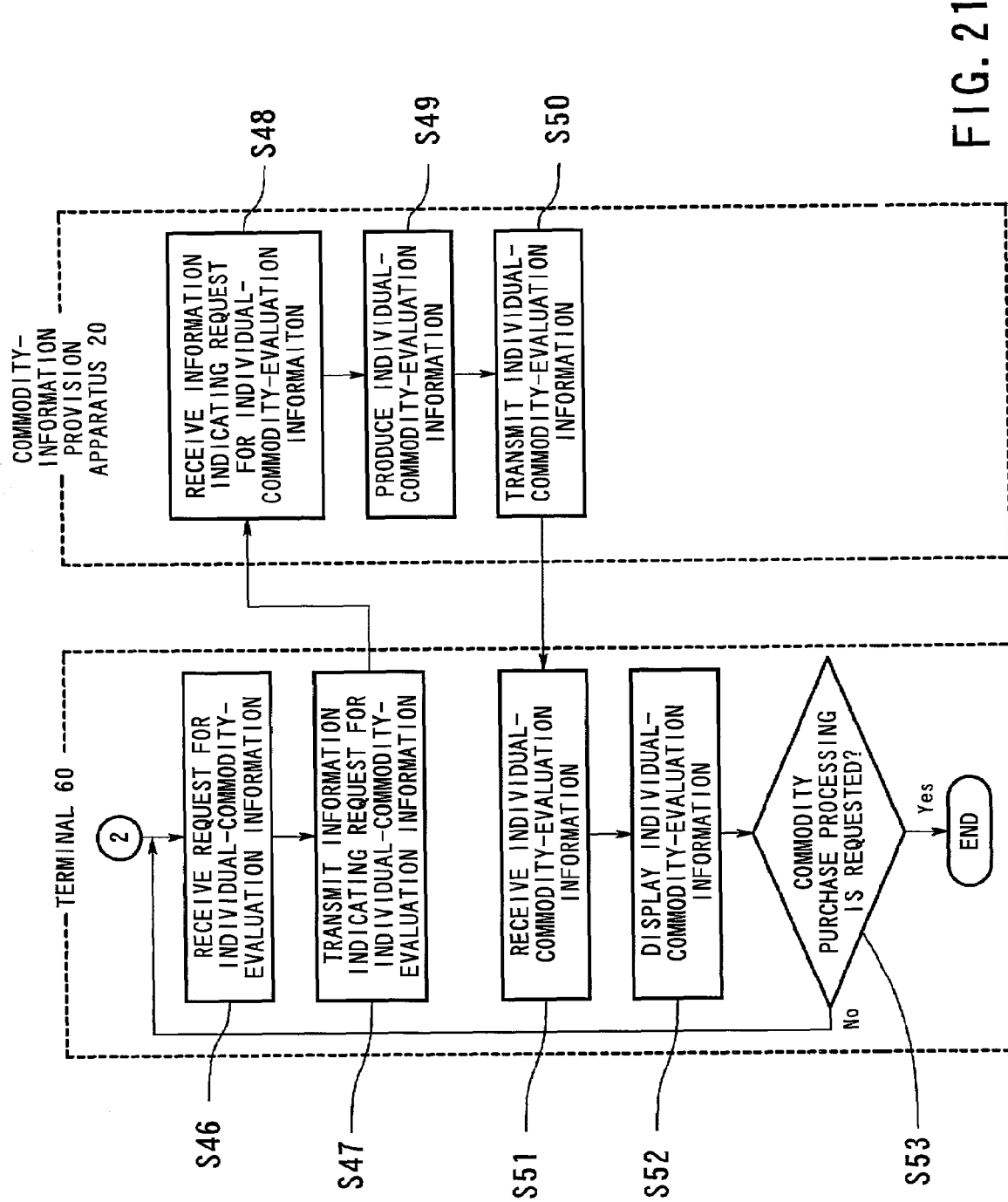
Figure 22:
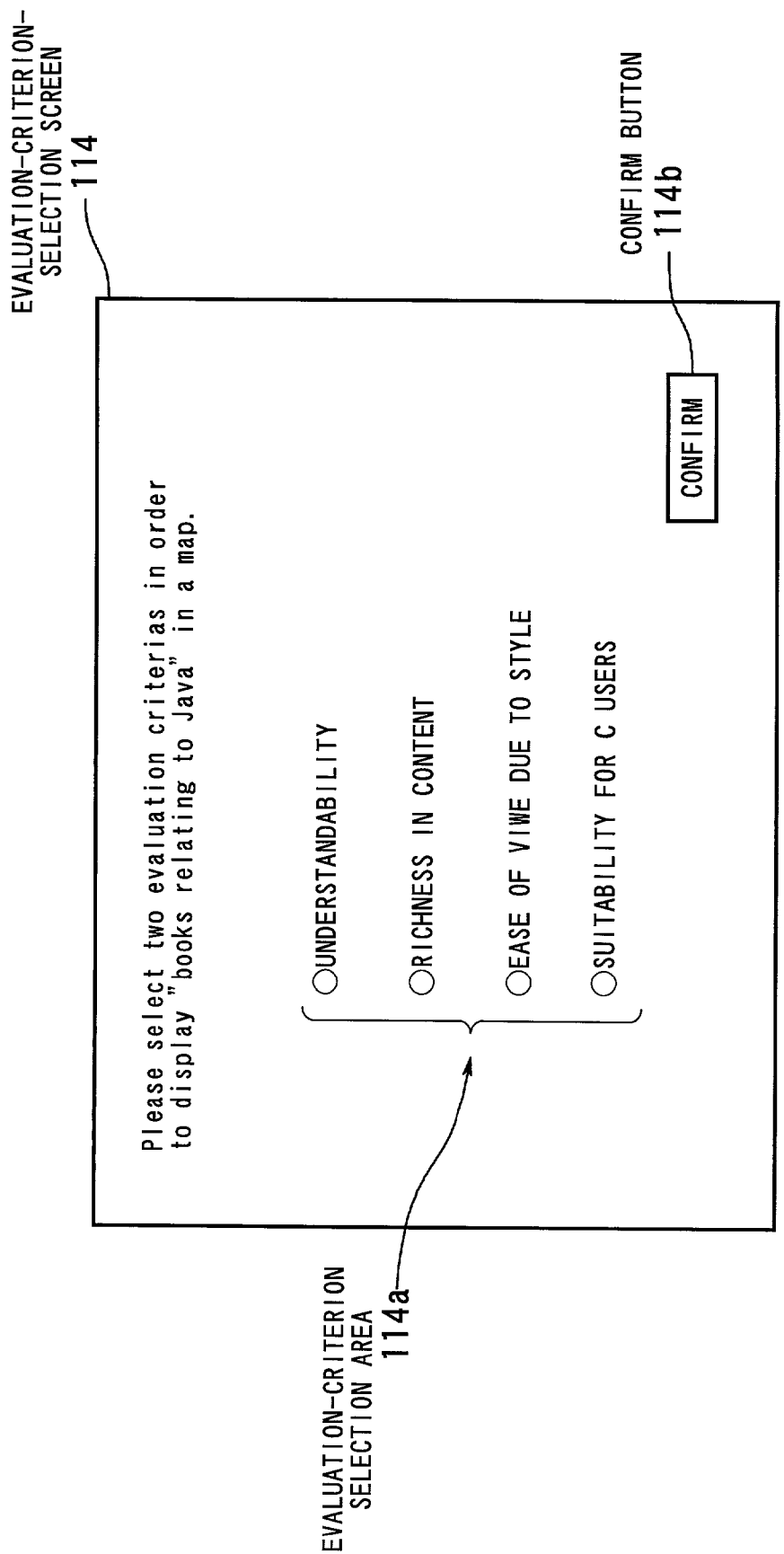
Figure 23:
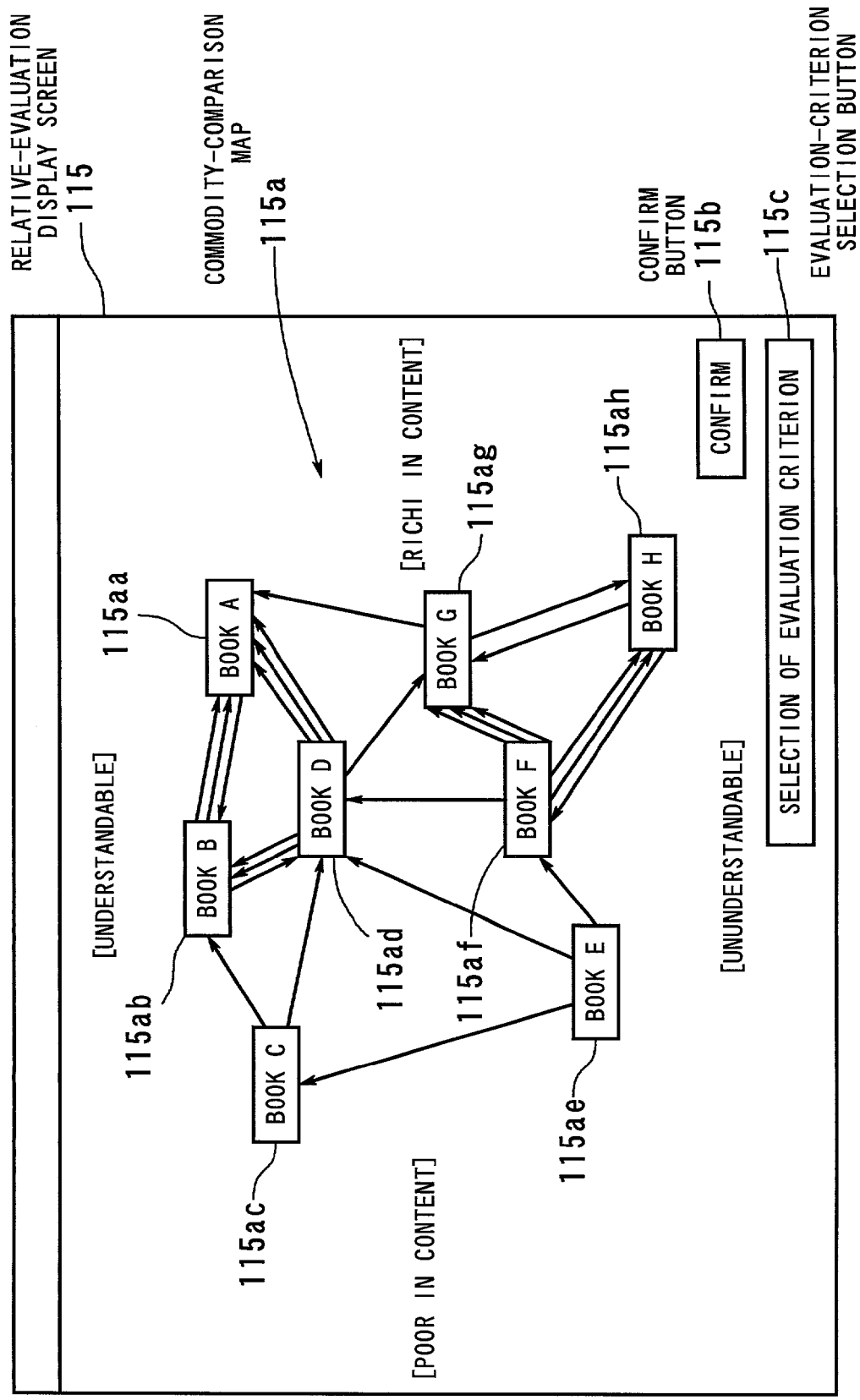
Figure 24:
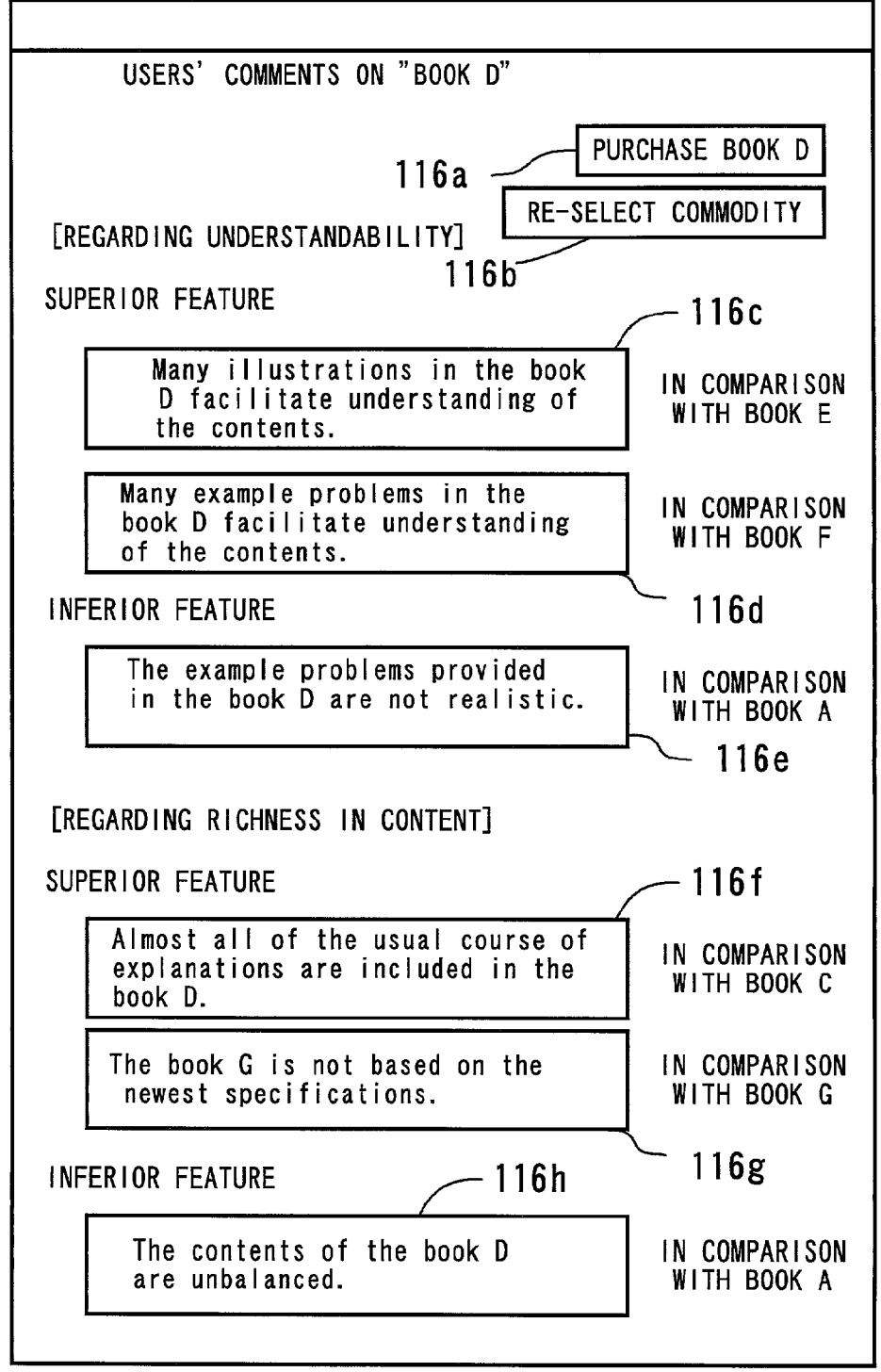
Figure 25:
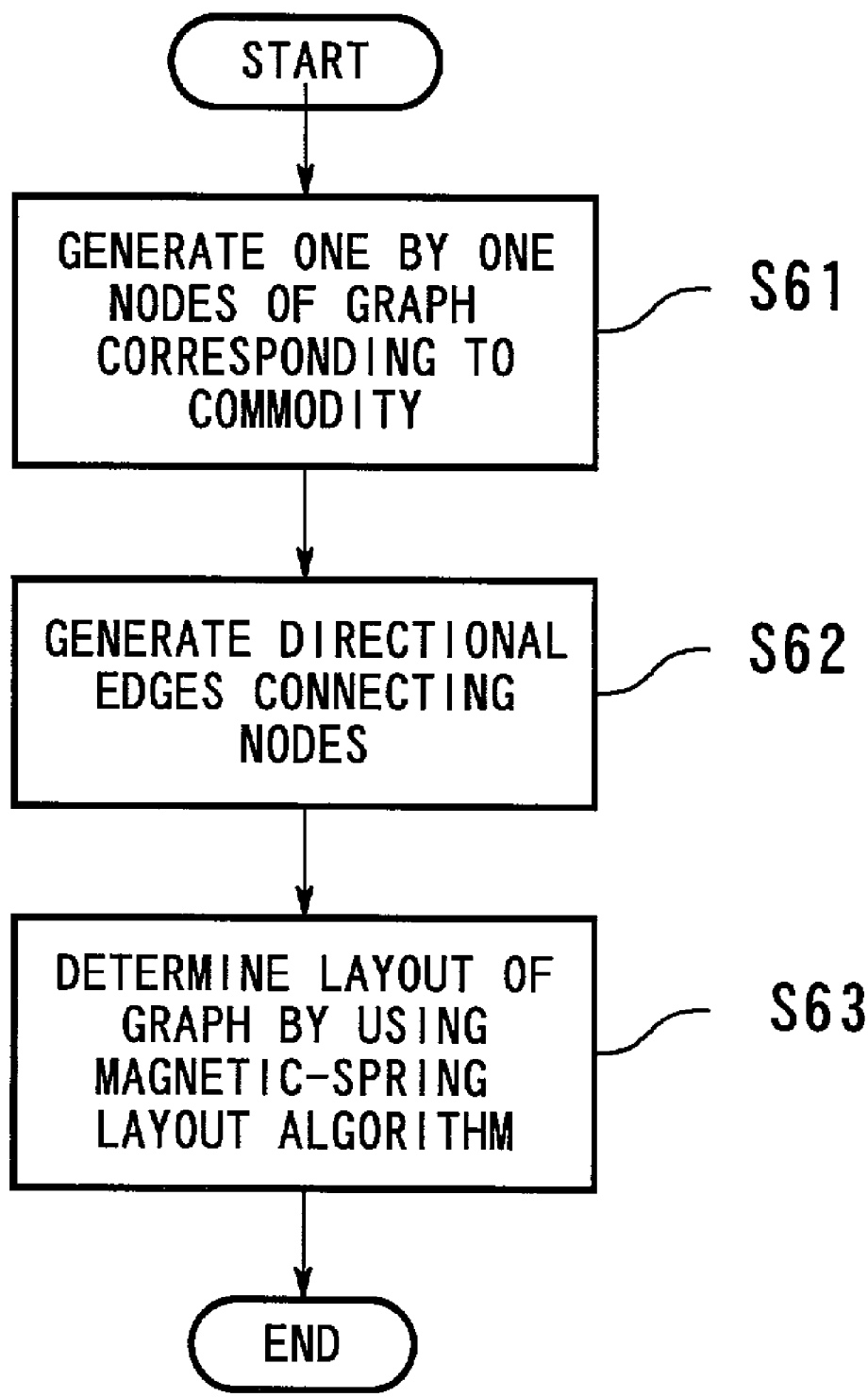
Figure 28:
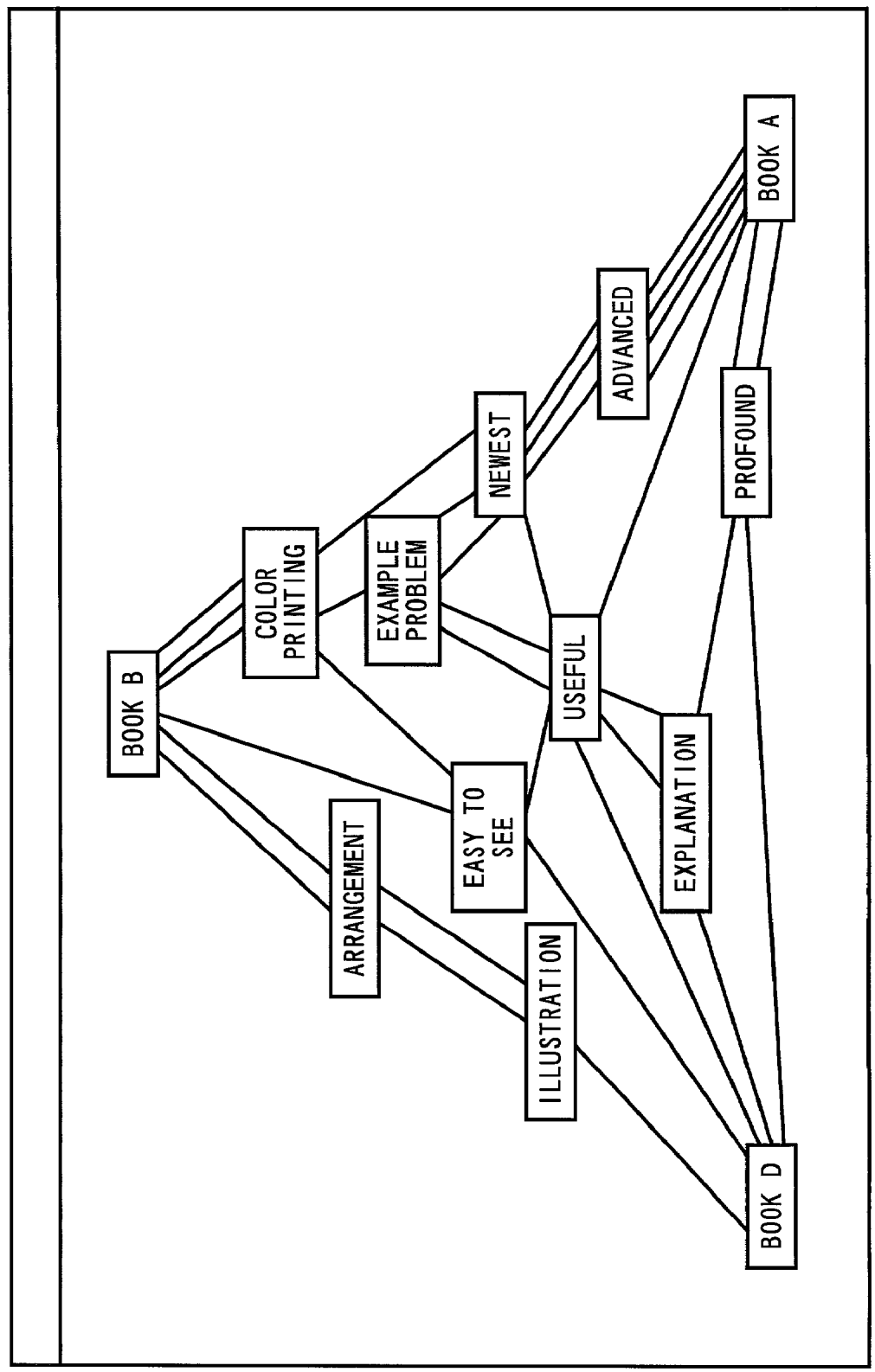
Figure 30:
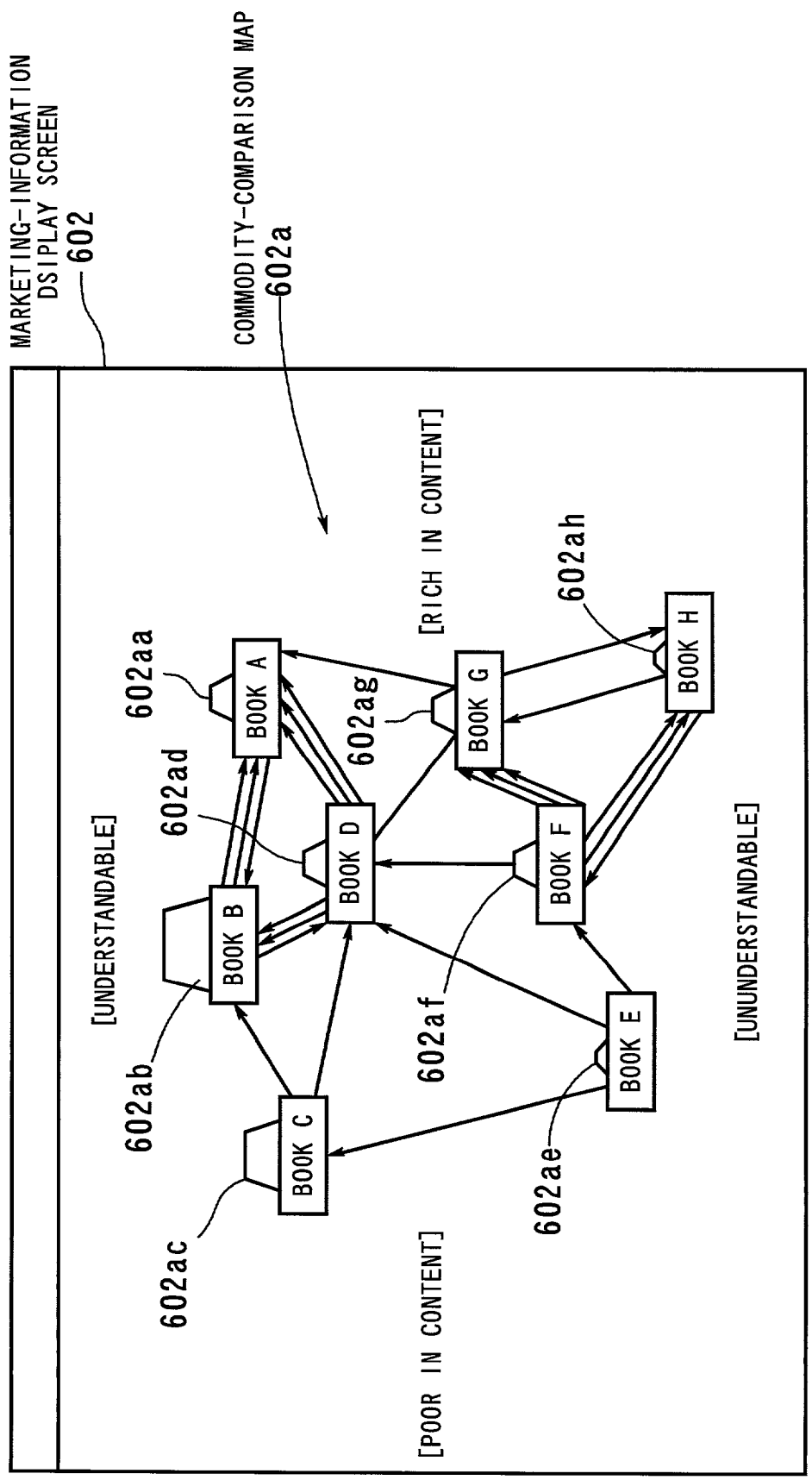
Figure 31:
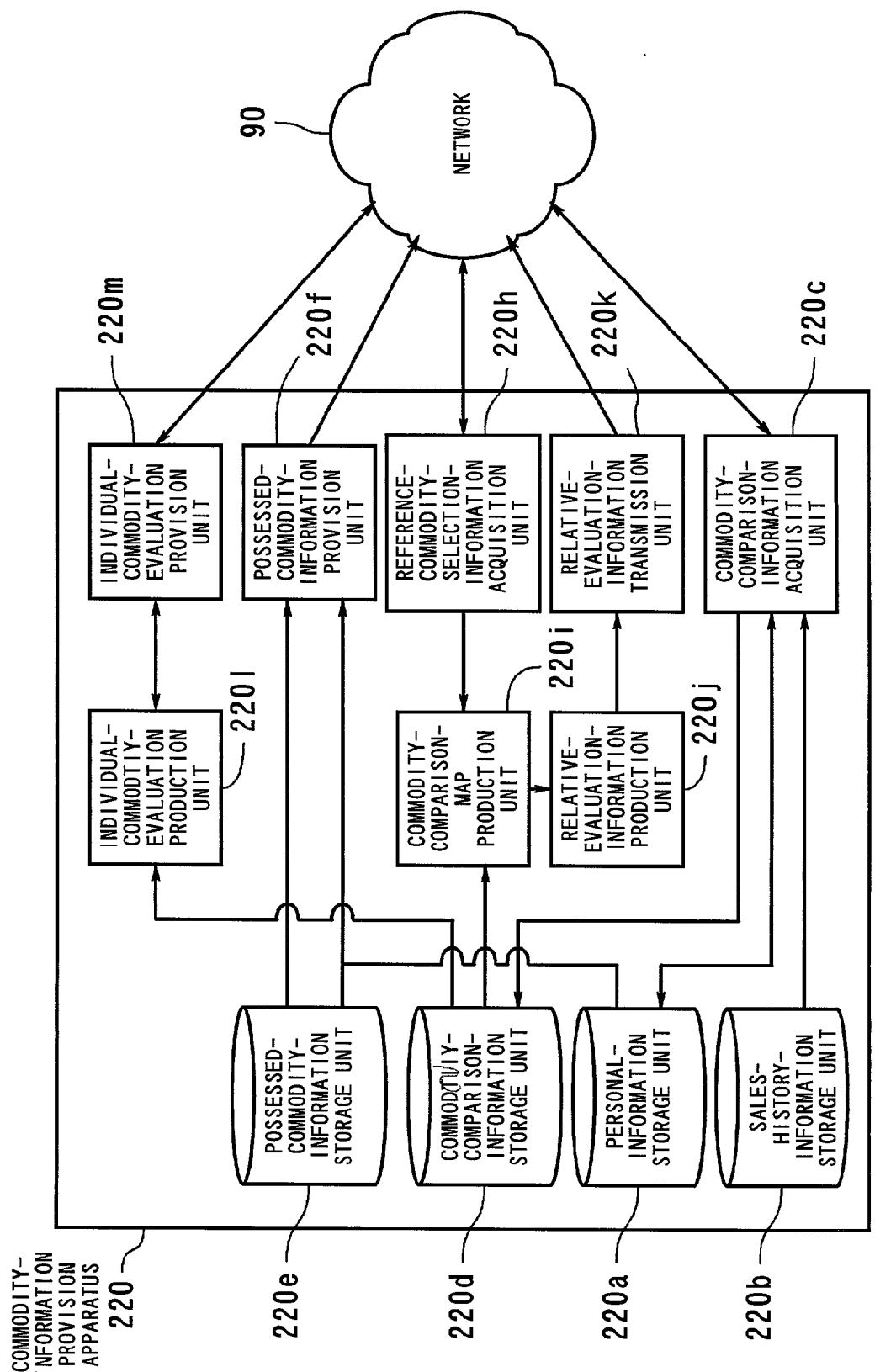
Figure 32:
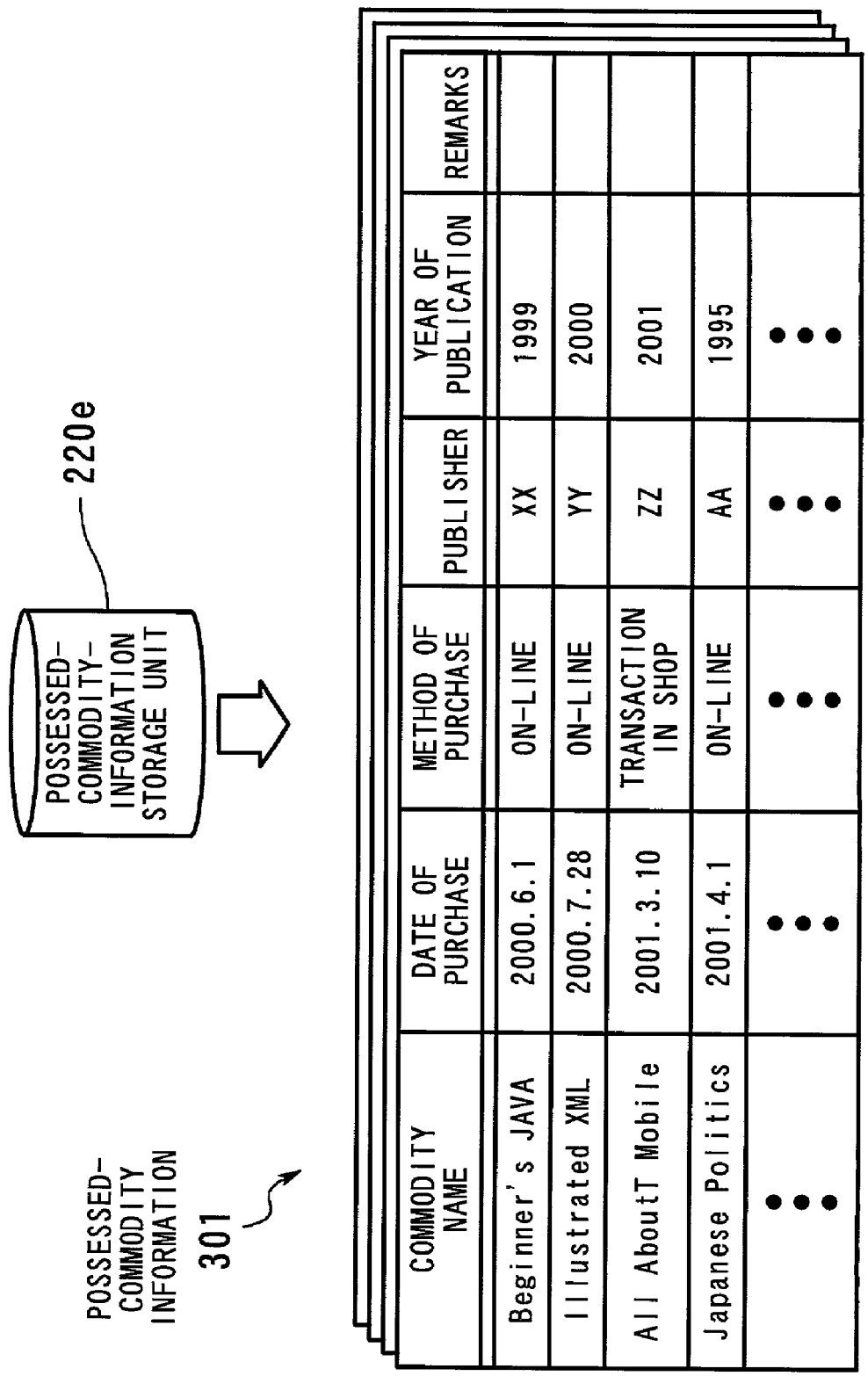
Figure 33:
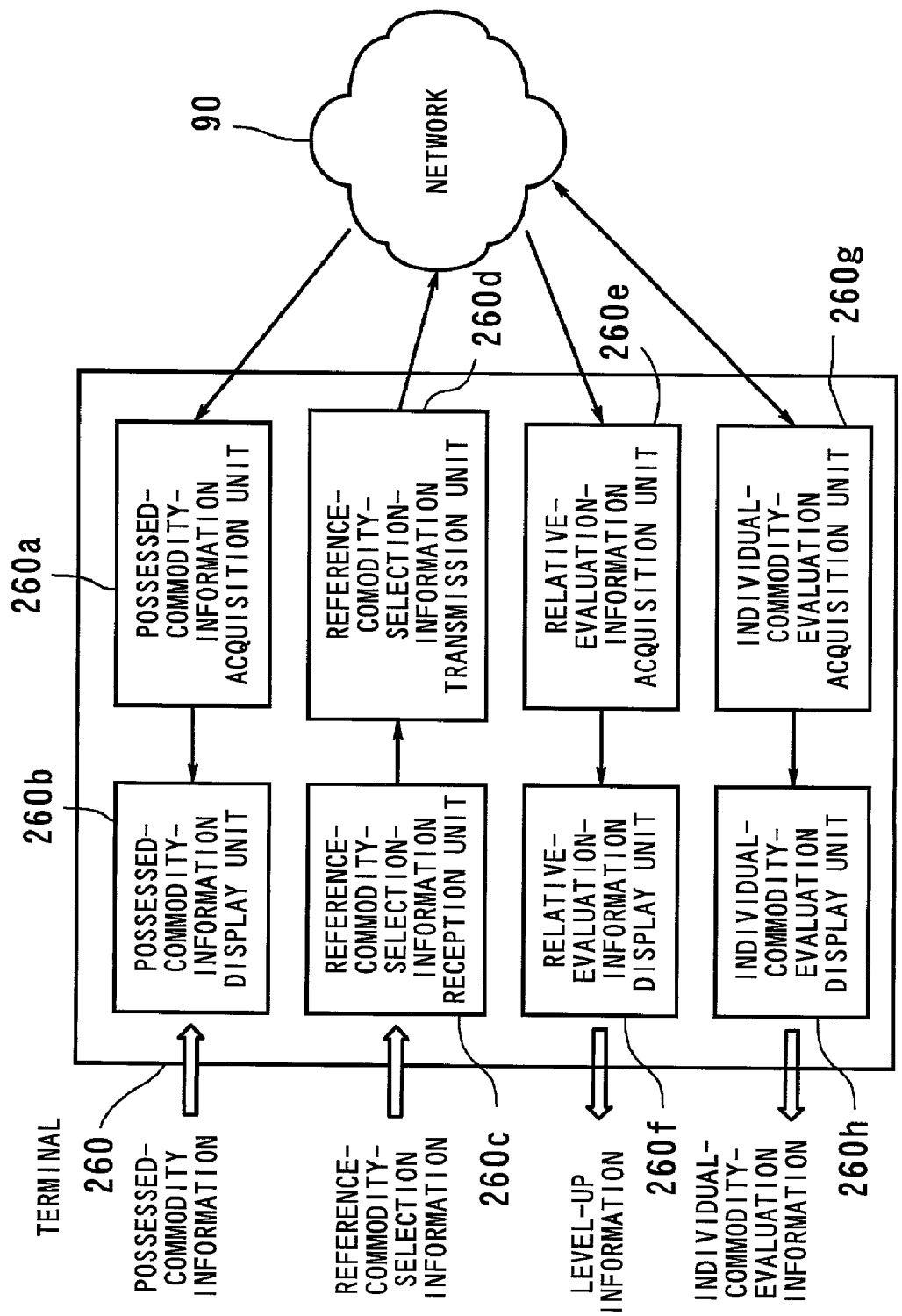
Figure 34:
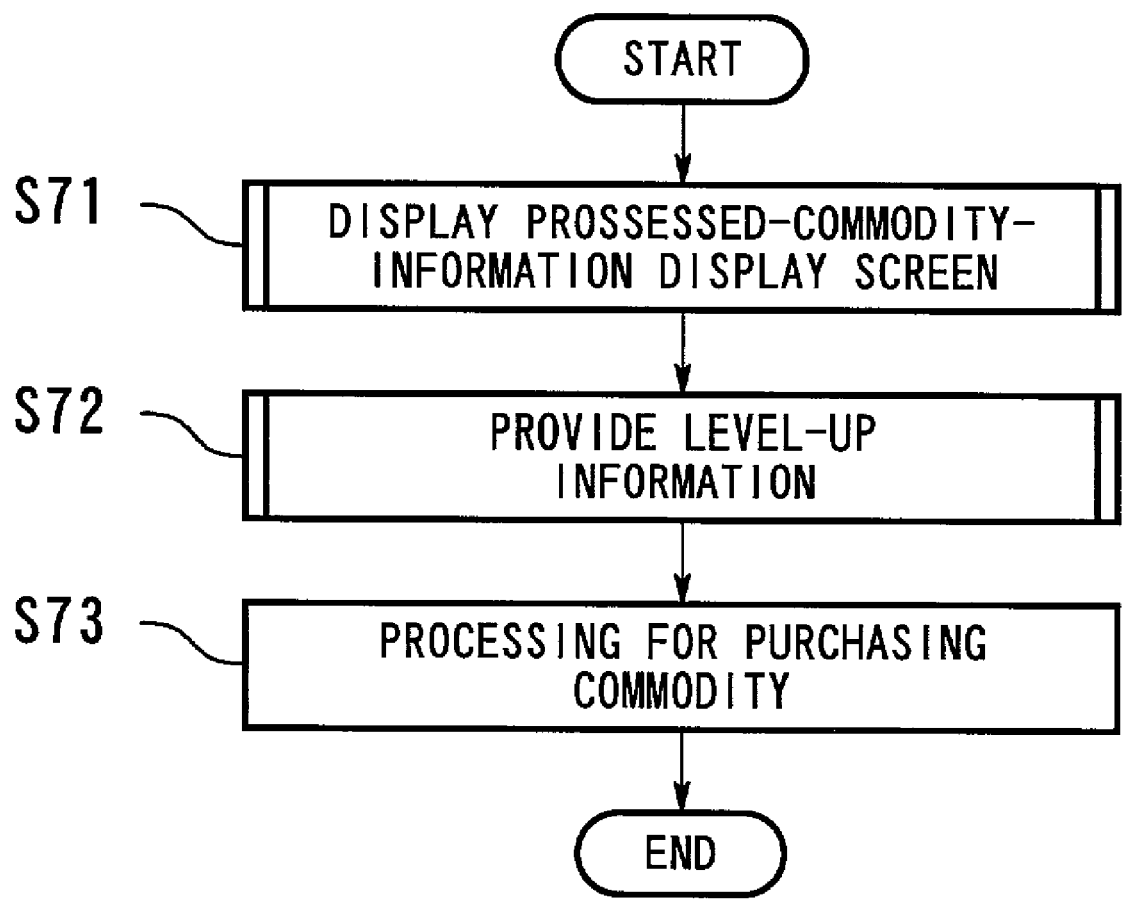
Figure 35:
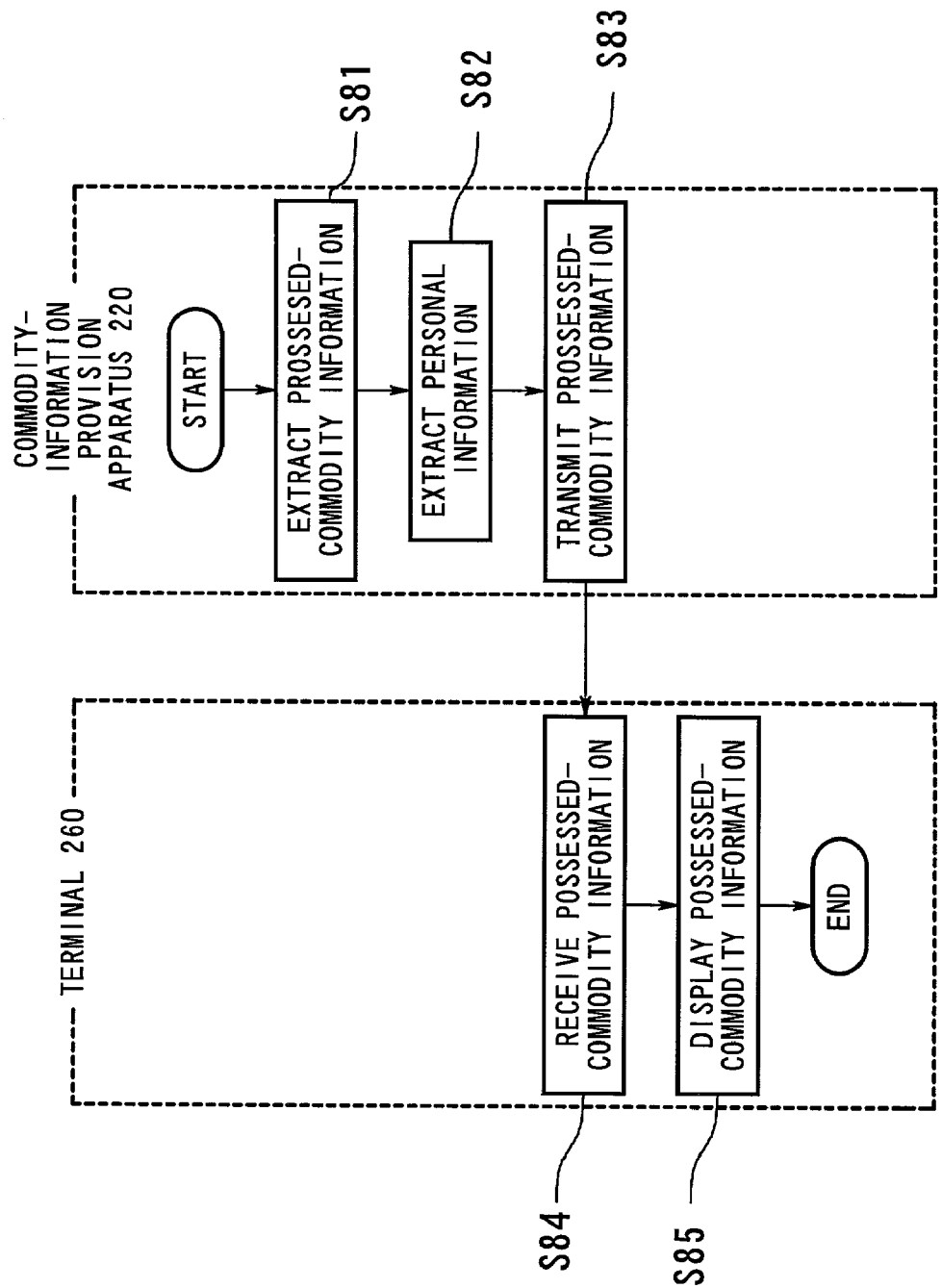
Figure 36:
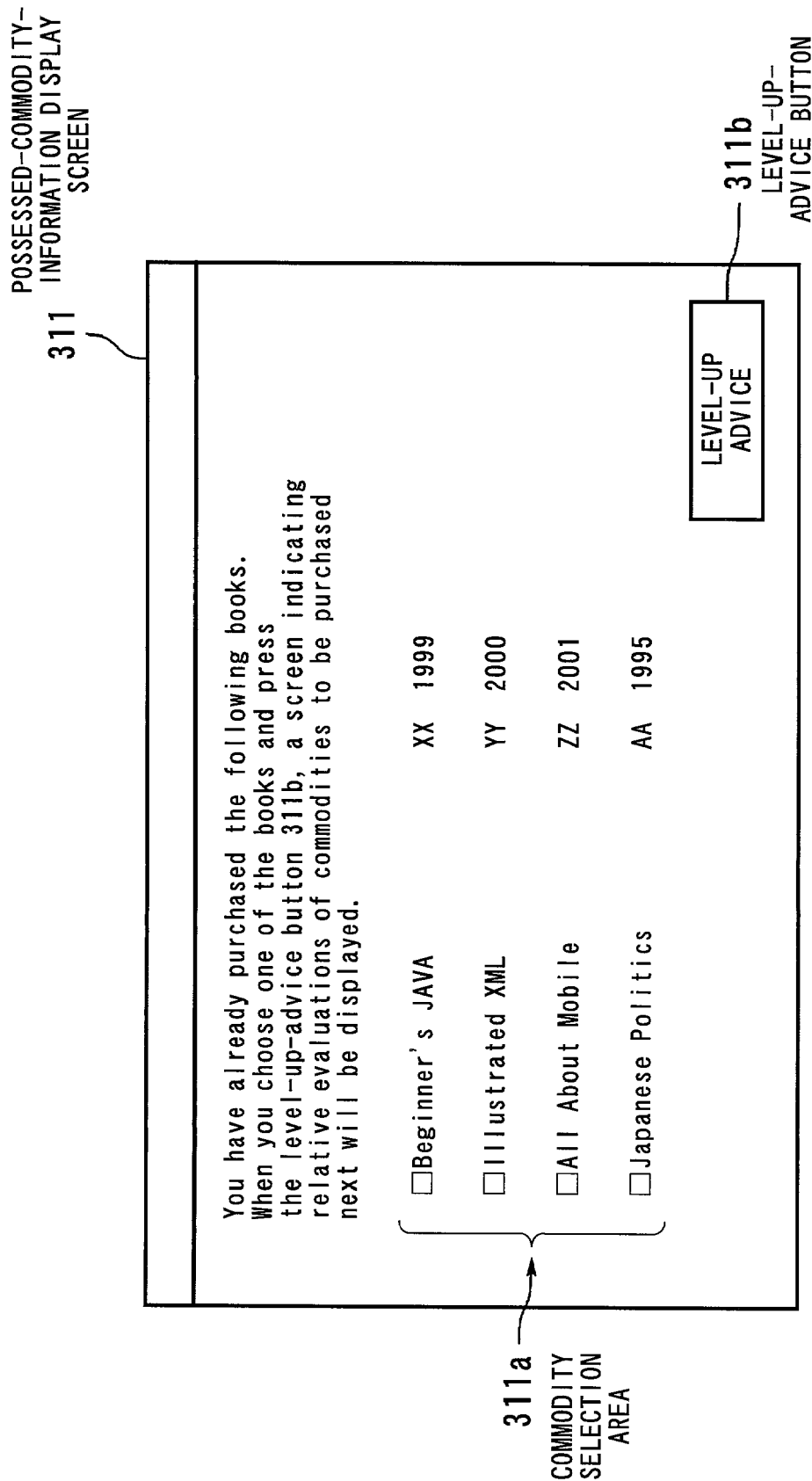
Figure 37:
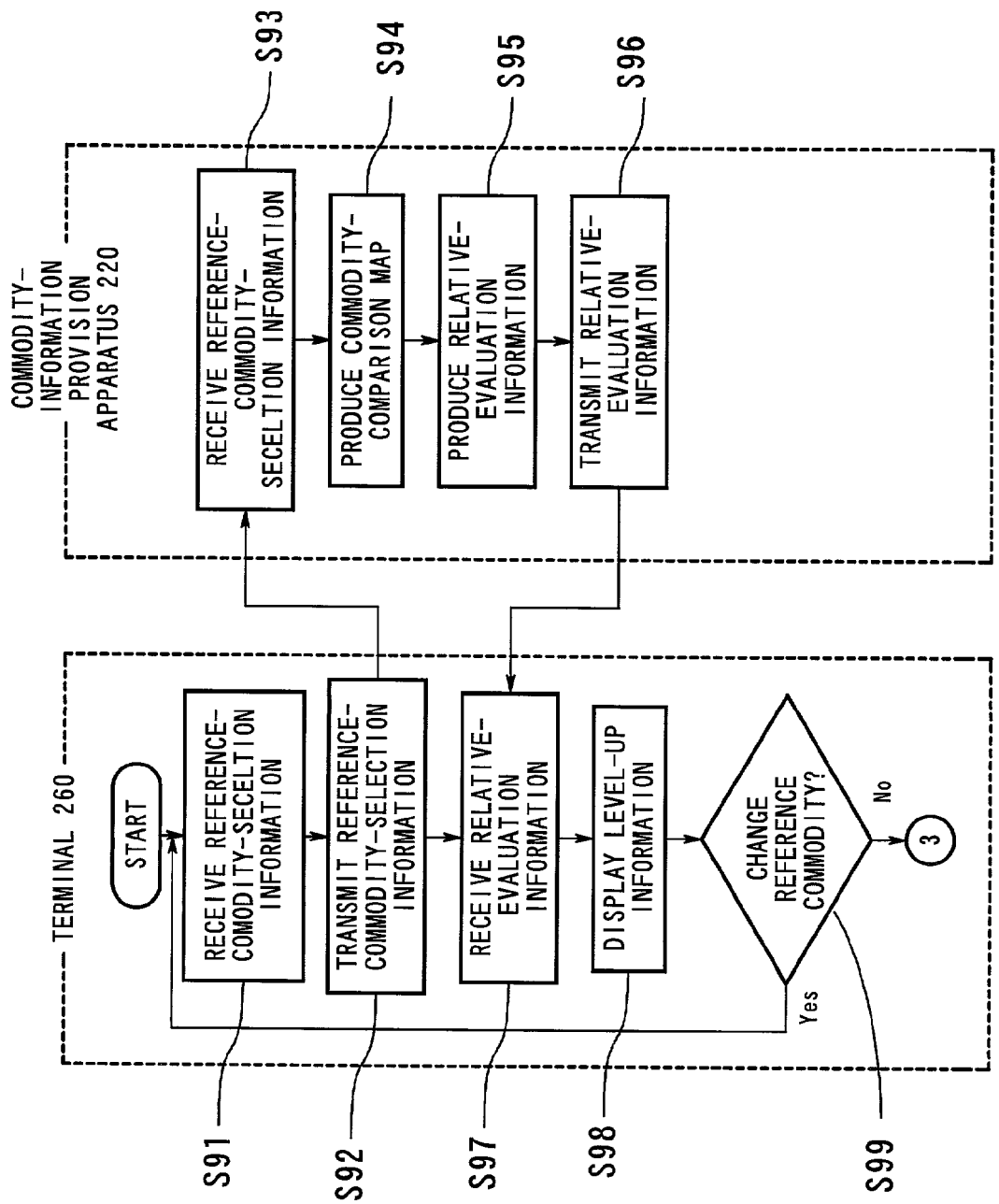
Figure 38:
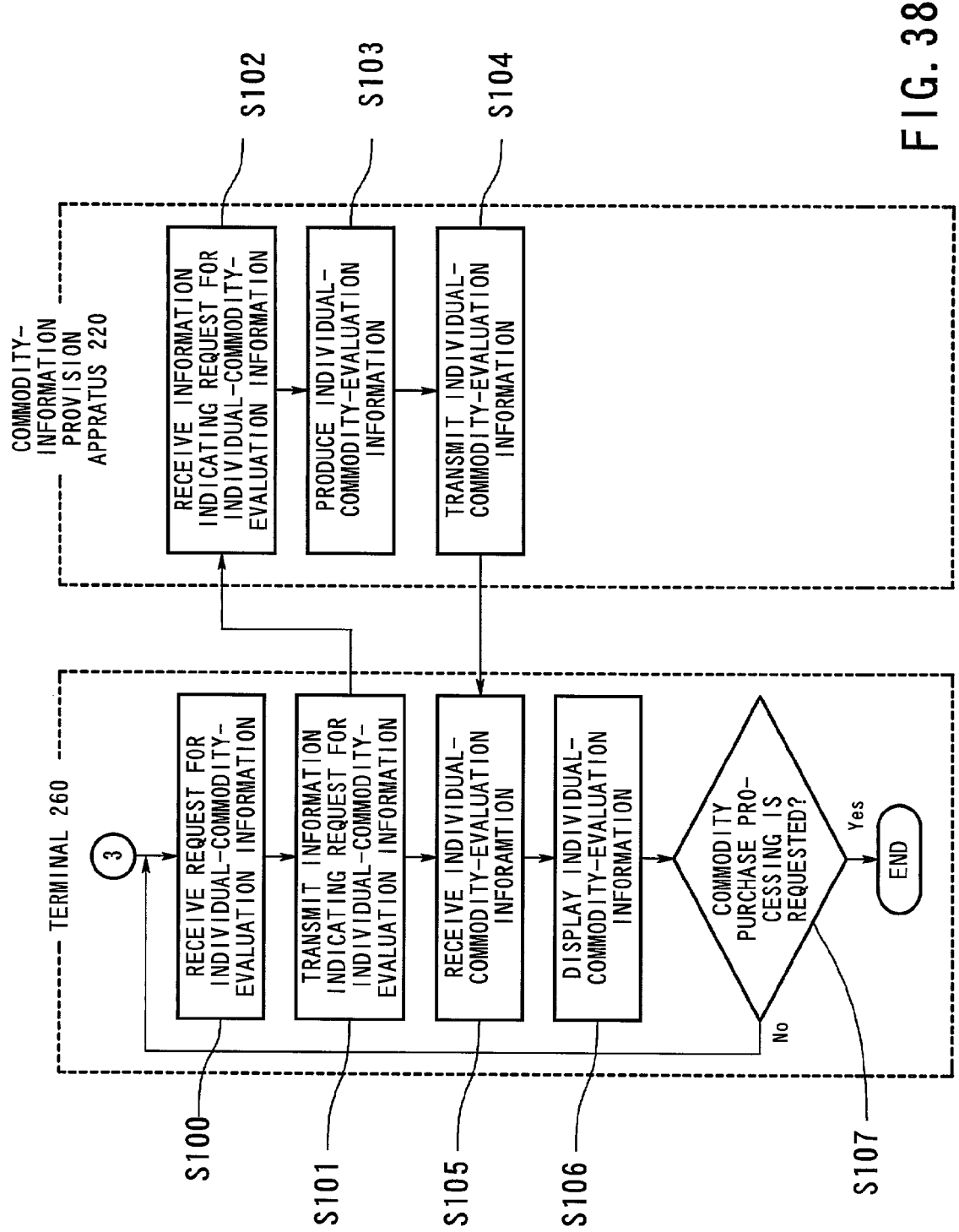
Figure 39:
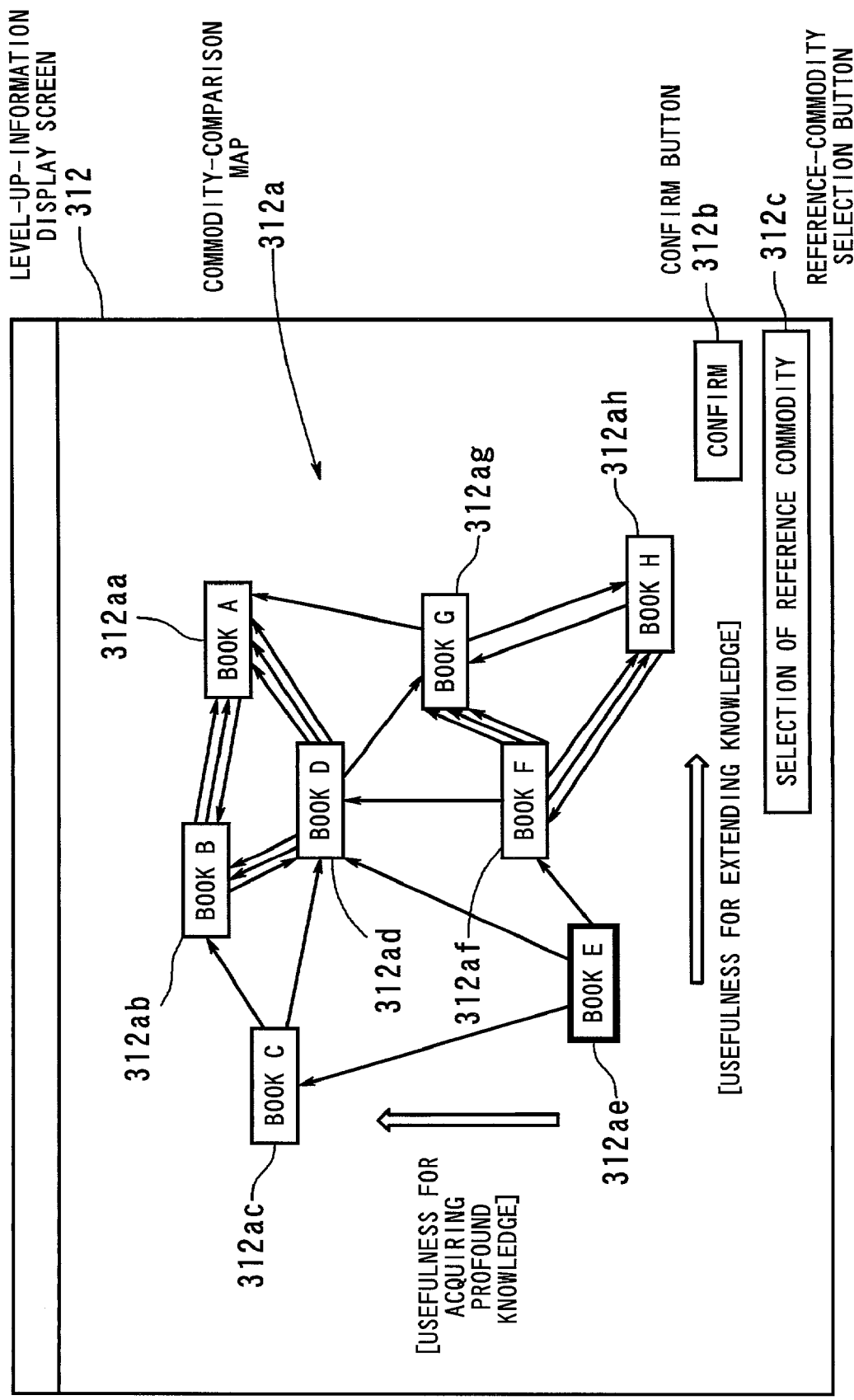
Figure 40:
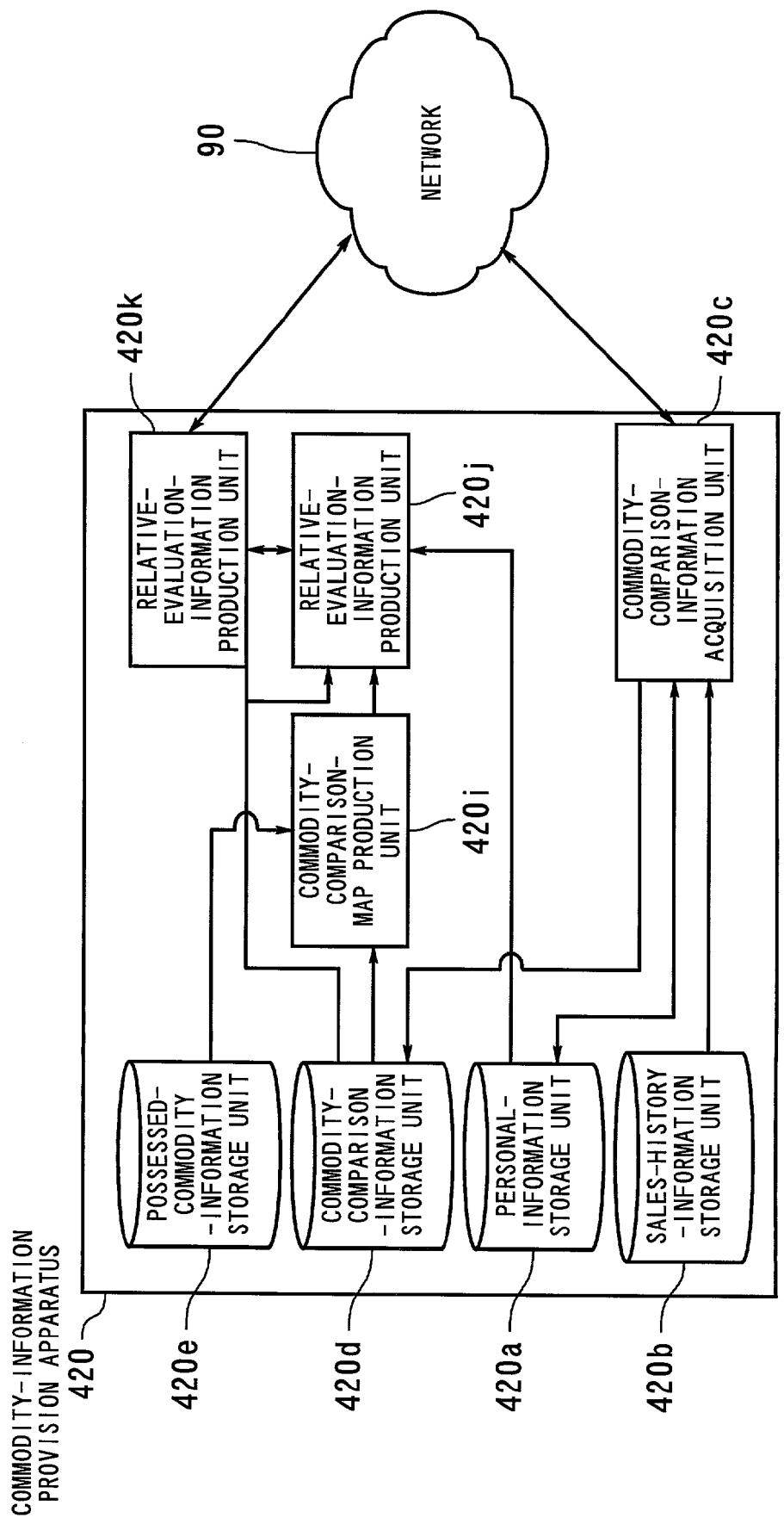
Figure 41:
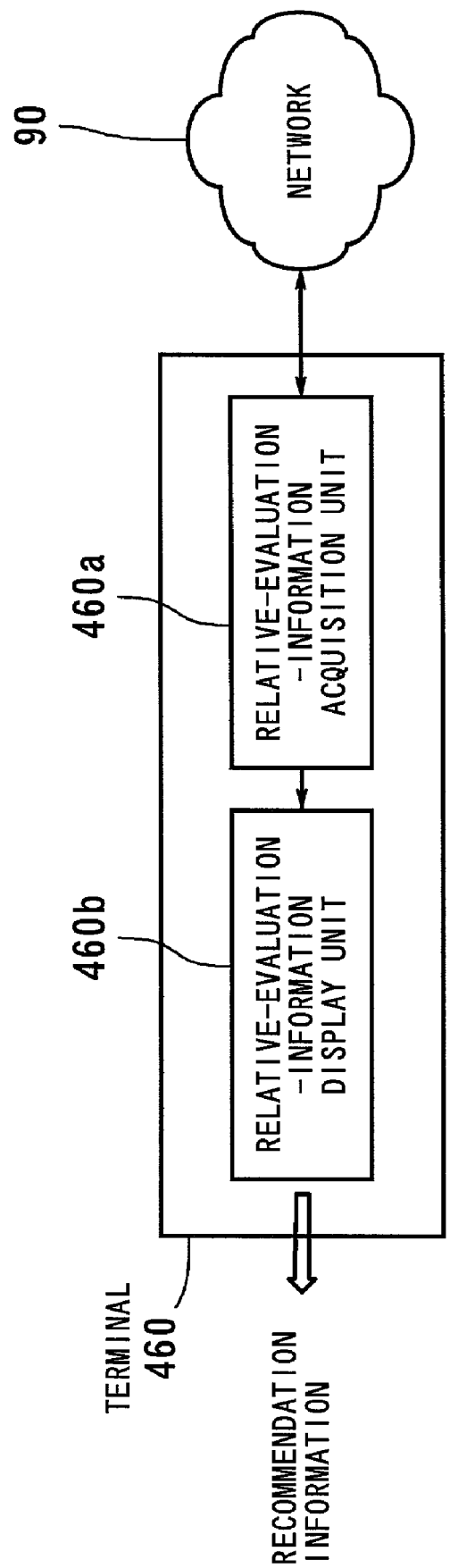
Figure 42:
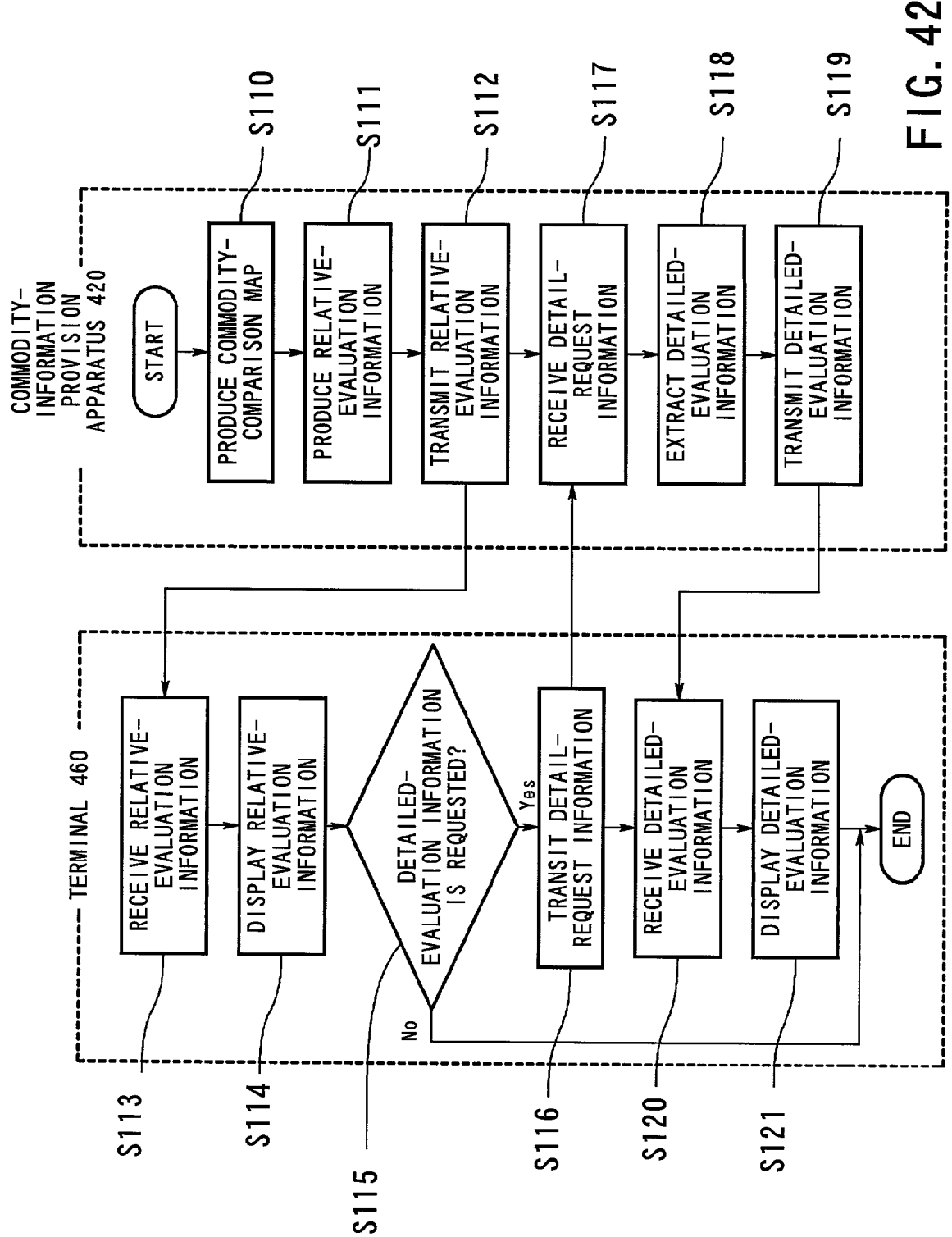
Figure 43:
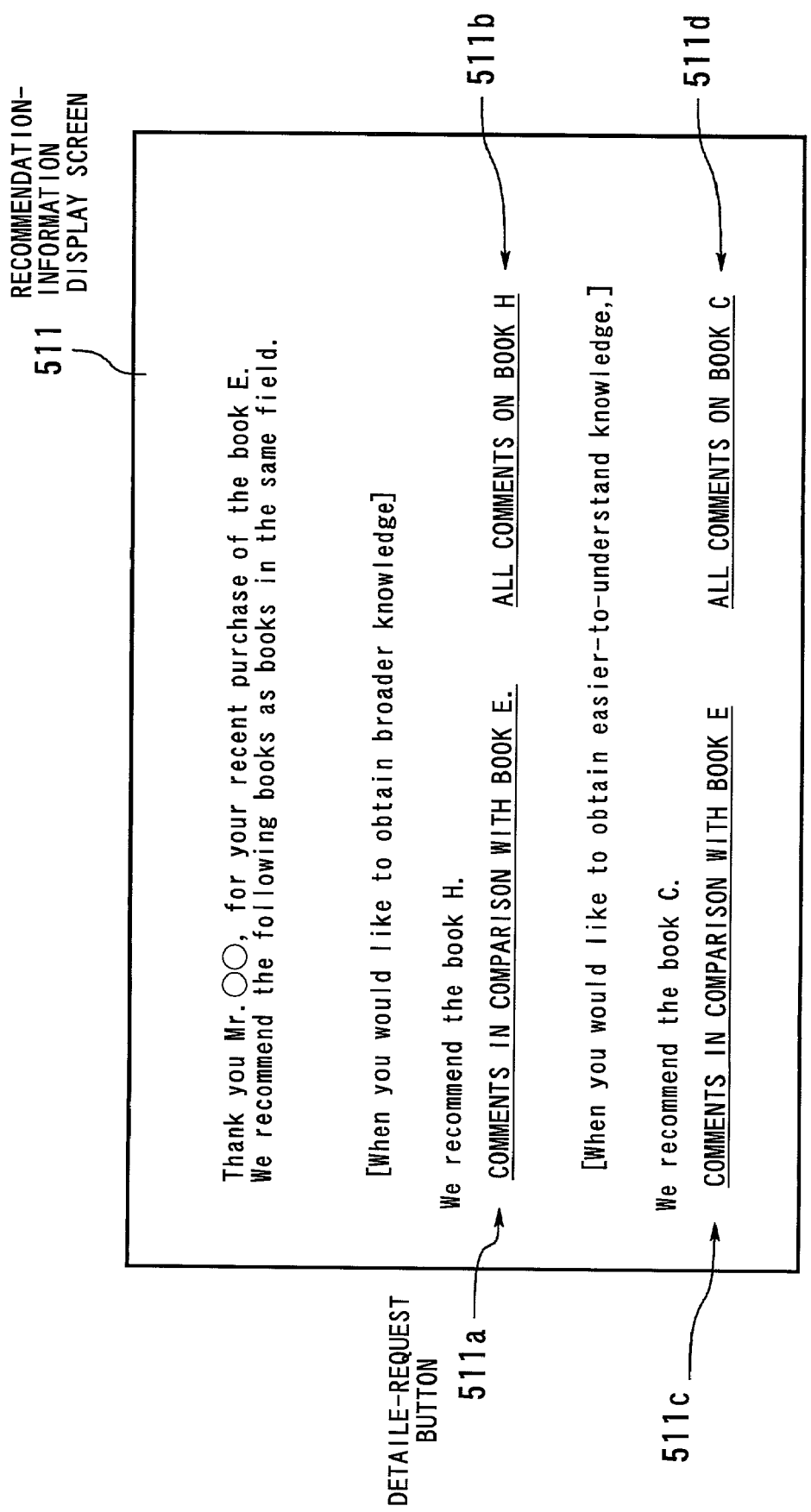

FIG. 14 is a diagram illustrating an example of a first commodity-comparison-input screen 111 displayed by the commodity-comparison-request display unit 30b in the terminal 30;

FIG. 15 is a diagram illustrating an example of a second commodity-comparison-input screen 112 displayed by the commodity-comparison-request display unit 30b in the terminal 30;

FIG. 16 is a flow diagram of an example of a sequence of operations performed in the commodity-information provision system 10 for providing information on relative evaluations to purchasers;

FIG. 17 is a flow diagram of an example of a detailed sequence of operations realizing the operation in step S11 in the sequence of FIG. 16;

FIG. 18 is a diagram illustrating an example of a commodity-list display screen 113 displayed by the commodity-list display unit 60b in the terminal 60;

FIGS. 19 to 21 are flow diagrams indicating an example of a detailed sequence of operations realizing the operation in step S13 in the sequence of FIG. 16;

FIG. 22 is a diagram illustrating an example of an evaluation-criterion-selection screen 114 displayed by the evaluation-criterion-selection-request display unit 60d in the terminal 60;

FIG. 23 is a diagram illustrating an example of a relative-evaluation display screen 115 displayed by the relative-evaluation display unit 60h in the terminal 60;

FIG. 24 is a diagram illustrating an example of an individual-commodity-evaluation display screen 116 displayed by the individual-commodity-evaluation display unit 60j in the terminal 60;

FIG. 25 is a flow diagram of an example of a detailed sequence of operations realizing the operation in step S40 in the sequence of FIG. 20 for producing a commodity-comparison map;

FIG. 26 is a diagram of examples of commodity-comparison information items;

FIG. 27 is a diagram illustrating examples of comments on commodities which are collected from users;

FIG. 28 is a diagram illustrating an example of a keyword map;

FIG. 29 is a diagram illustrating a selected-criteria statistics display screen 601 displayed on the terminal 60;

FIG. 30 is a diagram illustrating an example of a marketing-information display screen 602 displayed on the terminal 60;

FIG. 31 is a diagram illustrating the functions of the commodity-information provision apparatus 220 in a commodity-information provision system as a second embodiment of the present invention;

FIG. 32 is a diagram illustrating an example of a data structure of the possessed-commodity information 301 stored in the possessed-commodity-information storage unit 220e;

FIG. 33 is a diagram illustrating the functions of the terminal 260 in the commodity-information provision system as the second embodiment of the present invention;

FIG. 34 is a flow diagram of an example of a sequence of operations performed in the commodity-information provision system as the second embodiment of the present invention for providing level-up information to purchasers;

FIG. 35 is a flow diagram of an example of a detailed sequence of operations realizing the operation in step S71 in the sequence of FIG. 34;

FIG. 36 is a diagram illustrating an example of a possessed-commodity-information display screen 311 displayed by the possessed-commodity-information display unit 260b in the terminal 260;

FIGS. 37 and 38 are flow diagrams of an example of a detailed sequence of operations realizing the operation in step S72 in the sequence of FIG. 34;

FIG. 39 is a diagram illustrating an example of a level-up-information display screen 312 displayed by the relative-evaluation-information display unit 260f in the terminal 260;

FIG. 40 is a diagram illustrating the functions of the commodity-information provision apparatus 420 in a commodity-information provision system as a third embodiment of the present invention;

FIG. 41 is a diagram illustrating the functions of the terminal 460 in the commodity-information provision system as the third embodiment of the present invention;

FIG. 42 is a flow diagram of an example of a sequence of operations performed in the commodity-information provision system as the third embodiment of the present invention for providing recommendation information to purchasers; and FIG. 43 is a diagram illustrating an example of a recommendation-information display screen 511 displayed by the relative-evaluation-information display unit 460b in the terminal 460.

4. DESCRIPTION OF THE PREFERRED EMBODIMENTS

Embodiments of the present invention are explained below with reference to drawings.

4.1 Basic Construction of Commodity-Information Provision System

Figure 1:
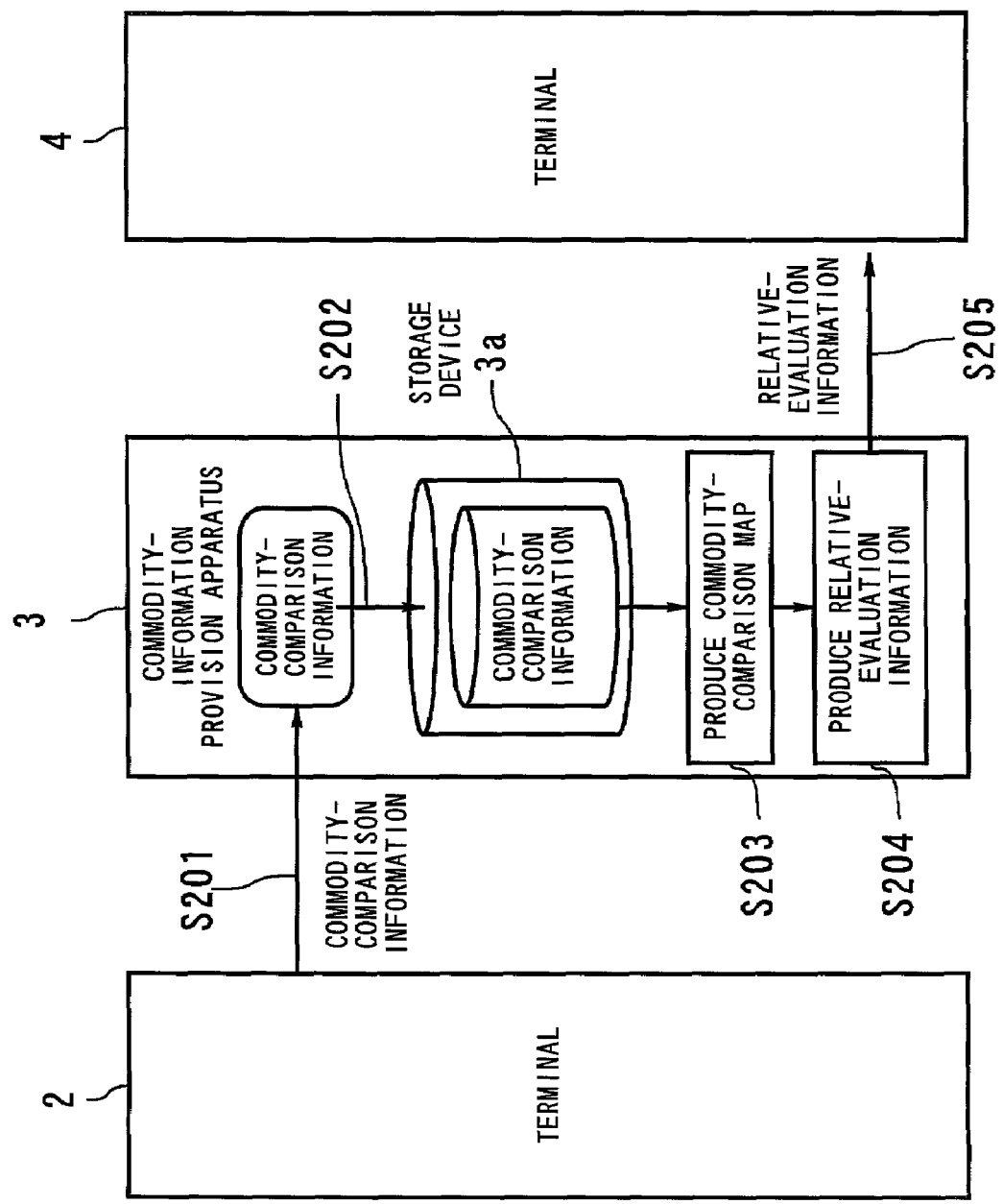
FIG. 1 is a diagram illustrating a basic construction of a commodity-information provision system according to the present invention.

FIG. 1 is a diagram illustrating a basic construction of a commodity-information provision system according to the present invention.

As illustrated in FIG. 1, the commodity-information provision system 1 of FIG. 1 comprises terminals 2 and 4 and a commodity-information provision apparatus 3. The commodity-information provision apparatus 3 provides commodity information to users (e.g., consumers) of the commodity-information provision system 1. The users of the commodity-information provision system 1 manipulate the terminals 2 and 4. The terminals 2 and 4 are connected to the commodity-information provision apparatus 3 through a communication means such as the Internet so that information can be transmitted between the commodity-information provision apparatus 3 and the terminals 2 and 4.

An example of a sequence of operations performed in the commodity-information provision system 1 is as follows.

In step S201, the commodity-information provision apparatus 3 collects commodity-comparison information which is input into, for example, the terminal 2 by a consumer or the like and indicates at least one result of at least one comparison between commodities. Then, in step S202, the commodity-information provision apparatus 3 stores the collected commodity-comparison information in a storage device 3a which is provided in the commodity-information provision apparatus 3. In step S203, the commodity-information provision apparatus 3 produces based on the commodity-comparison information a commodity-comparison map which visually indicates the result of comparison between the commodities. Next, in step S204, the commodity-information provision apparatus 3 produces relative-evaluation information which indicates details of relative evaluations of the commodities, by using the commodity-comparison map. Then, in step S205, the relative-evaluation information is transmitted to, for example, the terminal 4.

As described above, users of the commodity-information provision system 1 can easily obtain relative-evaluation information produced based on commodity-comparison information which is collected from consumers and indicates at least one result of at least one comparison between commodities. Then, the users of the commodity-information provision system 1 can easily recognize impartial, relative evaluations of the commodities by viewing the relative-evaluation information since the relative evaluations of the commodities are visually indicated in the relative-evaluation information.

4.2 First Embodiment

A commodity-information provision system as the first embodiment of the present invention is explained below.

4.2.1 Configuration of System 10

Figure 2:
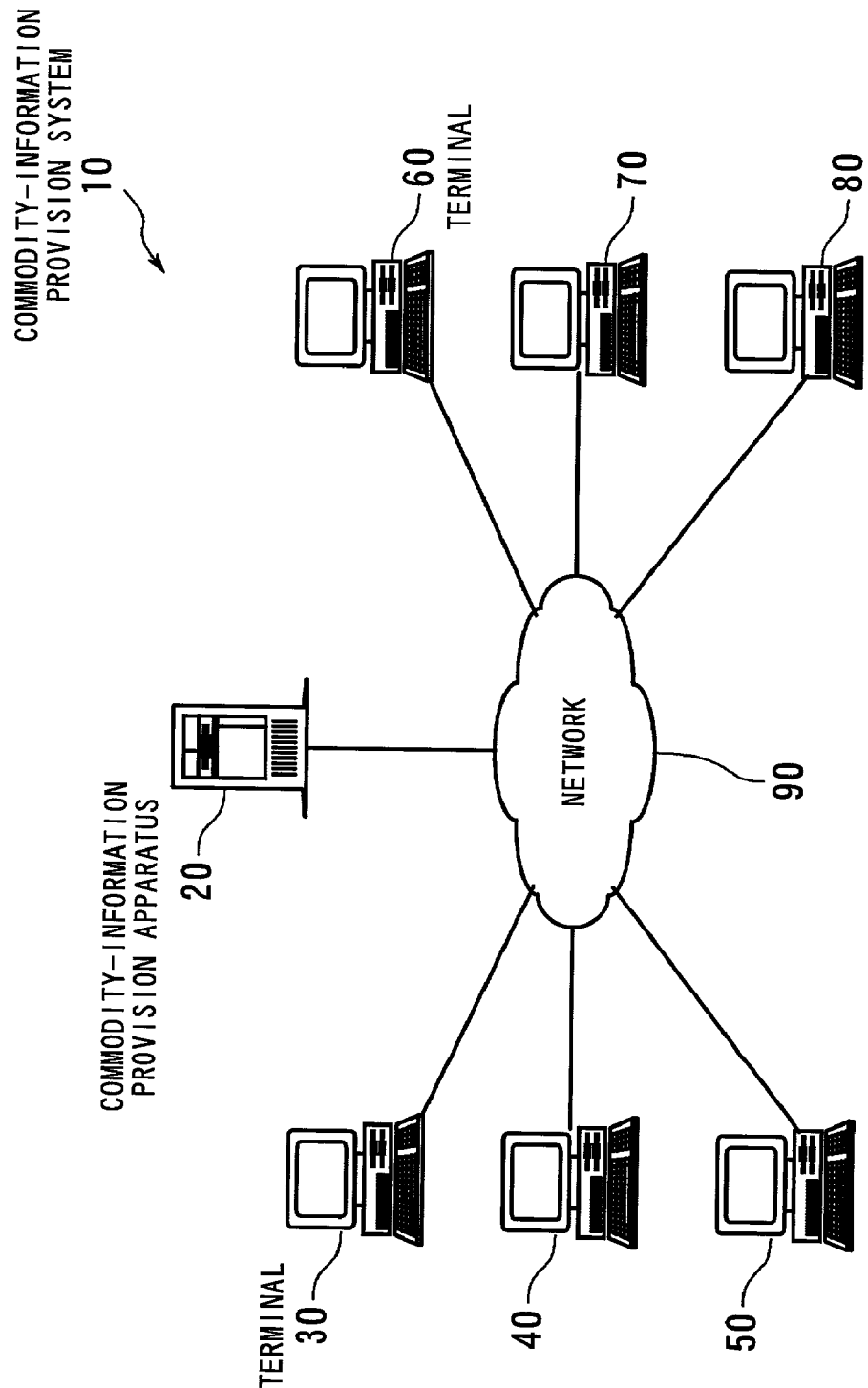
FIG. 2 is a diagram illustrating an example of a configuration of a commodity-information provision system 10 as a first embodiment of the present invention.

FIG. 2 is a diagram illustrating an example of a configuration of the commodity-information provision system 10 as the first embodiment of the present invention. As illustrated in FIG. 2, the commodity-information provision system 10 comprises a commodity-information provision apparatus 20, terminals 30, 40, 50, 60, 70, and 80, and a network 90. The commodity-information provision apparatus 20 provides information on commodities to users. The terminals 30, 40, and 50 are used by users (consumers) or the like for inputting results of comparisons between commodities. The terminals 60, 70, and 80 are used by users for utilizing the information on commodities. The network 90 functions as a communication means.

The commodity-information provision apparatus 20 and the terminals 30, 40, 50, 60, 70, and 80 can be realized by personal computers, which process various types of information for achieving functions of the commodity-information provision system 10. The network 90 provides a communication link so that information can be transmitted between the commodity-information provision apparatus 20 and the terminals 30, 40, 50, 60, 70, and 80. For example, the network 90 is realized by the Internet.

Although one commodity-information provision apparatus and six terminals are indicated in FIG. 2, the commodity-information provision system 10 may comprise an arbitrary number of commodity-information provision apparatuses and an arbitrary number of terminals.

4.2.2 Hardware Construction of Apparatus 20

Figure 3:
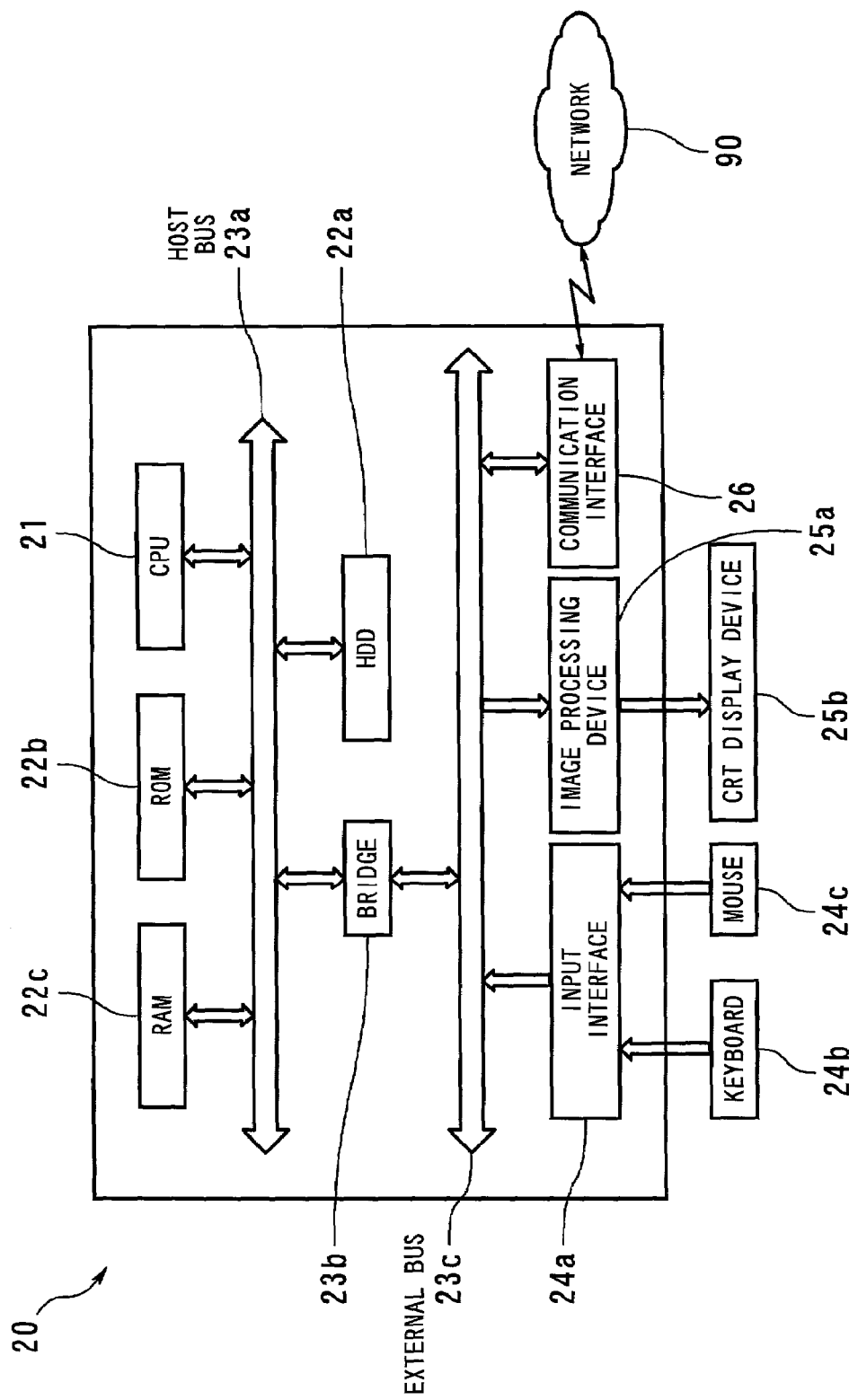
FIG. 3 is a diagram illustrating an example of a hardware construction of the commodity-information provision apparatus 20 in the configuration of FIG. 2.

FIG. 3 is a diagram illustrating an example of a hardware construction of the commodity-information provision apparatus 20 in the configuration of FIG. 2. As illustrated in FIG. 3, the commodity-information provision apparatus 20 comprises a CPU (central processing unit) 21, an HDD (hard disk drive) 22a, a ROM (read-only memory) 22b, a RAM (random access memory) 22c, a host bus 23a, a bridge 23b, an external bus 23c, an input interface 24a, a keyboard 24b, a mouse 24c, an image processing device 25a, a CRT (cathode ray tube) display device 25b, and a communication interface 26.

The CPU 21, the HDD 22a, the ROM 22b, and the RAM 22c are connected to the host bus 23a so that information can be transferred between the CPU 21, the HDD 22a, the ROM 22b, and the RAM 22c. The input interface 24a, the image processing device 25a, and the communication interface 26 are connected to the external bus 23c so that information can be transferred between the input interface 24a, the image processing device 25a, and the communication interface 26. The host bus 23a is connected to the external bus 23c through the bridge 23b so that information can be transferred between the devices connected to the host bus 23a and the devices connected to the external bus 23c. The keyboard 24b and the mouse 24c are connected to the input interface 24a, and the CRT display device 25b is connected to the image processing device 25a.

For example, the HDD 22a may be realized by an unremovable hard disk drive, the ROM 22b may be realized by a mask ROM, and the RAM 22c may be realized by a DRAM (dynamic random access memory). The HDD 22a, the ROM 22b, and the RAM 22c store various programs including an operating system, application programs, and the like, and various types of data which are necessary for execution of the programs. The CPU 21 includes at least one processor as a main constituent, and executes the above programs stored in the ROM 22b and the RAM 22c in synchronization with a clock signal, which is supplied from an oscillator (not shown).

The host bus 23a and the external bus 23c are each an information transfer path constituted by a microprocessor, a memory, and the like. The bridge 23b relays data between the host bus 23a and the external bus 23c. The input interface 24a relays input signals from the keyboard 24b and the mouse 24c to the external bus 23c.

The image processing device 25a generates an analog signal corresponding to analog or digital image data supplied from the external bus 23c, under control of the CPU 21, and supplies the generated analog signal to the CRT display device 25b. The CRT display device 25b displays an image in accordance with the analog signal supplied from the image processing device 25a.

The communication interface 26 functions as an interface between the commodity-information provision apparatus 20 and the network 90 so that the commodity-information provision apparatus 20 can communicate with the terminals through the network 90. For example, the communication interface 26 complies with an appropriate one of the IEEE (Institute of Electrical and Electronics Engineers) standards.

4.2.3 Functions of Apparatus 20

Figure 4:
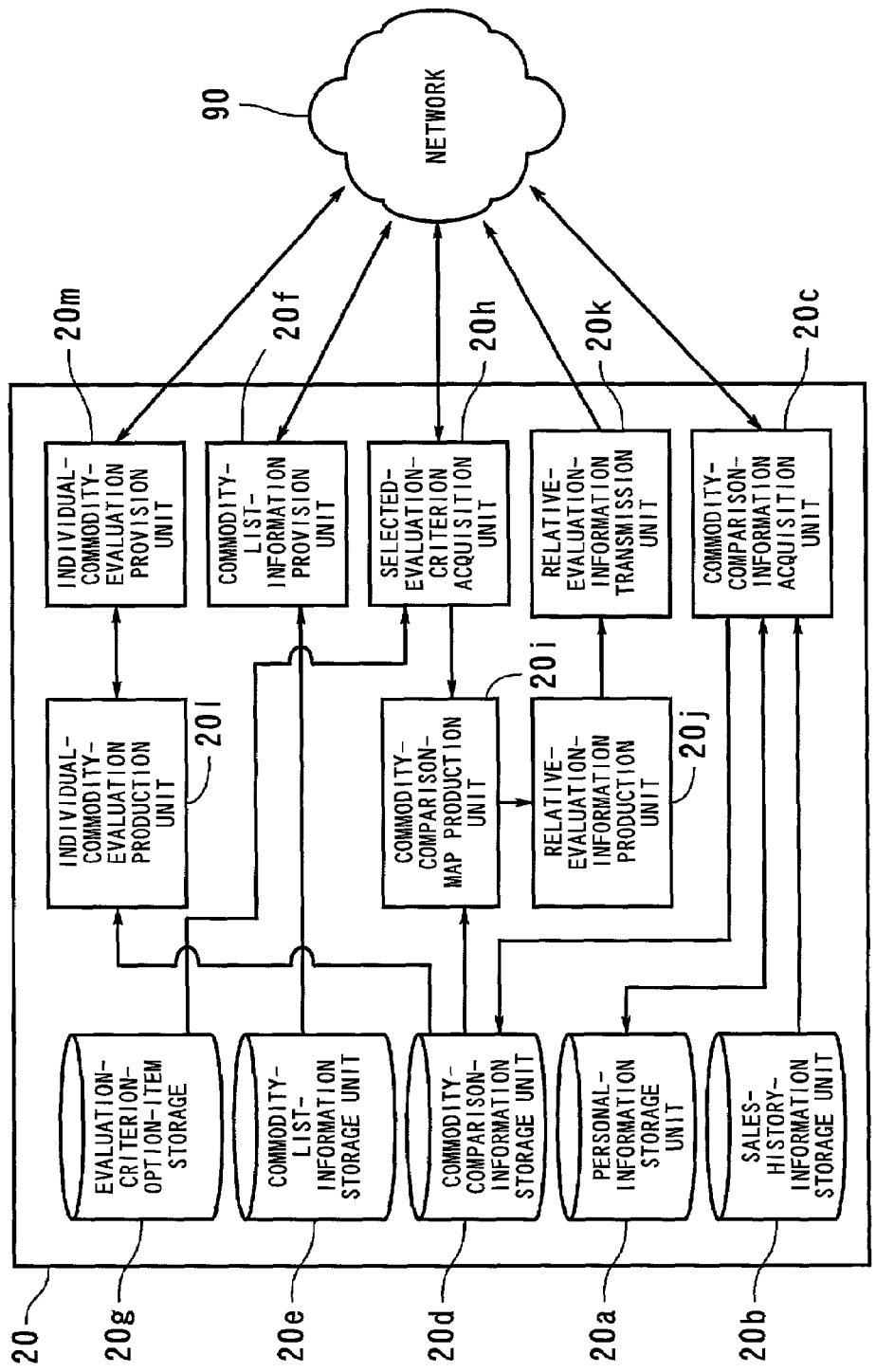
FIG. 4 is a block diagram illustrating the functions of the commodity-information provision apparatus 20 in the configuration of FIG. 2.

FIG. 4 is a block diagram illustrating the functions of the commodity-information provision apparatus 20 in the configuration of FIG. 2. As illustrated in FIG. 4, the commodity-information provision apparatus 20 comprises a personal-information storage unit 20a, a sales-history-information storage unit 20b, a commodity-comparison-information acquisition unit 20c, a commodity-comparison-information storage unit 20d, a commodity-list-information storage unit 20e, a commodity-list-information provision unit 20f, an evaluation-criterion-option-item storage unit 20g, a selected-evaluation-criterion acquisition unit 20h, a commodity-comparison-map production unit 20i, a relative-evaluation-information production unit 20j, a relative-evaluation-information transmission unit 20k, an individual-commodity-evaluation production unit 20l, and an individual-commodity-evaluation provision unit 20m.

The personal-information storage unit 20a stores personal information on users of the commodity-information provision system 10, i.e., users who are under a predetermined contract which allows the users to use the commodity-information provision system 10. The sales-history-information storage unit 20b stores information on sales histories of commodities which have been sold.

The commodity-comparison-information acquisition unit 20c acquires commodity-comparison information through the communication means (i.e., the network 90), where the commodity-comparison information indicates at least one result of at least one comparison between commodities. The comparison is made, for example, by the users, and the at least one result of the at least one comparison (e.g., superiority or inferiority) is input through at least one of the terminals (corresponding to the aforementioned at least one first terminal in the second to fourth, sixth, and seventh aspects of the present invention) in the commodity-information provision system 10. The commodity-comparison-information storage unit 20d stores the commodity-comparison information acquired by the commodity-comparison-information acquisition unit 20c.

The commodity-list-information storage unit 20e stores commodity-list information. The commodity-comparison information is information on a commodity list including, for example, commodities on which the commodity-information provision system 10 provides information. The commodity-list-information provision unit 20f transmits the commodity-list information to one of the terminals (corresponding to the aforementioned at least one second terminal in the second to fourth, sixth, and seventh aspects of the present invention and the aforementioned terminal in the fifth aspect of the present invention) in the commodity-information provision system 10.

The evaluation-criterion-option-item storage unit 20g stores evaluation-criterion selection items. The evaluation-criterion selection items are a plurality of evaluation criteria which can be used when a commodity-comparison map is produced. The selected-evaluation-criterion acquisition unit 20h acquires evaluation-criterion-selection information from the one of the terminals (corresponding to the aforementioned at least one second terminal in the second to fourth, sixth, and seventh aspects of the present invention and the aforementioned terminal in the fifth aspect of the present invention). The evaluation-criterion-selection information indicates at least one of the plurality of evaluation criteria which is selected by a user for use in production of a commodity-comparison map.

By using the commodity-comparison information stored in the commodity-comparison-information storage unit 20d and the evaluation-criterion-selection information acquired by the selected-evaluation-criterion acquisition unit 20h, the commodity-comparison-map production unit 20i produces a commodity-comparison map which visually indicates at least one relationship between commodities in such a manner that at least one coordinate axis of the commodity-comparison map corresponds to at least one evaluation criterion used in evaluation of the commodities, respectively. The relative-evaluation-information production unit 20j produces relative-evaluation information which indicates at least one relative evaluation of the commodities, by using the commodity-comparison map produced by the commodity-comparison-map production unit 20i. The relative-evaluation-information transmission unit 20k transmits the relative-evaluation information produced by the relative-evaluation-information production unit 20j, to the one of the terminals (corresponding to the aforementioned at least one second terminal in the second to fourth, sixth, and seventh aspects of the present invention and the aforementioned terminal in the fifth aspect of the present invention) through the network 90.

The individual-commodity-evaluation production unit 20l produces individual-commodity-evaluation information which indicates at least one relative evaluation of each of at least one commodity which is specified, for example, by a user. The individual-commodity-evaluation provision unit 20m transmits the individual-commodity-evaluation information produced by the individual-commodity-evaluation production unit 20l, to the one of the terminals (corresponding to the aforementioned at least one second terminal in the second to fourth, sixth, and seventh aspects of the present invention and the aforementioned terminal in the fifth aspect of the present invention).

As illustrated in FIG. 4, the commodity-information provision apparatus 20 is arranged as follows:

(1) The commodity-comparison-information acquisition unit 20c can exchange information with the personal-information storage unit 20a, the sales-history-information storage unit 20b, and the commodity-comparison-information storage unit 20d.

(2) The commodity-list-information storage unit 20e can exchange information with the commodity-list-information provision unit 20f.

(3) The evaluation-criterion-option-item storage unit 20g can exchange information with the selected-evaluation-criterion acquisition unit 20h.

(4) The selected-evaluation-criterion acquisition unit 20h can exchange information with the commodity-comparison-map production unit 20i.

(5) The commodity-comparison-map production unit 20i can exchange information with the commodity-comparison-information storage unit 20d and the relative-evaluation-information production unit 20j.

(6) The relative-evaluation-information production unit 20j can exchange information with the relative-evaluation-information transmission unit 20k.

(7) The commodity-comparison-information storage unit 20d can exchange information with the individual-commodity-evaluation production unit 20l.

(8) The individual-commodity-evaluation production unit 20l can exchange information with the individual-commodity-evaluation provision unit 20m.

(9) The commodity-comparison-information acquisition unit 20c, the commodity-list-information provision unit 20f, the selected-evaluation-criterion acquisition unit 20h, the relative-evaluation-information transmission unit 20k, and the individual-commodity-evaluation provision unit 20m can communicate with the terminals in the commodity-information provision system 10 through the network 90.

4.2.4 Personal Information

Figure 5:
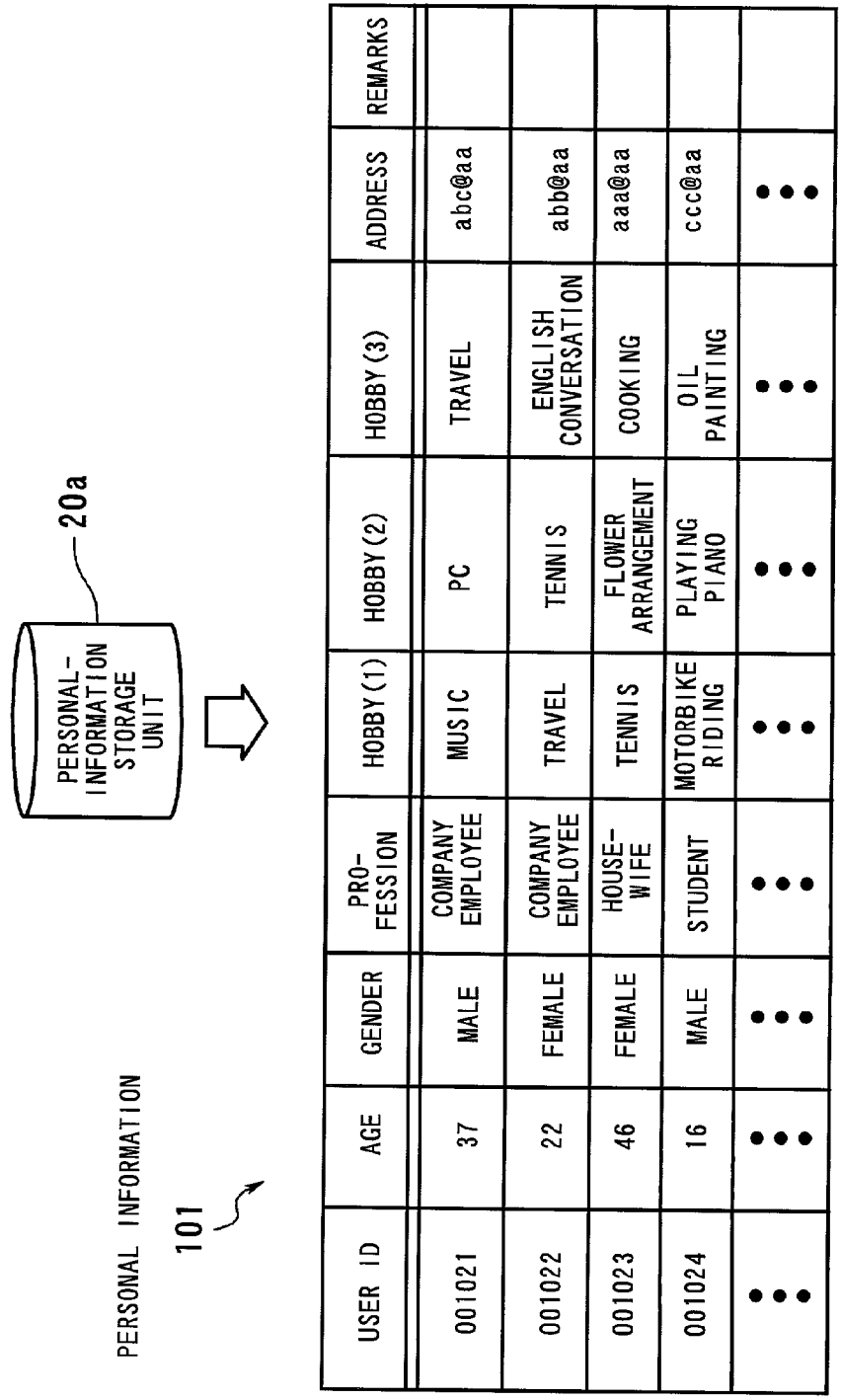

FIG. 5 is a diagram illustrating an example of a data structure of the personal information 101 stored in the personal-information storage unit 20a.

The personal information 101 is personal information on each user who is under a predetermined contract which allows the users to use the commodity-information provision system 10. In the example of FIG. 5, the personal information 101 includes information items "USER ID," "AGE," "GENDER," "PROFESSION," "HOBBY (1)," "HOBBY (2)," "HOBBY (3)," "ADDRESS," and "REMARKS." For example, the information item "USER ID" indicates an identification number of each user who is under the above predetermined.

As illustrated in FIG. 5, the example of the personal information 101 includes "001021," "001022," "001023," "001024," . . . as the "USER ID." The information items "AGE," "GENDER," "PROFESSION," "HOBBY (1)," "HOBBY (2)," "HOBBY (3)," and "ADDRESS" corresponding to the USER ID "001021" are respectively "37," "male," "company employee," "music," "personal computer," "travel," and "abc@aa"; the information items corresponding to the USER ID "001022" are respectively "22," "female," "company employee," "travel," "tennis," "English conversation," and "abb@aa"; the information items corresponding to the USER ID "001023" are respectively "46," "female," "housewife," "tennis," "flower arrangement," "cooking," and "aaa@aa"; and the information items corresponding to the USER ID "001024" are respectively "16," "male," "student," "motorbike riding," "playing piano," "oil painting," and "ccc@aa."

The personal information 101 in the personal-information storage unit 20a is updated for example, when a new user makes a contract for use of the commodity-information provision system 10. That is, the information items constituting the personal information 101 are produced based on information supplied from each user when the user makes a user contract.

4.2.5 Sales-History Information

Figure 6:
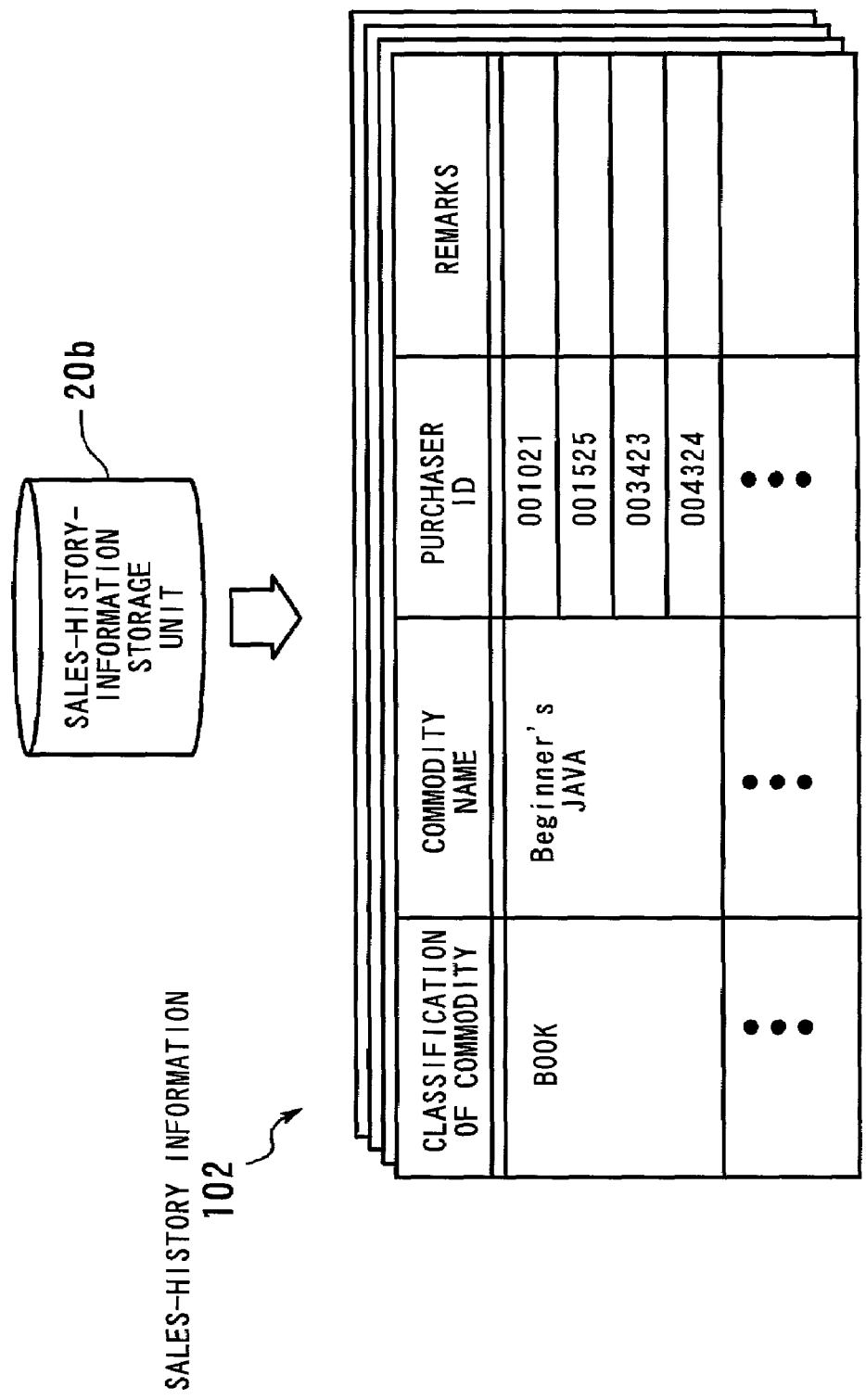
FIG. 6 is a diagram illustrating an example of a data structure of the sales-history information 102 stored in the sales-history-information storage unit 20b.

FIG. 6 is a diagram illustrating an example of a data structure of the sales-history information 102 stored in the sales-history-information storage unit 20b.

As illustrated in FIG. 6, the sales-history information 102 is stored in a plurality of tables separately provided for the respective commodities. Each table contains information items "CLASSIFICATION OF COMMODITY," "COMMODITY NAME," "PURCHASER ID," and "REMARKS."

The table illustrated in FIG. 6 includes "book" as the information item "CLASSIFICATION OF COMMODITY," "Beginner's JAVA" as the information item "COMMODITY NAME," and "001021," "001525," "003423," and "004324" as the information items "PURCHASER ID."

The sales-history information 102 in the sales-history-information storage unit 20b is updated based on information which is on-line supplied when a new user makes a contract for use of the commodity-information provision system 10, or other information supplied from users.

4.2.6 Commodity-Comparison Information

FIG. 7 is a diagram illustrating an example of a data structure of the commodity-comparison information 103 stored in the commodity-comparison-information storage unit 20d.

As illustrated in FIG. 7, the commodity-comparison information 103 is stored in a plurality of tables separately provided for the respective commodities. Each table contains information items "USER ID," "DATE AND TIME OF EVALUATION," "EVALUATION CRITERION," "NAME OF SUPERIOR COMMODITY," "NAME OF INFERIOR COMMODITY," "COMMENT ON SUPERIOR COMMODITY," and "COMMENT ON INFERIOR COMMODITY." The information item "USER ID" indicates an identification number of a user who provides information on commodity comparison to the commodity-information provision system 10. The information item "NAME OF SUPERIOR COMMODITY" indicates a name of a commodity which is determined to be superior as a result of comparison, and the information item "NAME OF INFERIOR COMMODITY" indicates a name of a commodity which is determined to be inferior as a result of the comparison. The information item "COMMENT ON SUPERIOR COMMODITY" indicates a comment on the commodity which is determined to be superior, and the information item "COMMENT ON INFERIOR COMMODITY" indicates a comment on the commodity which is determined to be inferior.

In the example of FIG. 7, the commodity-comparison information 103 includes "002362," "003652," "001021," and "002298" as "USER ID." In the table illustrated in FIG. 7, the information items "DATE AND TIME OF EVALUATION," "EVALUATION CRITERION," "NAME OF SUPERIOR COMMODITY," "NAME OF INFERIOR COMMODITY," and "COMMENT ON SUPERIOR COMMODITY" corresponding to the USER ID "002362" are respectively "2001.4.17," "understandability," "Beginner's JAVA," "Introduction to JAVA," and "Thorough explanations are provided."; the information items "DATE AND TIME OF EVALUATION," "EVALUATION CRITERION," "NAME OF SUPERIOR COMMODITY," and "NAME OF INFERIOR COMMODITY" corresponding to the USER ID "003652" are respectively "2001.4.18," "richness in content," "Complete Explanation of JAVA," and "Understandable JAVA"; the information items "DATE AND TIME OF EVALUATION," "EVALUATION CRITERION," "NAME OF SUPERIOR COMMODITY," "NAME OF INFERIOR COMMODITY," and "COMMENT ON SUPERIOR COMMODITY" corresponding to the USER ID "001021" are respectively "2001.4.21," "understandability," "Understandable JAVA," "Introduction to JAVA," and "Many illustrations are included."; and the information items "DATE AND TIME OF EVALUATION," "EVALUATION CRITERION," "NAME OF SUPERIOR COMMODITY," "NAME OF INFERIOR COMMODITY," and "COMMENT ON INFERIOR COMMODITY" corresponding to the USER ID "002298" are respectively "2001.4.23," "understandability," "Beginner's JAVA," "Understandable JAVA," and "Too many technical terms are used."

The commodity-comparison information 103 in the commodity-comparison-information storage unit 20d is updated based on information supplied from a new user who makes a contract for use of the commodity-information provision system 10.

4.2.7 Commodity-List Information

Figure 8:
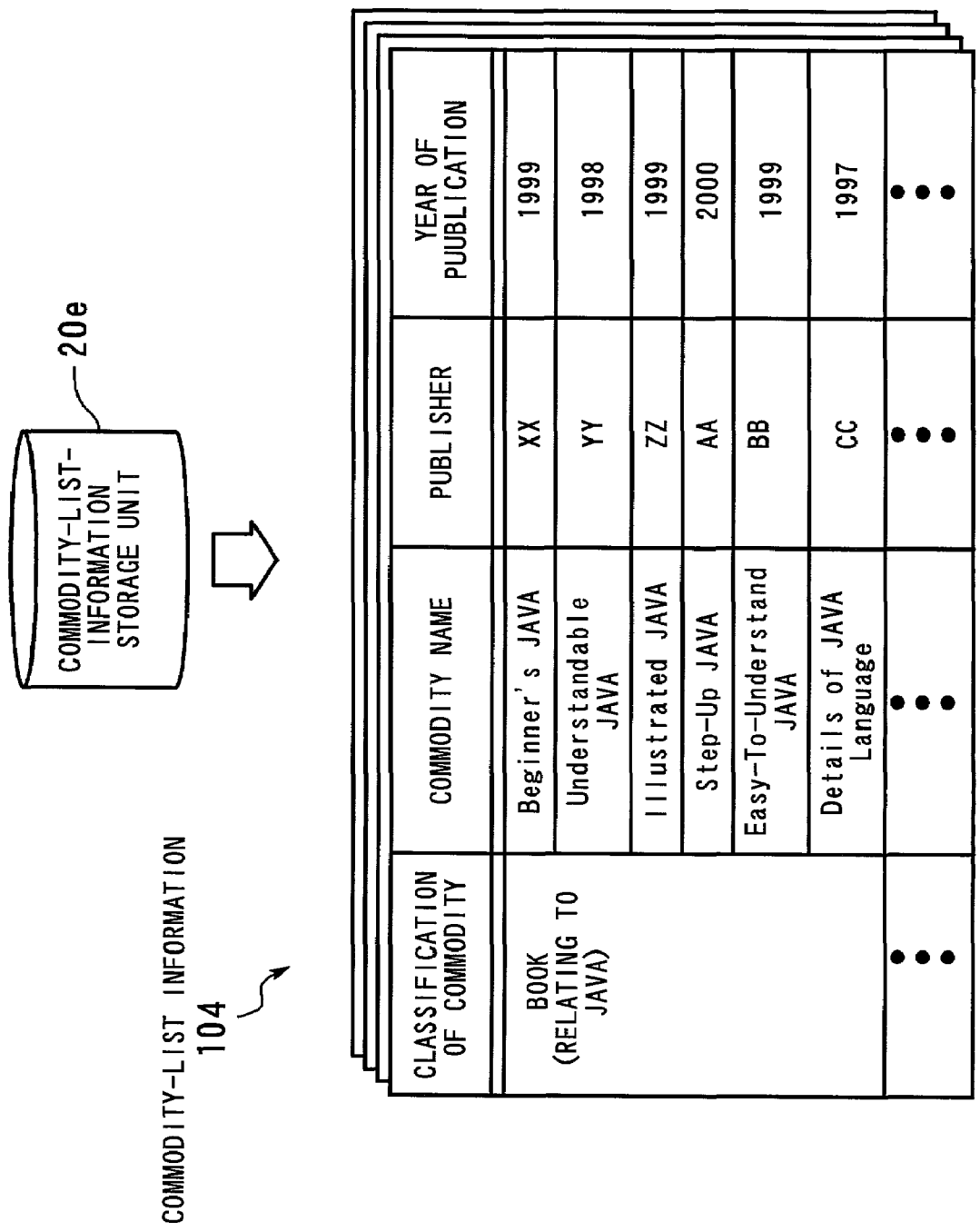
FIG. 8 is a diagram illustrating an example of a data structure of the commodity-list information 104 stored in the commodity-list-information storage unit 20e.

FIG. 8 is a diagram illustrating an example of a data structure of the commodity-list information 104 stored in the commodity-list-information storage unit 20e.

As illustrated in FIG. 8, the commodity-list information 104 is stored in a plurality of tables separately provided for the respective classifications of commodities. Each table contains information items "CLASSIFICATION OF COMMODITY," "COMMODITY NAME," "PUBLISHER," and "YEAR OF PUBLICATION." The table illustrated in FIG. 8 includes "book (relating to JAVA)" as the information item "CLASSIFICATION OF COMMODITY," and "Beginner's JAVA," "Understandable JAVA," "Illustrated JAVA," "Step-Up JAVA," "Easy-To-Understand JAVA," and "Details of JAVA Language" as the information items "COMMODITY NAME" corresponding to the CLASSIFICATION OF COMMODITY "book (relating to JAVA)."

The table illustrated in FIG. 8 further includes as the information items "PUBLISHER" and "YEAR OF PUBLICATION": "XX" and "1999" corresponding to the COMMODITY NAME "Beginner's JAVA"; "YY" and "1998" corresponding to the COMMODITY NAME "Understandable JAVA", "ZZ" and "1999" corresponding to the COMMODITY NAME "Illustrated JAVA"; "AA" and "2000" corresponding to the COMMODITY NAME "Step-Up JAVA"; "BB" and "1999" corresponding to the COMMODITY NAME "Easy-To-Understand JAVA"; and "CC" and "1997" corresponding to the COMMODITY NAME "Details of JAVA Language."

The commodity-list information 104 in the commodity-list-information storage unit 20e is updated based on information which is supplied from, for example, bookstores and the like.

4.2.8 Evaluation-Criterion-Option Items

Figure 9:
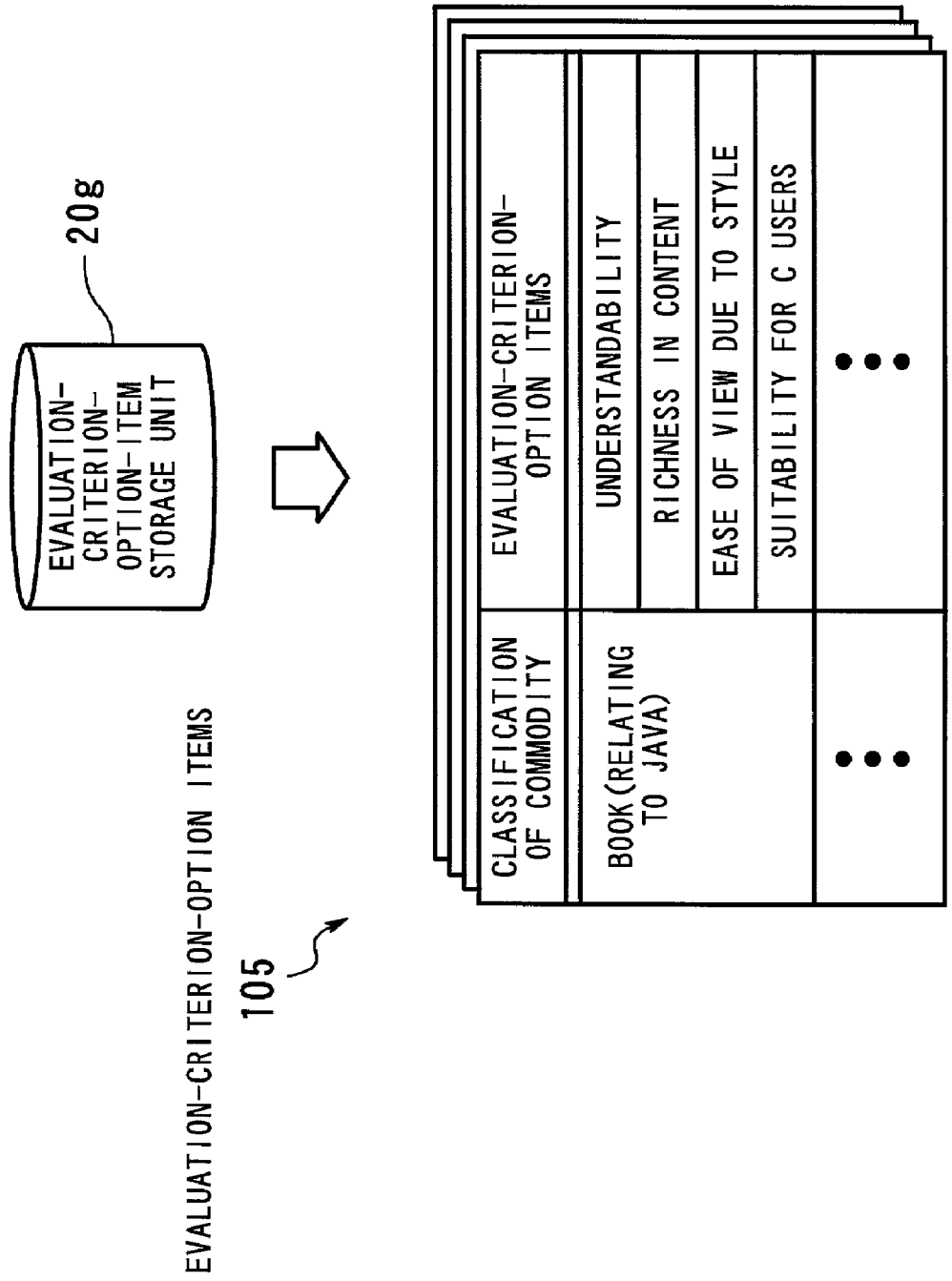
FIG. 9 is a diagram illustrating an example of a data structure of the evaluation-criterion-option items 105 stored in the evaluation-criterion-option-item storage unit 20g.

FIG. 9 is a diagram illustrating an example of a data structure of the evaluation-criterion-option items 105 stored in the evaluation-criterion-option-item storage unit 20g.

As illustrated in FIG. 9, the evaluation-criterion-option items 105 is stored in a plurality of tables separately provided for the respective classifications of commodities. Each table contains information items "CLASSIFICATION OF COMMODITY" and "EVALUATION-CRITERION-OPTION ITEM." The table illustrated in FIG. 9 includes "book (relating to JAVA)" as the information item "CLASSIFICATION OF COMMODITY"; and "understandability," "richness in content," "ease of view due to style," and "suitability for C users" as the information item "EVALUATION-CRITERION-OPTION ITEM" corresponding to the CLASSIFICATION OF COMMODITY "book (relating to JAVA)."

The evaluation-criterion-option items 105 in the commodity-list-information storage unit 20e is updated, for example, when a service provider of the commodity-information provision system 10 updates data in the commodity-information provision system 10.

4.2.9 Hardware Construction of Terminals

Figure 10:
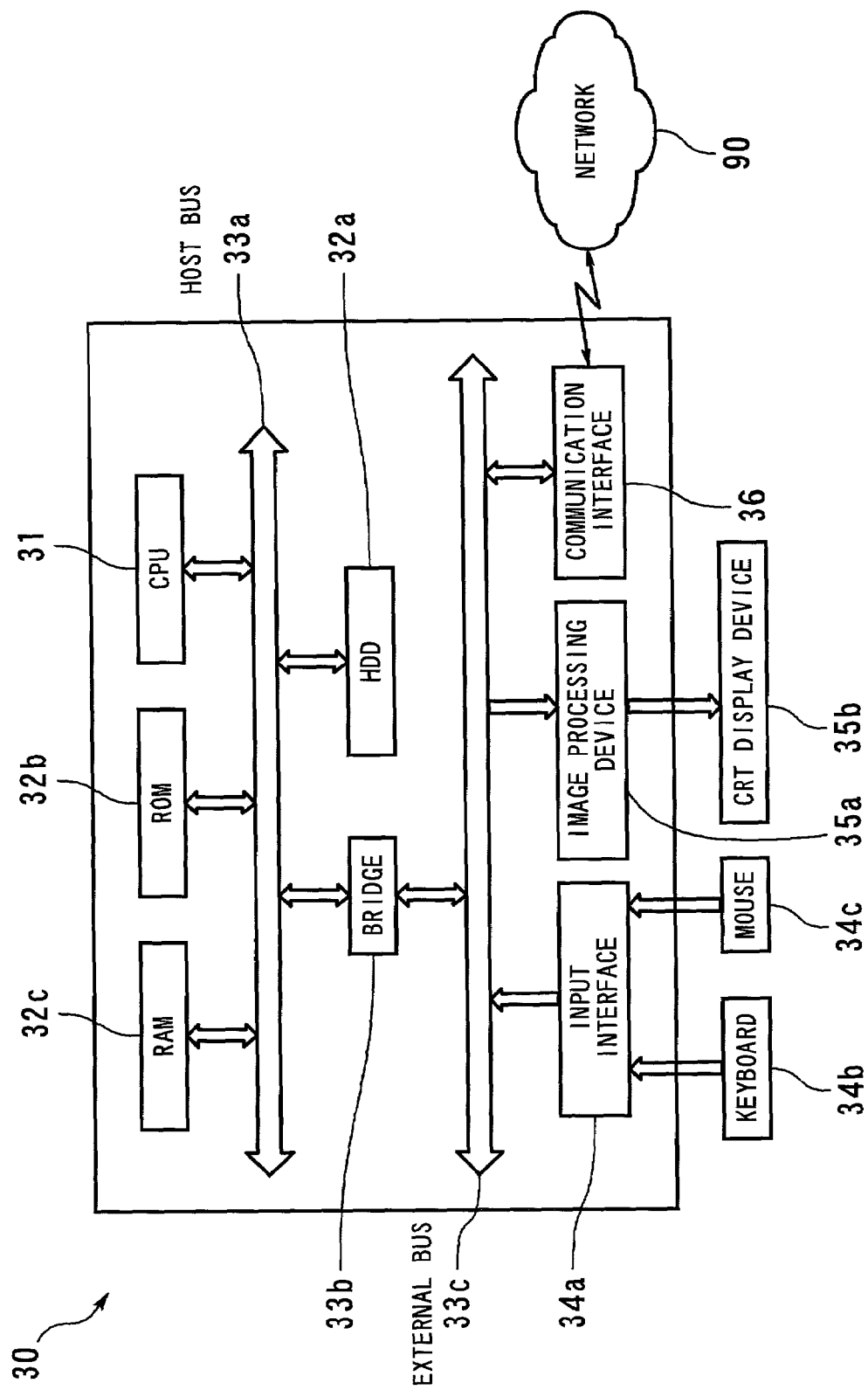
FIG. 10 is a diagram illustrating an example of a hardware construction of the terminal 30 in the configuration of FIG. 2.

FIG. 10 is a diagram illustrating an example of a hardware construction of the terminal 30 in the configuration of FIG.

2. As mentioned before, the terminal 30 corresponds to the at least one first terminal in the second to fourth, sixth, and seventh embodiments of the present invention. As illustrated in FIG. 10, the terminal 30 comprises a CPU (central processing unit) 31, an HDD (hard disk drive) 32a, a ROM (read-only memory) 32b, a RAM (random access memory) 32c, a host bus 33a, a bridge 33b, an external bus 33c, an input interface 34a, a keyboard 34b, a mouse 34c, an image processing device 35a, a CRT (cathode ray tube) display device 35b, and a communication interface 36.

The CPU 31, the HDD 32a, the ROM 32b, and the RAM 32c are connected to the host bus 33a so that information can be transferred between the CPU 31, the HDD 32a, the ROM 32b, and the RAM 32c. The input interface 34a, the image processing device 35a, and the communication interface 36 are connected to the external bus 33c. The host bus 33a is connected to the external bus 33c through the bridge 33b so that information can be transferred between the devices connected to the host bus 33a and the devices connected to the external bus 33c. The keyboard 34b and the mouse 34c are connected to the input interface 34a, and the CRT display device 35b is connected to the image processing device 35a.

For example, the HDD 32a may be realized by an unremovable hard disk drive, the ROM 32b may be realized by a mask ROM, and the RAM 32c may be realized by a DRAM (dynamic random access memory). The HDD 32a, the ROM 32b, and the RAM 32c store various programs including an operating system, application programs, and the like, and various types of data which are necessary for execution of the programs. The CPU 31 includes at least one processor as a main constituent, and executes the above programs stored in the ROM 32b and the RAM 32c in synchronization with a clock signal, which is supplied from an oscillator (not shown).

The host bus 33a and the external bus 33c are each an information transfer path constituted by a microprocessor, a memory, and the like. The bridge 33b relays data between the host bus 33a and the external bus 33c. The input interface 34a relays input signals from the keyboard 34b and the mouse 34c to the external bus 33c.

The image processing device 35a generates an analog signal corresponding to analog or digital image data supplied from the external bus 33c, under control of the CPU 31, and supplies the generated analog signal to the CRT display device 35b. The CRT display device 35b displays an image in accordance with the analog signal supplied from the image processing device 35a.

The communication interface 36 functions as an interface between the commodity-information provision apparatus 20 and the network 90 so that the commodity-information provision apparatus 20 can communicate with the terminals through the network 90. For example, the communication interface 36 complies with an appropriate one of the IEEE standards.

In addition, the other terminals 40, 50, 60, 70, and 80 in the configuration of FIG. 2 have the same hardware construction as the terminal 30.

4.2.10 Functions of Terminal 30

Figure 11:
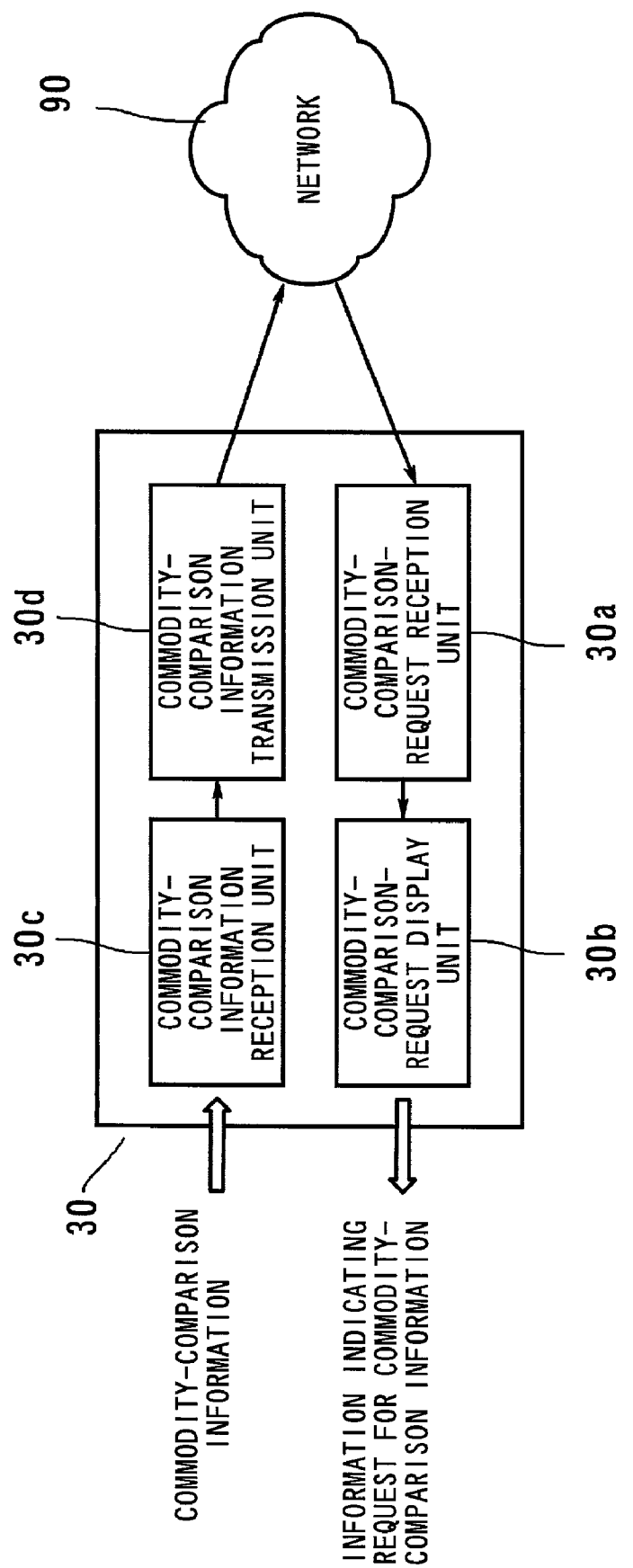
FIG. 11 is a block diagram illustrating the functions of the terminal 30 in the configuration of FIG. 2.

FIG. 11 is a block diagram illustrating the functions of the terminal 30 in the configuration of FIG. 2. As mentioned before, the terminal 30 corresponds to the aforementioned at least one first terminal in the second to fourth, sixth, and seventh aspects of the present invention.

The terminal 30 comprises a commodity-comparison-request reception unit 30a, a commodity-comparison-request display unit 30b, a commodity-comparison information reception unit 30c, and a commodity-comparison information transmission unit 30d.

The commodity-comparison-request reception unit 30a receives information indicating a request for commodity-comparison information when the information indicating the request for commodity-comparison information is transmitted from the commodity-information provision apparatus 20 through the network 90. The information indicating a request for commodity-comparison information is arranged to prompt a user of the terminal 30 to input commodity-comparison information. The commodity-comparison-request display unit 30b displays the information indicating the request for commodity-comparison information when the commodity-comparison-request reception unit 30a receives the information indicating the request for commodity-comparison information. The commodity-comparison information reception unit 30c receives commodity-comparison information, which is input into the terminal 30. The commodity-comparison information transmission unit 30d transmits the commodity-comparison information received by the commodity-comparison information input unit 30c, to the commodity-information provision apparatus 20 through the network 90.

As illustrated in FIG. 11, the terminal 30 is arranged so that information can be exchanged between the commodity-comparison-request reception unit 30a and the commodity-comparison-request display unit 30b, and between the commodity-comparison information input unit 30c and the commodity-comparison information transmission unit 30d. In addition, the commodity-comparison-request reception unit 30a and the commodity-comparison information transmission unit 30d are each arranged to be able to communicate with the commodity-information provision apparatus 20 through the network 90.

Although not shown, the other terminals 40 and 50 in the configuration of FIG. 2 corresponding to the at least one first terminal in the second to fourth, sixth, and seventh aspects of the present invention have the same functions as the terminal 30.

4.2.11 Functions of Terminal 60

Figure 12:
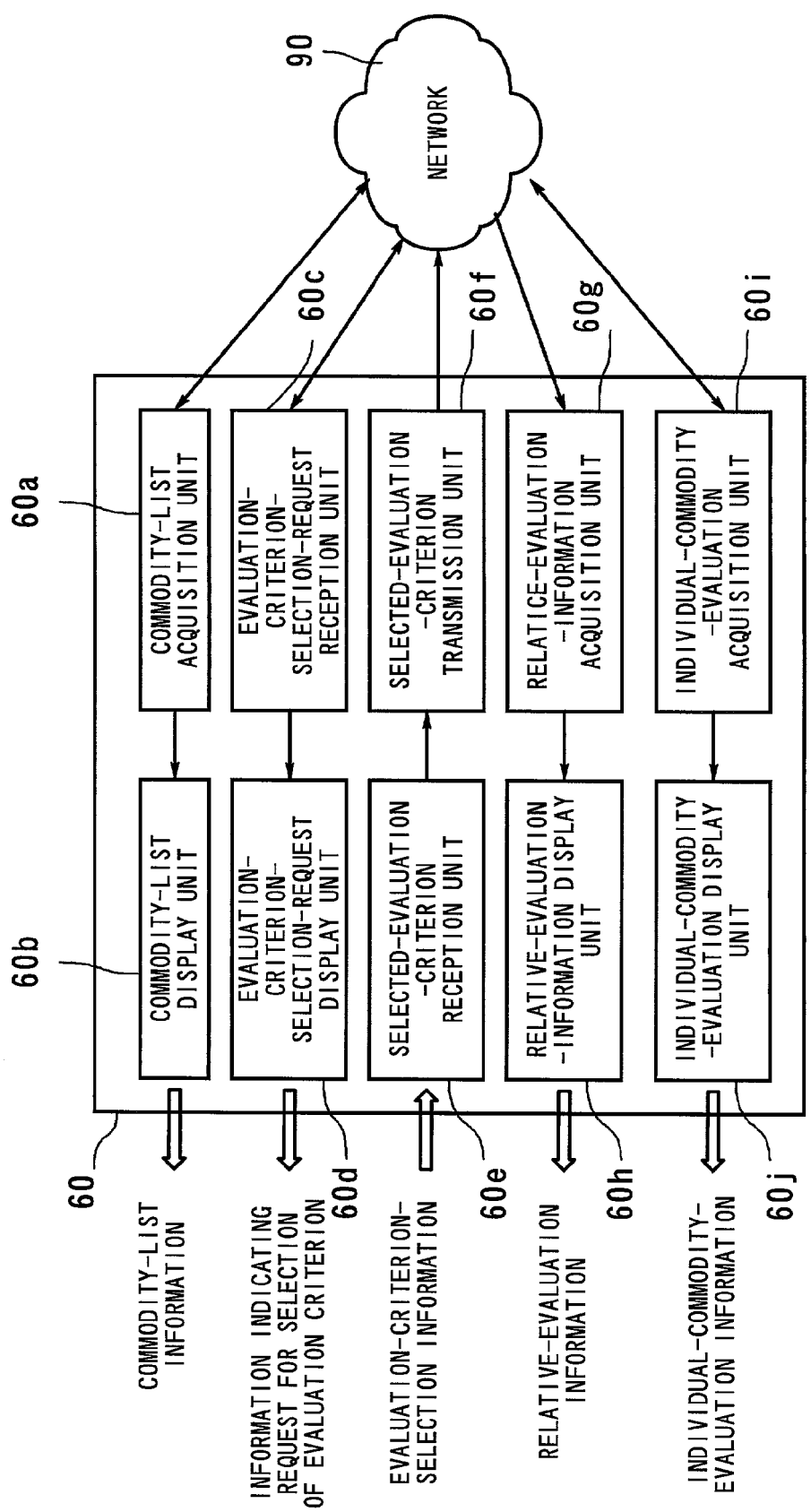
FIG. 12 is a block diagram illustrating the functions of the terminal 60 in the configuration of FIG. 2.

FIG. 12 is a block diagram illustrating the functions of the terminal 60 in the configuration of FIG. 2. As mentioned before, the terminal 60 corresponds to the aforementioned at least one second terminal in the second to fourth, sixth, and seventh aspects of the present invention and the aforementioned terminal in the fifth aspect of the present invention.

The terminal 60 comprises a commodity-list acquisition unit 60a, a commodity-list display unit 60b, an evaluation-criterion-selection-request reception unit 60c, an evaluation-criterion-selection-request display unit 60d, a selected-evaluation-criterion reception unit 60e, a selected-evaluation-criterion transmission unit 60f, a relative-evaluation-information acquisition unit 60g, a relative-evaluation-information display unit 60h, an individual-commodity-evaluation acquisition unit 60i, and an individual-commodity-evaluation display unit 60j.

The commodity-list acquisition unit 60a acquires commodity-list information which is transmitted from the commodity-information provision apparatus 20 through the network 90. The commodity-list display unit 60b displays the commodity-list information acquired by the commodity-list acquisition unit 60a.

The evaluation-criterion-selection-request reception unit 60c receives information indicating a request for selection of at least one of evaluation criteria when the information indicating the request for the selection is transmitted from the commodity-information provision apparatus 20 through the network 90. The information indicating a request for selection of at least one of evaluation criteria is arranged for prompting a user of the terminal 60 to select at least one of the evaluation criteria. The evaluation-criterion-selection-request display unit 60d displays the information indicating the request for selection when the information is received by the evaluation-criterion-selection-request reception unit 60c.

The selected-evaluation-criterion reception unit 60e receives information on selection of at least one of the evaluation criteria (i.e., information indicating at least one evaluation criterion selected by the user of the terminal 60). The selected-evaluation-criterion transmission unit 60f transmits the information on the selection received by the selected-evaluation-criterion reception unit 60e, to the commodity-information provision apparatus 20 through the network 90.

The relative-evaluation-information acquisition unit 60g acquires the aforementioned relative-evaluation information through the network 90, where the relative-evaluation information indicates at least one relative evaluation of commodities. As explained before with reference to FIG. 4, the relative-evaluation information is produced by the relative-evaluation-information production unit 20j in the commodity-information provision apparatus 20 by using the commodity-comparison map produced by the commodity-comparison-map production unit 20i, and transmitted by the relative-evaluation-information transmission unit 20k to the terminal 60 through the network 90. The relative-evaluation-information display unit 60h displays the relative-evaluation information acquired by the relative-evaluation-information acquisition unit 60g.

The individual-commodity-evaluation acquisition unit 60i acquires the aforementioned individual-commodity-evaluation information which is transmitted from the commodity-information provision apparatus 20 through the network 90, where the individual-commodity-evaluation information indicates at least one relative evaluation of each of at least one commodity which is specified, for example, by the user. As explained before with reference to FIG. 4, the individual-commodity-evaluation information is produced by the individual-commodity-evaluation production unit 20l in the commodity-information provision apparatus 20, and transmitted by the individual-commodity-evaluation provision unit 20m to the terminal 60 through the network 90. The individual-commodity-evaluation display unit 60j displays the individual-commodity-evaluation information acquired by the individual-commodity-evaluation acquisition unit 60i.

As illustrated in FIG. 12, the terminal 60 is arranged so that information can be exchanged between the commodity-list acquisition unit 60a and the commodity-list display unit 60b, between the evaluation-criterion-selection-request reception unit 60c and the evaluation-criterion-selection-request display unit 60d, between the selected-evaluation-criterion reception unit 60e and the selected-evaluation-criterion transmission unit 60f, between relative-evaluation-information acquisition unit 60g and the relative-evaluation-information display unit 60h, and between the individual-commodity-evaluation acquisition unit 60i and the individual-commodity-evaluation display unit 60j. In addition, the commodity-list acquisition unit 60a, the evaluation-criterion-selection-request reception unit 60c, the selected-evaluation-criterion transmission unit 60f, the relative-evaluation-information acquisition unit 60g, and the individual-commodity-evaluation acquisition unit 60i are each arranged to be able to communicate with the terminals through the network 90.

Although not shown, the other terminals 70 and 80 in the configuration of FIG. 2 corresponding to the aforementioned at least one second terminal in the second to fourth, sixth, and seventh aspects of the present invention and the aforementioned terminal in the fifth aspect of the present invention have the same functions as the terminal 60.

4.2.12 Operations of System 10

The operations of the commodity-information provision system 10 are explained below. The main operations of the commodity-information provision system 10 can be divided into first and second sequences of operations. The first sequence of operations corresponds to collection of the commodity-comparison information, and the second sequence of operations corresponds to provision of the relative-evaluation information to users by using the collected commodity-comparison information. Hereinbelow, the first sequence of the operations for collecting the commodity-comparison information is first explained, and thereafter the second sequence of the operations for providing the relative-evaluation information to users is explained.

4.2.12.1 Collection of Commodity-Comparison Information

Figure 13:
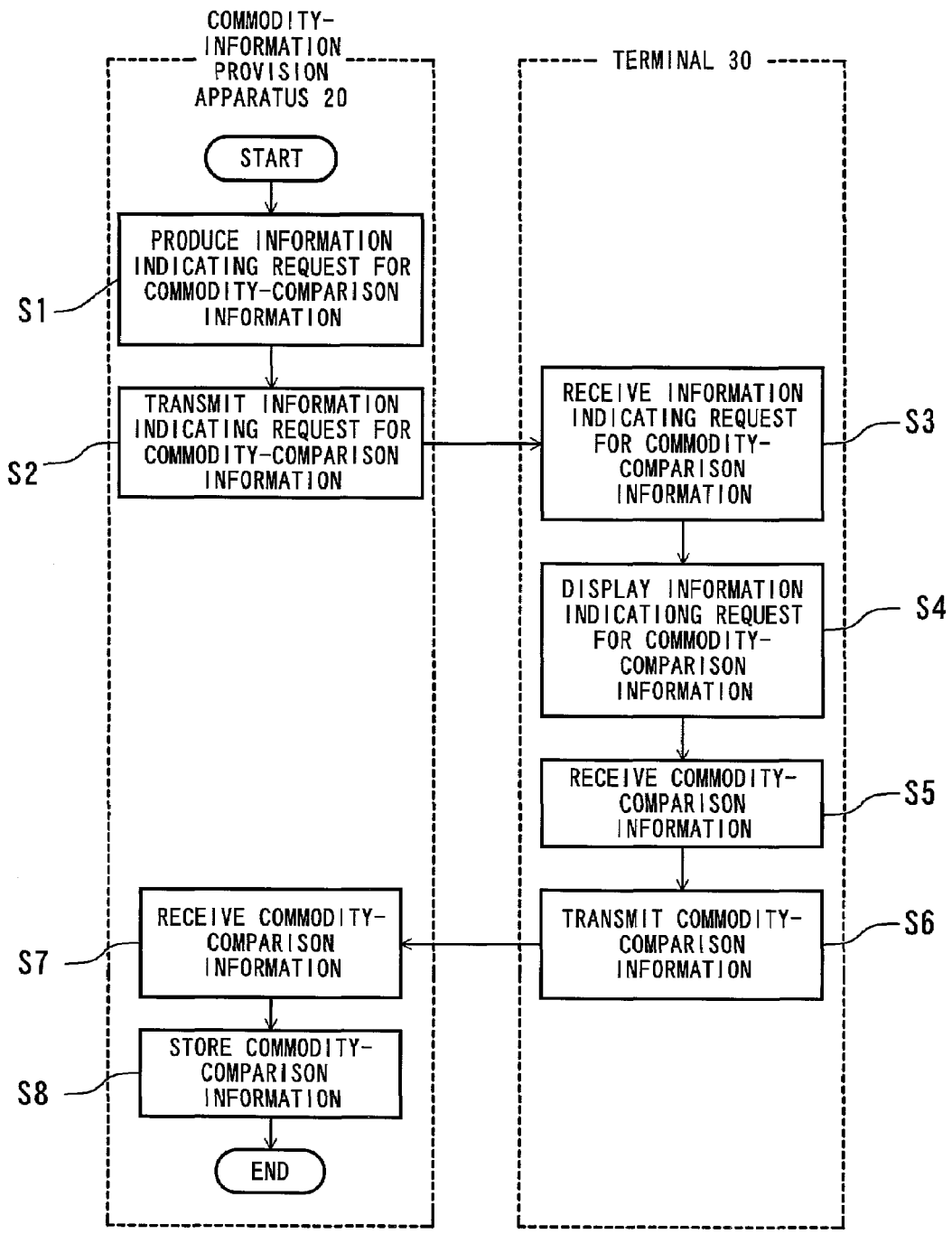
FIG. 13 is a flow diagram of an example of a sequence of operations performed in the commodity-information provision system 10 for collecting commodity-comparison information.

FIG. 13 is a flow diagram of an example of the first sequence of operations performed in the commodity-information provision system 10 for collecting commodity-comparison information.

In step S1, the commodity-comparison-information acquisition unit 20c in the commodity-information provision apparatus 20 produces the aforementioned information indicating a request for commodity-comparison information. As explained before, the information indicating the request for commodity-comparison information is produced so as to prompt a user of the terminal 30, 40, or 50 to input commodity-comparison information. For example, the information indicating the request for commodity-comparison information may be arranged to indicate the request for commodity-comparison information in a GUI (graphical user interface) environment or the like, and produced in accordance with a predetermined format which is stored in a storage device (e.g., the HDD 22a illustrated in FIG. 3).

Then, in step S2, the commodity-comparison-information acquisition unit 20c transmits the above information indicating the request for commodity-comparison information to at least one of the terminals 30, 40, and 50 through the network 90. The information indicating the request for commodity-comparison information may be transmitted to all of the terminals 30, 40, and 50 (i.e., all of the terminals corresponding to the aforementioned at least one first terminal in the second to fourth, sixth, and seventh aspects of the present invention), or at least one of the terminals 30, 40, and 50 used by at least one user which is specified based on a predetermined condition. For example, the information indicating the request for commodity-comparison information may be transmitted to only at least one of the terminals 30, 40, and 50 used by at least one user who has purchased at least one commodity and whose identification number is included in the sales-history information 102 stored in the sales-history-information storage unit 20b. The information indicating the request for commodity-comparison information can be transmitted by determining a user as a destination of the information indicating the request for commodity-comparison information, acquiring an address of the determined user from the personal information 101 stored in the personal-information storage unit 20a, and transmitting the information indicating the request for commodity-comparison information to the acquired address.

In step S3, the commodity-comparison-request reception unit 30a in the terminal 30 receives the information indicating the request for commodity-comparison information, which is transmitted as above from the commodity-information provision apparatus 20 through the network 90. Then, the commodity-comparison-request reception unit 30a transfers the received information indicating the request for commodity-comparison information, to the commodity-comparison-request display unit 30b.

In step S4, the commodity-comparison-request display unit 30b displays the transferred information indicating the request for commodity-comparison information. For example, the operation of the commodity-comparison-request display unit 30b is realized by generating an analog signal corresponding to the information indicating the request for commodity-comparison information, by the image processing device 35a (illustrated in FIG. 10), and supplying the generated analog signal to the CRT display device 35b so that the CRT display device 35b displays the information indicating the request for commodity-comparison information.

As displayed examples of the information indicating a request for commodity-comparison information, two commodity-comparison-input screens 111 and 112 are illustrated in FIGS. 14 and 15, respectively. The commodity-comparison-input screen 111 is a displayed example of the information indicating a request for commodity-comparison information in the case where the information indicating the request for commodity-comparison information is transmitted to all of the terminals 30, 40, and 50 regardless of whether or not the users of the terminals 30, 40, and 50 has purchased at least one commodity, and the commodity-comparison-input screen 112 is a displayed example of the information indicating a request for commodity-comparison information in the case where the information indicating the request for commodity-comparison information is transmitted to only at least one of the terminals 30, 40, and 50 which is used by at least one user who has purchased at least one commodity.

As illustrated in FIG. 14, the commodity-comparison-input screen 111 includes list boxes 111a to 111f in each of which information on a commodity under comparison can be input by a user, and text boxes 111g to 111l in each of which a comment on a commodity under comparison can be input by the user. The commodity-comparison-input screen 111 is divided into a plurality of portions corresponding to a plurality of evaluation criteria, which are understandability, richness in content, and another evaluation criterion in the example of FIG. 14. Each of the plurality of portions includes two of the list boxes 111a to 111f corresponding to two commodities which are compared, and two of the text boxes 111g to 111l corresponding to the two of the list boxes 111a to 111f.

On the other hand, as illustrated in FIG. 15, the commodity-comparison-input screen 112 includes list boxes 112a and 112b and text boxes 112e to 112h. The commodity-comparison-input screen 112 is divided into a plurality of portions corresponding to a plurality of evaluation criteria, which are understandability and richness in content in the example of FIG. 15. Each of the plurality of portions of the commodity-comparison-input screen 112 includes one of the list boxes 112a and 112b and two of the text boxes 112e to 112h. In each of the list boxes 112a and 112b, information on a first commodity which is compared with a second commodity which has been purchased by a user can be input by the user. The two of the text boxes 112e to 112h in each of the plurality of portions of the commodity-comparison-input screen 112 are respectively provided for inputting comments on the first and second commodities.

When the information indicating a request for commodity-comparison information is displayed as illustrated in FIG. 14 or 15, the operation goes to step S5 in FIG. 13. In step S5, the commodity-comparison information reception unit 30c in the terminal 30 receives commodity-comparison information, which is input into the terminal 30 by a user. That is, the user inputs the commodity-comparison information (e.g., appropriate information in each of the list boxes 111a to 111f or 112a and 112b and the text boxes 111g to 111l or 112e to 112h) based on experiences of the user by using the keyboard 34b and the mouse 34c (illustrated in FIG. 10).

For example, when the user compares books respectively having titles "Introduction to JAVA" and "Understandable JAVA," and determines that the book having the title "Understandable JAVA" is superior to the other book for the reason that the book having the title "Understandable JAVA" includes many illustrations, the user chooses the titles "Introduction to JAVA" and "Understandable JAVA" in the list boxes 111a and 111b in the commodity-comparison-input screen 111, respectively, and inputs a text indicating the above reason in the text box 111h in the commodity-comparison-input screen 111, as illustrated in FIG. 14.

On the other hand, when the user who has purchased a book having a title "Beginner's JAVA" compares the book having the title "Beginner's JAVA" with the book having the title "Understandable JAVA," and determines that the book having the title "Understandable JAVA" is inferior to the book having the title "Beginner's JAVA" for the reason that the book having the title "Understandable JAVA" includes too many technical terms, the user chooses the title "Understandable JAVA" in the list box 112a in the commodity-comparison-input screen 112, and inputs a text indicating the above reason for the inferiority in the text box 112e in the commodity-comparison-input screen 112, as illustrated in FIG. 15.

Alternatively, two commodities under comparison based on each of at least one evaluation criterion may be fixed in order to determine superiority or inferiority of a commodity to another commodity by vote. In this case, the commodity-information provision system 10 may be arranged to pay a reward (e.g., a cash reward, a token reward, or a discount coupon reward) for the input of commodity-comparison information. An equal reward may be paid to every user who inputs commodity-comparison information, or the amount of the reward paid to each user who inputs commodity-comparison information for a commodity on which only a small number of commodity-comparison information items are collected may be increased.

In addition, the commodity-comparison information collected by the commodity-information provision system 10 may include information other than the information on superiority or inferiority of a commodity. For example, the commodity-comparison information may include information on whether a commodity is innovative or conservative, or suitable for business use or family use.

When the commodity-comparison information is received by the commodity-comparison information reception unit 30c as described above, the operation goes to step S6 in FIG. 13. In step S6, the commodity-comparison information transmission unit 30d transmits the commodity-comparison information received by the commodity-comparison information reception unit 30c, through the network 90 to the commodity-information provision apparatus 20.

Specifically, the commodity-comparison information includes the contents of the list boxes 111a to 111f and the text boxes 111g to 111l in the commodity-comparison-input screen 111 or the list boxes 112a and 112b and the text boxes 112e to 112h in the commodity-comparison-input screen 112. The commodity-comparison information transmission unit 30d acquires an address of the commodity-information provision apparatus 20, and transmits the commodity-comparison information to the commodity-information provision apparatus 20 through the network 90 by using the acquired address.

In step S7, the commodity-comparison-information acquisition unit 20c in the commodity-information provision apparatus 20 acquires the commodity-comparison information transmitted through the network 90. Then, in step S8, the acquired commodity-comparison information is stored in the commodity-comparison-information storage unit 20d so that the commodity-comparison information 103 is updated with the acquired commodity-comparison information. That is, the information items "USER ID," "DATE AND TIME OF EVALUATION," "EVALUATION CRITERION," "NAME OF SUPERIOR COMMODITY," "NAME OF INFERIOR COMMODITY," "COMMENT ON SUPERIOR COMMODITY," and "COMMENT ON INFERIOR COMMODITY" in the commodity-comparison information 103 are updated based on the identification number of the user who inputs the commodity-comparison information, the date and time of the input of the commodity-comparison (as illustrated in FIG. 7) information, at least one evaluation criterion based on which the commodity-comparison information is produced, at least one name of at least one commodity under comparison, comments, and the like, which are included in the acquired commodity-comparison information. Thus, commodity-comparison information items input by users are accumulated one by one in the commodity-comparison information 103 in the commodity-comparison-information storage unit 20d.

4.2.12.2 Provision of Relative-Evaluation Information

FIG. 16 is a flow diagram of an example of the aforementioned second sequence of operations performed in the commodity-information provision system 10 for providing information on at least one relative evaluation to purchasers.

In step S11, the aforementioned commodity-list information is displayed on, for example, the terminal 60 (i.e., one of the terminals corresponding to the aforementioned at least one second terminal in the second to fourth, sixth, and seventh aspects of the present invention and the aforementioned terminal in the fifth aspect of the present invention) in the form of a commodity-list screen. Details of operations performed in step S11 are explained later with reference to FIG. 17.

Then, in step S12, it is determined whether or not a user of the terminal 60 requests relative-evaluation information for a commodity. When yes is determined in step S12, the operation goes to step S13. When no is determined in step S12, the operation goes to step S14.

In step S13, the relative-evaluation information is provided by the commodity-information provision apparatus 20 to the terminal 60. Details of operations performed in step S13 are explained later with reference to FIGS. 19 to 21.

In step S14, processing for purchasing a commodity specified by the user is performed. For example, on-line purchase processing is performed by using the Internet or the like.

FIG. 17 is a flow diagram of an example of a detailed sequence of operations realizing the operation in step S11 in the sequence of FIG. 16.

In step S21, the commodity-list acquisition unit 60a in the terminal 60 receives from the user of the terminal 60 information indicating a request for acquisition of commodity-list information from the commodity-information provision apparatus 20. Generally, the information indicating a request for acquisition of commodity-list information may be input by a user by using the keyboard or the like which is provided with the terminal 60. For example, a certain classification of commodities is specified when the information indicating a request for acquisition of commodity-list information is input by the user.

Then, in step S22, the commodity-list acquisition unit 60a transmits the information indicating the request for acquisition of commodity-list information to the commodity-information provision apparatus 20 through the network 90 by using the address of the commodity-information provision apparatus 20.

In step S23, the commodity-list-information provision unit 20f in the commodity-information provision apparatus 20 receives the information indicating the request for acquisition of commodity-list information. Then, in step S24, the commodity-list-information provision unit 20f extracts from the commodity-list-information storage unit 20e commodity-list information corresponding to the classification of commodities specified in the information indicating the request for acquisition of commodity-list information. Next, in step S25, the commodity-list-information provision unit 20f transmits the commodity-list information extracted from the commodity-list-information storage unit 20e, through the network 90 to the terminal 60.

In step S26, the commodity-list acquisition unit 60a in the terminal 60 receives the commodity-list information transmitted from the commodity-information provision apparatus 20. Then, the commodity-list information is transferred to the commodity-list display unit 60b, which displays the commodity-list information in step S27, for example, as illustrated in FIG. 18.

FIG. 18 is a diagram illustrating an example of a commodity-list display screen 113 displayed by the commodity-list display unit 60b in the terminal 60. In the example of FIG. 18, the classification of commodities specified in the information indicating a request for acquisition of commodity-list information is "books relating to JAVA."

The commodity-list display screen 113 includes an evaluation display button 133a, a commodity selection area 133b, and a commodity purchase button 133c. The evaluation display button 133a is clicked when the user requests relative-evaluation information on a commodity. The commodity selection area 133b in the illustrated example includes the names of commodities (books) "Beginner's JAVA," "Understandable JAVA," "Illustrated JAVA," "Easy-To-Understand JAVA," and "Details of JAVA Language," the names of publishers "XX," "YY," "ZZ," "AA," "BB," and "CC," the publication years "1999," "1998," "1999," "2000," "1999," and "1997." The commodity purchase button 133c is clicked when the user requests commodity purchase processing.

When the commodity-list display screen 113 is displayed, the user determines whether to request provision of relative-evaluation information or purchase at least one commodity chosen from the commodities the names of which are indicated in the commodity-list display screen 113.

When the user determines to purchase at least one commodity, the user first specifies at least one of the commodities in the commodity selection area 133b (for example, by clicking at least one name of the least one commodity), and clicks the commodity purchase button 133c. Then, the processing in step S14 in the sequence of FIG. 16 is performed.

When the user requests provision of relative-evaluation information, the user clicks the evaluation display button 133a. Then, the processing in step S13 in the sequence of FIG. 16 is performed.

FIGS. 19 to 21 are flow diagrams indicating an example of a detailed sequence of operations realizing the operation in step S13 in the sequence of FIG. 16.

In step S31 in FIG. 19, the evaluation-criterion-selection-request reception unit 60c in the terminal 60 receives a request for relative-evaluation information, which is input by the user of the terminal 60 into the terminal 60. The request for relative-evaluation information is input by specifying at least one of the commodities in the commodity selection area 133b (for example, by clicking at least one name of the least one commodity), and clicking the commodity purchase button 133c. When the evaluation-criterion-selection-request reception unit 60c receives the request for relative-evaluation information, information indicating the request for relative-evaluation information is generated and is then transmitted through the network 90 to the commodity-information provision apparatus 20.

In step S32, the selected-evaluation-criterion acquisition unit 20h in the commodity-information provision apparatus 20 receives the information indicating the request for relative-evaluation information, which is transmitted from the terminal 60 through the network 90. Then, in step S33, the selected-evaluation-criterion acquisition unit 20h produces the aforementioned information indicating a request for selection of at least one of evaluation criteria. As mentioned before, the information indicating a request for selection of at least one of evaluation criteria is produced for prompting the user of the terminal 60 to select at least one of the evaluation criteria, and may be arranged to indicate the request for the commodity-comparison information in a GUI (graphical user interface) environment or the like. In addition, the information indicating the request for selection of at least one of evaluation criteria is produced by extracting the evaluation-criterion-option items 105 stored in the evaluation-criterion-option-item storage unit 20g, and processing the extracted evaluation-criterion-option items 105 into a format suitable for selection input by the user.

When the information indicating the request for selection of at least one of evaluation criteria is produced as above, in step S34, the selected-evaluation-criterion acquisition unit 20h transmits the information indicating the request for selection of at least one of evaluation criteria, to the terminal 60 through the network 90.

In step S35, the evaluation-criterion-selection-request reception unit 60c in the terminal 60 receives the information indicating the request for selection of at least one of evaluation criteria, which is transmitted from the commodity-information provision apparatus 20 through the network 90. The information indicating the request for selection of at least one of evaluation criteria is then transferred to the evaluation-criterion-selection-request display unit 60d, which displays the information indicating the request for selection of at least one of evaluation criteria in step S36.

FIG. 22 is a diagram illustrating an example of an evaluation-criterion-selection screen 114 displayed by the evaluation-criterion-selection-request display unit 60d in the terminal 60. The evaluation-criterion-selection screen 114 is an example of the information indicating a request for selection of at least one of evaluation criteria, which is displayed by the evaluation-criterion-selection-request display unit 60d. The evaluation-criterion-selection screen 114 includes an evaluation-criterion selection area 114a and a confirm button 114b. The evaluation-criterion selection area 114a in the illustrated example includes evaluation-criterion selection items "understandability," "richness in content," "ease of view due to style," and "suitability for C users." The confirm button 114b is clicked when the user confirms at least one of the evaluation-criterion-option items selected in the evaluation-criterion selection area 114a.

When the information indicating the request for selection of at least one of evaluation criteria is displayed as above, the operation goes to step S37 in FIG. 20. In step S37, the selected-evaluation-criterion reception unit 60e in the terminal 60 receives evaluation-criterion-selection information, which is input by the user into the terminal 60. The user can input the evaluation-criterion-selection information by using the evaluation-criterion-selection screen 114 illustrated in FIG. 22. For example, when the user wishes to obtain relative-evaluation information on commodities based on the evaluation criteria "understandability" and "richness in content," the user clicks the indications of the evaluation criteria "understandability" and "richness in content" in the evaluation-criterion selection area 114a and subsequently the confirm button 114b. Thus, the information that relative-evaluation information on commodities based on the evaluation criteria "understandability" and "richness in content" is requested is input as the evaluation-criterion-selection information. Then, the evaluation-criterion-selection information is transferred to the selected-evaluation-criterion transmission unit 60f, which transmits the evaluation-criterion-selection information to the commodity-information provision apparatus 20 through the network 90 in step S38.

In step S39, the evaluation-criterion-selection information transmitted from the terminal 60 through the network 90 is received by the selected-evaluation-criterion acquisition unit 20h in the commodity-information provision apparatus 20, and is then transferred to the commodity-comparison-map production unit 20i. Then, in step S40, by using the commodity-comparison information stored in the commodity-comparison-information storage unit 20d, the commodity-comparison-map production unit 20i produces a commodity-comparison map which visually indicates at least one relationship between commodities in such a manner that at least one evaluation criterion used in evaluation of commodities respectively corresponds to at least one coordinate axis in the commodity-comparison map. In the production of the commodity-comparison map, the evaluation-criterion-selection information received by the selected-evaluation-criterion acquisition unit 20h is used as well as the commodity-comparison information stored in the commodity-comparison-information storage unit 20d. Details of the operation of producing the commodity-comparison map are explained later.

The commodity-comparison map produced as above is then transferred to the relative-evaluation-information production unit 20j, and in step S41, the relative-evaluation-information production unit 20j produces relative-evaluation information which indicates at least one relative evaluation of commodities, by using the commodity-comparison map produced by the commodity-comparison-map production unit 20i. The relative-evaluation information is information arranged for display of the commodity-comparison map and input of information in a GUI (graphical user interface) environment or the like on the terminal 60 (corresponding to the aforementioned at least one second terminal in the second to fourth, sixth, and seventh aspects of the present invention and the aforementioned terminal in the fifth aspect of the present invention). The relative-evaluation information produced by the relative-evaluation-information production unit 20j is then transferred to the relative-evaluation-information transmission unit 20k, which transmits the relative-evaluation information to the terminal 60 through the network 90 in step S42.

In step S43, the relative-evaluation information transmitted from the commodity-information provision apparatus 20 is received by the relative-evaluation-information acquisition unit 60g in the terminal 60, and is then transferred to the relative-evaluation-information display unit 60h, which displays the relative-evaluation information in step S44.

FIG. 23 is a diagram illustrating an example of a relative-evaluation display screen 115 displayed by the relative-evaluation display unit 60h in the terminal 60. The relative-evaluation display screen 115 is an example of the relative-evaluation information displayed by the relative-evaluation display unit 60h.

The relative-evaluation display screen 115 in the example of FIG. 23 includes a commodity-comparison map 115a, a confirm button 115b, and an evaluation-criterion selection button 115c. The commodity-comparison map 115a is the commodity-comparison map generated by the commodity-comparison-map production unit 20i in step S40. The confirm button 115b is clicked by the user when the user confirms at least one commodity on which individual-commodity-evaluation information is to be displayed. The evaluation-criterion selection button 115c is clicked by the user when the user wishes to reselect at least one evaluation criterion.

As illustrated in FIG. 23, relationships between commodities are visually indicated in the commodity-comparison map 115a in which the evaluation criteria used in evaluations of the commodities correspond to the coordinate axes, respectively. In the example of FIG. 23, the commodities are books, the ordinate corresponds to a degree of understandability, and the abscissa corresponds to a degree of richness in the contents of each book. Thus, the evaluations of the commodities (with regard to understandability and richness in their contents) are indicated by the locations (coordinates) of the indications (commodity-indication icons) of the commodities on the commodity-comparison map 115a.

In the commodity-comparison map 115a, the respective commodities are indicated by commodity-indication icons 115aa to 115ah, and at least one relationship between the commodities (the at least one relative evaluation of the commodities) can be recognized based on the relative locations of the commodity-indication icons 115aa to 115ah. For example, the commodity-indication icon 115aa representing the book A is located to the upper right of the commodity-indication icon 115ad representing the book D, where the horizontal direction corresponds to the degree of understandability and the vertical direction corresponds to the degree of richness in content. That is, the relative locations of the commodity-indication icons 115aa and 115ad respectively representing the books A and D indicate that the book A has more understandable and richer contents than the book D.

In addition, each line having an arrow in the commodity-comparison map 115a indicates that there is a commodity-comparison information item which indicates a result of comparison between commodities connected with the line, where the arrow points to a superior one of the commodities. For example, between the books B and D, there are two lines each representing a commodity-comparison information item using the evaluation criterion "understandability" and a line representing a commodity-comparison information item using the evaluation criterion "richness in content," where each of the two lines has an arrow pointing to the book B and the other line has an arrow pointing to the book D. That is, the relative locations of the commodity-indication icons 115ab and 115ad respectively representing the books B and D indicate that the book B is superior to the book D in understandability, and the book D is superior to the book B in richness in content.

When the relative-evaluation information is displayed as above, the operation goes to step S45 in FIG. 20. The user determines whether the user acquires individual-commodity-evaluation information or changes the evaluation criteria in the commodity-comparison map 115a. When the user wishes to acquire individual-commodity-evaluation information, the user clicks at least one of the commodity-indication icons 115aa to 115ah in the commodity-comparison map 115a corresponding to at least one commodity on which the user wishes to acquire individual-commodity-evaluation information, and subsequently clicks the confirm button 115b. In this case, the operation goes to step S46. On the other hand, when the user wishes to changes the evaluation criteria in the commodity-comparison map 115a, the user clicks the evaluation-criterion selection button 115c. In this case, the operation goes to step S37.

In step S46, for example, the individual-commodity-evaluation acquisition unit 60i in the terminal 60 receives a request for the individual-commodity-evaluation information, which is input into the terminal 60 by clicking the at least one of the commodity-indication icons 115aa to 115ah and the confirm button 115b in the commodity-comparison map 115a in step S45 as mentioned above. Then, the individual-commodity-evaluation acquisition unit 60i generates information indicating the request for the individual-commodity-evaluation information, which includes information indicating the at least one commodity (e.g., the book D) on which the user requests individual-commodity-evaluation information. Next, the individual-commodity-evaluation acquisition unit 60i transmits the information indicating the request for the individual-commodity-evaluation information to the commodity-information provision apparatus 20 through the network 90 in step S47.

In step S48, the information indicating the request for the individual-commodity-evaluation information, which is transmitted from the terminal 60 through the network 90, is received by the individual-commodity-evaluation provision unit 20m in the commodity-information provision apparatus 20, and is then transferred to the individual-commodity-evaluation production unit 20l.

In step S49, the individual-commodity-evaluation production unit 20l produces individual-commodity-evaluation information. That is, the individual-commodity-evaluation production unit 20l extracts from the commodity-comparison-information storage unit 20d commodity-comparison information relating to the at least one commodity (e.g., the book D) on which the user requests individual-commodity-evaluation information. In the extraction, the aforementioned information indicating the at least one commodity (e.g., the book D) on which the user requests individual-commodity-evaluation information is used as a search key. Then, the individual-commodity-evaluation production unit 20l processes the extracted commodity-comparison information so as to produce the individual-commodity-evaluation information. For example, when the book D is selected as a commodity on which the user requests individualcommodity-evaluation information, the individual-commodity-evaluation production unit 20*l* extracts commodity-comparison information on comparison between the book D and other commodities (including information and comments on the commodities in comparison with the book D and the like) from the commodity-comparison-information storage unit 20*d*, and generates the requested individual-commodity-evaluation information, which is arranged for display of the extracted commodity-comparison information on the terminal 60.

Next, in step S50, the individual-commodity-evaluation provision unit 20*m* transmits the individual-commodity-evaluation information generated in step S49 to the terminal 60 through the network 90.

In step S51, the individual-commodity-evaluation information transmitted from the commodity-information provision apparatus 20 through the network 90 is received by the individual-commodity-evaluation acquisition unit 60*i* in the terminal 60, and is then transferred to the individual-commodity-evaluation display unit 60*j*, which displays the individual-commodity-evaluation information in step S52, for example, as illustrated in FIG. 24.

FIG. 24 is a diagram illustrating an example of an individual-commodity-evaluation display screen 116 displayed by the individual-commodity-evaluation display unit 60*j* in the terminal 60.

In the individual-commodity-evaluation display screen 116, the individual-commodity-evaluation information relating to the book D is indicated. As illustrated in FIG. 24, the individual-commodity-evaluation display screen 116 includes a commodity purchase button 116*a*, a commodity re-select button 116*b*, and comment areas 116*c* to 116*h*. The individual-commodity-evaluation display screen 116 is divided into a plurality of sections corresponding to a plurality of evaluation criteria such as understandability and richness in content, and each section includes a portion of the comment areas 116*c* to 116*h*. The comment areas 116*c* to 116*h* each indicate a result of comparison between the book D and another commodity.

In the example illustrated in FIG. 24, the first section corresponds to the evaluation criterion "understandability," and includes the comment areas 116*c* to 116*e*. In the first section, a comment on the book D in comparison with the book E, "Many illustrations in the book D facilitate understanding of the contents," is indicated in the comment area 116*c*; a comment on the book D in comparison with the book F, "Many example problems in the book D facilitate understanding of the contents," is indicated in the comment area 116*d*; and a comment on the book D in comparison with the book A, "The example problems provided in the book D are not realistic," is indicated in the comment area 116*e*. In addition, the second section corresponds to the evaluation criterion "richness in content," and includes the comment areas 116*f* to 116*h*. In the second section, a comment on the book D in comparison with the book C, "Almost all of the usual course of explanations are included in the book D," is indicated in the comment area 116*f*; a comment on the book D in comparison with the book G, "The book G is not based on the newest specifications," is indicated in the comment area 116*g*; and a comment on the book D in comparison with the book A, "The contents of the book D are unbalanced," is indicated in the comment area 116*h*.

In step S53, the commodity purchase button 116*a* is clicked when the user requests purchase processing, and the commodity re-select button 116*b* is clicked when the user re-selects at least one commodity on which the user requests individual-commodity-evaluation information. Therefore, when the individual-commodity-evaluation display screen 116 is displayed on the terminal 60, the user can choose to purchase the commodity for which the individual-commodity-evaluation display screen 116 is displayed, or re-select another commodity on which the user requests individual-commodity-evaluation information.

For example, when the user clicks the commodity purchase button 116*a* in the individual-commodity-evaluation display screen 116, a request for processing for purchasing the book D is chosen, and the processing for purchasing the book D is started (in step S14 in FIG. 16) in the commodity-information provision system 10. On the other hand, when the user clicks the commodity reselect button 116*b* in the individual-commodity-evaluation display screen 116, a request for reselection of a commodity on which the user requests individual-commodity-evaluation information is chosen, and the operation goes back to step S46 in FIG. 21.

Next, a detailed sequence of operations realizing the operation in step S40 in the sequence of FIG. 20 for producing a commodity-comparison map is explained below. The automatic graph layout method disclosed in U.S. Pat. No. 5,764,239 and Japanese Unexamined Patent Publication, No. 8-30799 is used in the sequence for producing a commodity-comparison map. The contents of U.S. Pat. No. 5,764,239 and Japanese Unexamined Patent Publication, No. 8-30799 are incorporated in this specification by reference, FIG. 25 is a flow diagram of an example of a detailed sequence of operations realizing the operation in step S40 in the sequence of FIG. 20 for producing a commodity-comparison map.

In step S61, nodes (vertices) of a graph, respectively corresponding to commodities, are generated one by one. That is, nodes (vertices) corresponding to commodities under comparison in the commodity-comparison information are generated one by one. Specifically, when the commodity-comparison information includes the commodity-comparison information items illustrated in FIG. 26, a node is generated one by one for each commodity (i.e., each of the books A, B, C, . . . H) under comparison. The commodity-comparison information in FIG. 26 includes 25 commodity-comparison information items for eight commodities (books). Therefore, eight nodes are generated for the commodity-comparison information in FIG. 26.

When the generation of the nodes of the graph is completed, directional edges connecting the nodes are generated in step S62. Each of the directional edges is an edge with directionality like a line with an arrow, and indicates a result of comparison between commodities corresponding to nodes connected with the directional edge. Specifically, a node corresponding to a superior one of a pair of commodities is located at the ending point of each directional edge (i.e., the tip of the arrow), and another node corresponding to an inferior one of the pair of commodities is located at the starting point of the directional edge (i.e., the tail end of the arrow). In the example of FIG. 26, the ending point of the directional edge corresponding to the commodity-comparison information item provided by the user having the user ID "0001" is located at the node corresponding to the book A, and the starting point of the directional edge corresponding to the commodity-comparison information item provided by the user having the user ID "0001" is located at the node corresponding to the book B.

In addition, it is possible to connect two nodes corresponding to two evenly matched commodities with an undirectional edge instead of a directional edge.

Further, when there are a plurality of commodity-comparison information items for comparison between an identical pair of commodities (e.g., the books A and B), the thickness or color of a line representing a directional or undirectional edge connecting nodes corresponding to the identical pair of commodities may be varied with the number of the commodity-comparison information items.

Next, in step S63, a layout of the graph is determined by using, for example, a magnetic-spring layout algorithm. In the magnetic-spring layout algorithm, a virtual force acting on each edge is defined in order to control the direction of the edge, where the edge is generated in step S62 and indicates a relationship between commodities. Then, a virtual physical model in which the virtual force defined above is incorporated is generated corresponding to commodities and information on evaluations of the commodities, and a stable state of the virtual physical model is obtained so that a commodity-comparison map is produced. The outline of the processing for determining the layout of the graph in step S63 is explained below.

First, in order to define a virtual force acting on each edge which is generated in step S62 and indicates a relationship between commodities, for use in control of the direction of the edge, the edge is regarded as a virtual azimuthal magnet, and a virtual magnetic field is defined so that the direction of each virtual azimuthal magnet is determined according to the virtual magnetic field. In addition, the nodes generated in step S61 are virtually regarded as massless particles, and the directional edges generated in step S62 are regarded as virtual springs connecting the massless particles. It is possible to assume that each virtual magnetic field defined above is a magnetic field which acts on only at least one edge corresponding to a specific evaluation criterion among the edges generated in step S62. Further, a plurality of virtual magnetic fields acting on only at least one edge corresponding to a specific evaluation criterion may be defined in a plurality of directions. For example, in the commodity-comparison map 115a illustrated in FIG. 23, virtual magnetic fields acting on only the edges corresponding to the evaluation criterion "understandability" are defined in the vertical direction, and other virtual magnetic fields acting on only the edges corresponding to the evaluation criterion "richness in content" are defined in the horizontal direction.

Next, a virtual physical model in which the virtual forces defined above are incorporated corresponding to commodities indicated in commodity-comparison information and information on evaluations of the commodities is generated. Specifically, in the virtual physical model, virtual magnetic fields and resilient forces of virtual springs defined as above are incorporated corresponding to the nodes in the graph generated in step S61 and the evaluation criteria used in comparison between the commodities. In other words, in the above virtual physical model, the nodes in the graph generated in step S61 are connected with the virtual springs defined as above, and the virtual magnetic fields defined as above are applied to the entire system.

Thereafter, a virtual stable state of the above virtual physical model is obtained. Thus, the layout of the graph is obtained. That is, the commodity-comparison map 115a illustrated in FIG. 23 is obtained.

When a commodity-comparison map is produced as above by the automatic graph layout method disclosed in U.S. Pat. No. 5,764,239 and Japanese Unexamined Patent Publication, No. 8-30799, the at least one relationship between the commodities can be visually indicated with the directional edges, so that users can easily recognize the at least one relationship between the commodities, e.g., superiority or inferiority determined based on a plurality of evaluation criteria.

In addition, even when commodities are evenly matched, a commodity-comparison map including the commodities can be produced by using the above method.

Further, even when mutually contradictory information items are included in the commodity-comparison information (e.g., when a commodity-comparison information item indicates that the book A is superior to the book B, and another commodity-comparison information item indicates that the book B superior to the book A), the commodity-comparison map produced by the above method settles into a position in which the entire system of the virtual physical model is totally balanced. Therefore, the layout is basically determined based on commodity-comparison information items in the majority, and users can visually recognize the majority of the commodity-comparison information items.

Furthermore, the number of comparisons between each pair of commodities can be recognized from the thickness or color of a line connecting the pair of commodities, or the number of lines connecting the pair of commodities. Therefore, users can visually recognize the amount of the commodity-comparison information based on which the locations of the commodity-indication icons of the respective commodities are determined, and can thus confirm the reliability of the locations of the commodity-indication icons of the respective commodities.

4.2.13 Advantages of First Embodiment

The first embodiment of the present invention has the following advantages.

(1) In the first embodiment, the commodity-information provision apparatus 20 acquires through the network 90 commodity-comparison information which is input from the terminals 30, 40, and 50 and indicates at least one result of at least one comparison between commodities, and stores the acquired commodity-comparison information in the commodity-comparison-information storage unit 20d. By using the commodity-comparison information stored in the commodity-comparison-information storage unit 20d, the commodity-information provision apparatus 20 produces a commodity-comparison map which visually indicates at least one relationship between commodities in such a manner that at least one evaluation criterion used in evaluation of commodities respectively corresponds to at least one coordinate axis in the commodity-comparison map. Then, by using the commodity-comparison map, the commodity-information provision apparatus 20 produces relative-evaluation information indicating at least one relative evaluation of the commodities, and transmits the relative-evaluation information to the terminal 60, 70, or 80 through the network 90. Therefore, users can easily obtain the information on the at least one relative evaluation of the commodities by viewing on the terminal 60, 70, or 80 the relative-evaluation information supplied from the commodity-information provision apparatus 20.

(2) In the first embodiment, the relative-evaluation-information production unit 20j in the commodity-information provision apparatus 20 produces information arranged for display of the commodity-comparison map on the terminal 60, 70, or 80, and the information arranged for display of the commodity-comparison map is then transmitted to the terminal 60, 70, or 80 through the network 90. Therefore, the users can recognize the at least one relative evaluation of the commodities visually and intuitively by viewing on the terminal 60, 70, or 80 the relative-evaluation information supplied from the commodity-information provision apparatus 20 through the network 90.

(3) In the first embodiment, after the relative-evaluation information is displayed on the terminal 60, 70, or 80, individual-commodity-evaluation information on a commodity specified by a user can be supplied from the commodity-information provision apparatus 20 to the terminal 60, 70, or 80 through the network 90. Therefore, users can easily obtain detailed information on at least one relative evaluation of a specific commodity by viewing on the terminal 60, 70, or 80 the individual-commodity-evaluation information supplied from the commodity-information provision apparatus 20 through the network 90.

(4) In the first embodiment, the selected-evaluation-criterion acquisition unit 20h in the commodity-information provision apparatus 20 receives through the network 90 the evaluation-criterion-selection information which is input from the terminal 60, 70 or 80 and indicates at least one evaluation criterion for a commodity, and the commodity-comparison-map production unit 20i produces a commodity-comparison map in such a manner that the at least one evaluation criterion indicated in the evaluation-criterion-selection information respectively corresponds to at least one coordinate axis of the commodity-comparison map. Therefore, each user can view a commodity-comparison map which is produced based on at least one evaluation criterion specified by the user. Thus, each user can easily obtain detailed information on at least one relative evaluation of commodities as needed.

4.2.14 Variations of First Embodiment

The first embodiment of the present invention has the following variations.

(1) In the first embodiment, the commodity-information provision apparatus 20 supplies to the terminal 60, 70, or 80 information indicating a request for selection of at least one of evaluation criteria, and users select a specific evaluation criterion in the evaluation-criterion-selection screen 114 which is displayed on the terminal 60, 70, or 80 based on the information indicating a request for selection. Alternatively, users may input at least one evaluation criterion in the form of a text into the terminal 60, 70, or 80, and the commodity-information provision apparatus 20 may obtain evaluation-criterion-selection information by text mining from the text describing the at least one evaluation criterion, and produce a commodity-comparison map by using the evaluation-criterion-selection information.

(2) It is possible to forbid use of commodity-comparison information which is provided before a predetermined date and time in production of the commodity-comparison map.

(3) In the first embodiment, information indicating a request for commodity-comparison information is displayed on the terminals 30, 40, or 50, and the user inputs commodity-comparison information in accordance with the information indicating request for commodity-comparison information. Alternatively, users may input commodity-comparison information in an arbitrary form, and the commodity-information provision apparatus 20 may obtain the commodity-comparison information by text mining, and produce a commodity-comparison map by using the commodity-comparison information.

(4) Although the commodity-comparison map in the first embodiment is displayed in two dimensions, the commodity-comparison map may be displayed in three or more dimensions.

(5) The evaluation criteria for selection may be displayed in the form of a menu.

(6) A price for the individual-commodity-evaluation information may be charged to each user who receives the individual-commodity-evaluation information.

(7) The commodity-information provision system 10 as the first embodiment of the present invention can be used as a portion of business functions of an on-line shopping site. Further, the commodity-information provision system 10 can be used as a common service provided by an application service provider (ASP) to a plurality of on-line shopping sites.

(8) Comments on commodities instead of the commodity-comparison information may be collected from users, and a keyword map instead of the commodity-comparison map may be produced and provided to the users. The keyword map visually indicates at least one relationship between keywords which are extracted from the collected comments by text mining, and the commodities on which the comments are collected.

The above functions of collecting the comments on commodities and producing and providing the keyword map can be realized when the commodity-information provision system 10 executes processing including the following steps:

In the first step, commodity-comment information is acquired from at least one first terminal through a communication means, where the commodity-comment information indicates comments on commodities, and is input by at least one user into the at least one first terminal.

In the second step, the commodity-comment information acquired in the first step is stored in a storage device.

In the third step, commodity-selection information is acquired from a second terminal through a communication means, where the commodity-selection information indicates at least one specific commodity selected by a user of the second terminal.

In the fourth step, at least one commodity-comment information item relating to the at least one commodity indicated in the acquired commodity-selection information is extracted from the storage device.

In the fifth step, a keyword map is produced, where the keyword map visually indicates at least one relationship between the at least one commodity-comment information item extracted in the fourth step and the at least one commodity indicated in the commodity-selection information acquired in the third step.

In the sixth step, information arranged for display of the keyword map on the second terminal is generated and transmitted to the second terminal through the communication means.

FIG. 27 is a diagram illustrating examples of comments on commodities which are collected from users, and FIG. 28 is a diagram illustrating an example of a keyword map. When the comments on commodities (commodity-comment information) as illustrated in FIG. 27 are collected from users, for example, the underlined words in the comments in FIG. 27 are extracted as keywords, and the keyword map as illustrated in FIG. 28 is produced based on the extracted keywords. A plurality of relationships between commodities and the keywords included in the collected comments on the commodities are indicated in the keyword map of FIG. 28. In particular, in FIG. 28, the indication of each keyword is located nearer to the indication of a commodity when the keyword appears a greater number of times in the comments collected for the commodity. In order to produce a keyword map, for example, it is preferable to use the method proposed by Kazuo MISUE and Isamu WATANABE in "Visualization of Keyword Association for Text Mining" Information Processing Society of Japan, Special Interest Group of Fundamental Studies on Information, Jul. 16, 1999.

(9) The evaluation-criterion-selection information acquired by the selected-evaluation-criterion acquisition unit 20h in the commodity-information provision apparatus 20 may be stored in a storage device (not shown), and the numbers of users who have selected the respective evaluation-criterion-selection information items are obtained based on the evaluation-criterion-selection information stored in the storage device. Then, summed-selection information indicating the numbers of users who have selected the respective evaluation-criterion-selection information items may be transmitted to the terminal 60 through the network 90. In this case, when a user views the summed-selection information on the terminal 60, the user can recognize which evaluation criterion is selected by the greatest number of users, and select and input an evaluation criterion in step S37 in the sequence of FIG. 20 by referring to the summed-selection information.

FIG. 29 is a diagram illustrating a selected-criteria statistics display screen 601 displayed on the terminal 460. The selected-criteria statistics display screen 601 is a displayed example of the above summed-selection information.

As illustrated in FIG. 29, the selected-criteria statistics display screen 601 indicates evaluation criteria "understandability," "richness in content," "ease of view due to style," and "suitability for C users," and the like. In addition, the numbers (e.g., "168," "84," "42," and "21") and the percentages (e.g., "48%," "24%," "12%," and "6% ") of users who have selected the respective evaluation criteria are indicated. Therefore, each user can recognize the selection status of the evaluation criteria at a glance. It is possible to perform the above operations for indicating the summed-selection information before performing the operation in step S37 in FIG. 20.

(10) The relative-evaluation-information production unit 20j in the commodity-information provision apparatus 20 may produce marketing information by attaching information on sales amounts of the respective commodities to the information on the commodity-comparison map generated by the commodity-comparison-map production unit 20i. In this case, the users of the marketing information are not consumers, and are for example, marketing persons in companies.

FIG. 30 is a diagram illustrating an example of a marketing-information display screen 602 displayed on the terminal 60. The marketing-information display screen 602 is a displayed example of the above marketing information.

As illustrated in FIG. 30, the marketing-information display screen 602 includes a commodity-comparison map 602a instead of the commodity-comparison map 115a in the relative-evaluation display screen 115 illustrated in FIG. 23. In the commodity-comparison map 602a, indications of sales amounts are attached to the indications 602aa to 602ah (commodity-indication icons) of the commodities, respectively.

Thus, marketing information in which correlations between relative evaluations and sales amounts of commodities are visually and intuitively indicated can be provided to the users.

4.3 Second Embodiment

A commodity-information provision system as the second embodiment of the present invention is explained below.

The second embodiment of the present invention is different from the first embodiment of the present invention in that the commodity-information provision system provides users with level-up information. Therefore, the following explanations of the second embodiment of the present invention are concentrated on the differences from the first embodiment, and the same features as the first embodiment are not repeated. In particular, the configuration of the commodity-information provision system, the hardware constructions of the commodity-information provision apparatus and the terminals, and the functions of the terminals 30, 40, and 50 (corresponding to the at least one first terminal in the second to fourth, sixth, and seventh aspects of the present invention) in the second embodiment are respectively identical to the corresponding constructions or functions in the first embodiment. Therefore, only the functions and operations of a commodity-information provision apparatus 220 and a terminal 260 which represents terminals corresponding to the at least one second terminal in the second to fourth, sixth, and seventh aspects of the present invention and the aforementioned terminal in the fifth aspect of the present invention are explained below.

4.3.1 Functions of Apparatus 220

FIG. 31 is a diagram illustrating the functions of the commodity-information provision apparatus 220 in the commodity-information provision system as the second embodiment of the present invention.

As illustrated in FIG. 31, the commodity-information provision apparatus 220 comprises a personal-information storage unit 220a, a sales-history-information storage unit 220b, a commodity-comparison-information acquisition unit 220c, a commodity-comparison-information storage unit 220d, a possessed-commodity-information storage unit 220e, a possessed-commodity-information provision unit 220f, a reference-commodity-selection-information acquisition unit 220h, a commodity-comparison-map production unit 220i, a relative-evaluation-information production unit 220j, a relative-evaluation-information transmission unit 220k, an individual-commodity-evaluation production unit 220l, and an individual-commodity-evaluation provision unit 220m.

The personal-information storage unit 220a stores personal information on users of the commodity-information provision system as the second embodiment of the present invention. The sales-history-information storage unit 220b stores information on sales histories of commodities which have been sold.

The commodity-comparison-information acquisition unit 220c acquires commodity-comparison information through the communication means (i.e., the network 90), where the commodity-comparison information indicates at least one result of at least one comparison between commodities. The comparison is made, for example, by the users, and the result of comparison (e.g., superiority or inferiority) is input through one of the terminals (corresponding to the aforementioned at least one first terminal in the second to fourth, sixth, and seventh aspects of the present invention) in the commodity-information provision system as the second embodiment of the present invention. The commodity-comparison-information storage unit 220d stores the commodity-comparison information acquired by the commodity-comparison-information acquisition unit 220c.

The possessed-commodity-information storage unit 220e stores possessed-commodity information. The possessed-commodity information is information on at least one commodity which is possessed by each user who is under a predetermined contract which allows the users to use the commodity-information provision system. For example, the possessed-commodity information is collected from a sales history of each commodity or by a questionnaire survey of the users. The possessed-commodity-information provision unit 220f transmits the possessed-commodity information to one of the terminals (corresponding to the at least one second terminal in the second to fourth, sixth, and seventh aspects of the present invention and the aforementioned terminal in the fifth aspect of the present invention) in the commodity-information provision system as the second embodiment of the present invention.

The reference-commodity-selection-information acquisition unit 220h acquires reference-commodity-selection information from the one of the terminals (corresponding to the aforementioned at least one second terminal in the second to fourth, sixth, and seventh aspects of the present invention and the aforementioned terminal in the fifth aspect of the present invention). The reference-commodity-selection information indicates at least one reference commodity which is used as a reference when a commodity-comparison map is produced. Specifically, the reference-commodity-selection information indicates a commodity which is used as a reference when level-up information is provided, where the level-up information is information indicating a commodity which is leveled up in some way from the commodity used as a reference.

By using the commodity-comparison information stored in the commodity-comparison-information storage unit 220d, the commodity-comparison-map production unit 220i produces a commodity-comparison map which visually indicates at least one relationship between commodities in such a manner that at least one evaluation criterion used in evaluation of commodities respectively corresponds at least one a coordinate axis in the commodity-comparison map. The relative-evaluation-information production unit 220j produces relative-evaluation information which indicates at least one relative evaluation of commodities, by using the commodity-comparison map produced by the commodity-comparison-map production unit 220i. The relative-evaluation-information transmission unit 220k transmits the relative-evaluation information produced by the relative-evaluation-information production unit 220j, to the one of the terminals (corresponding to the aforementioned at least one second terminal in the second to fourth, sixth, and seventh aspects of the present invention and the aforementioned terminal in the fifth aspect of the present invention) through the network 90.

The individual-commodity-evaluation production unit 220l produces individual-commodity-evaluation information which indicates at least one relative evaluation of each of at least one commodity which is specified, for example, by a user. The individual-commodity-evaluation provision unit 220m transmits the individual-commodity-evaluation information produced by the individual-commodity-evaluation production unit 220l, to the one of the terminals (corresponding to the aforementioned at least one second terminal in the second to fourth, sixth, and seventh aspects of the present invention and the aforementioned terminal in the fifth aspect of the present invention).

As illustrated in FIG. 31, the commodity-information provision apparatus 220 is arranged as follows:

(1) The commodity-comparison-information acquisition unit 220c can exchange information with the personal-information storage unit 220a, the sales-history-information storage unit 220b, and the commodity-comparison-information storage unit 220d.

(2) The possessed-commodity-information storage unit 220e can exchange information with possessed-commodity-information provision unit 220f.

(3) The reference-commodity-selection-information acquisition unit 220h can exchange information with the commodity-comparison-map production unit 220i.

(4) The commodity-comparison-map production unit 220i can exchange information with the commodity-comparison-information storage unit 220d and the relative-evaluation-information production unit 220j.

(5) The relative-evaluation-information production unit 220j can exchange information with the relative-evaluation-information transmission unit 220k.

(6) The commodity-comparison-information storage unit 220d can exchange information with the individual-commodity-evaluation production unit 220l.

(7) The individual-commodity-evaluation production unit 220l can exchange information with the individual-commodity-evaluation provision unit 220m.

(8) The commodity-comparison-information acquisition unit 220c, the possessed-commodity-information provision unit 220f, the reference-commodity-selection-information acquisition unit 220h, the relative-evaluation-information transmission unit 220k, and the individual-commodity-evaluation provision unit 220m can communicate with the terminals in the commodity-information provision system as the second embodiment of the present invention through the network 90.

4.3.2 Possessed-Commodity Information

FIG. 32 is a diagram illustrating an example of a data structure of the possessed-commodity information 301 stored in the possessed-commodity-information storage unit 220e.

As illustrated in FIG. 32, the possessed-commodity information 301 is stored in a plurality of tables separately provided for the respective users. Each table contains information items "COMMODITY NAME," "PURCHASED DATE," "METHOD OF PURCHASE," "PUBLISHER," "PUBLICATION YEAR" and "REMARKS."

The possessed-commodity information 301 in the illustrated example includes "Beginner's JAVA," "Illustrated XML," "All About Mobile," and "Japanese Politics" as the information item "COMMODITY NAME." The possessed-commodity information 301 also includes as the information items "COMMODITY NAME," "PURCHASED DATE," "METHOD OF PURCHASE," "PUBLISHER," and "PUBLICATION YEAR": "2000.6.1," "on-line," "XX," and "1999" corresponding to the COMMODITY NAME "Beginner's JAVA"; "2000.7.28," "on-line," "YY," and "2000" corresponding to the COMMODITY NAME "Illustrated XML"; "2001.3.10," "transaction in shop," "ZZ," and "2001" corresponding to the COMMODITY NAME "All About Mobile"; and "2001.4.1," "on-line," "AA," and "1995" corresponding to the COMMODITY NAME "Japanese Politics."

4.3.3 Functions of Terminal 260

FIG. 33 is a diagram illustrating the functions of the terminal 260 in the commodity-information provision system as the second embodiment of the present invention. The terminal 260 represents the terminals corresponding to the at least one second terminal in the second to fourth, sixth, and seventh aspects of the present invention and the aforementioned terminal in the fifth aspect of the present invention.

The terminal 260 comprises a possessed-commodity-information acquisition unit 260a, a possessed-commodity-information display unit 260b, a reference-commodity-selection-information reception unit 260c, a reference-commodity-selection-information transmission unit 260d, a relative-evaluation-information acquisition unit 260e, a relative-evaluation-information display unit 260f, an individual-commodity-evaluation acquisition unit 260g, and an individual-commodity-evaluation display unit 260h.

The possessed-commodity-information acquisition unit 260a acquires the possessed-commodity information which is transmitted from the commodity-information provision apparatus 220 through the network 90. The possessed-commodity-information display unit 260b displays the possessed-commodity information acquired by the possessed-commodity-information acquisition unit 260a.

The reference-commodity-selection-information reception unit 260c receives reference-commodity-selection-information which is input into the terminal 260 by a user. The reference-commodity-selection-information transmission unit 260d transmits the reference-commodity-selection information received by the reference-commodity-selection-information reception unit 260c, to the commodity-information provision apparatus 220 through the network 90.

The relative-evaluation-information acquisition unit 260e acquires the aforementioned level-up information through the network 90, where the level-up information is transmitted as relative-evaluation information from the commodity-information provision apparatus 220 through the network 90. The relative-evaluation-information display unit 260f displays the level-up information acquired by the relative-evaluation-information acquisition unit 260e.

The individual-commodity-evaluation acquisition unit 260g acquires the aforementioned individual-commodity-evaluation information which is transmitted from the commodity-information provision apparatus 220 through the network 90, where the individual-commodity-evaluation information indicates a relative evaluation of a commodity specified, for example, by a user. The individual-commodity-evaluation display unit 260h displays the individual-commodity-evaluation information acquired by the individual-commodity-evaluation acquisition unit 260g.

As illustrated in FIG. 33, the terminal 260 is arranged so that information can be exchanged between the possessed-commodity-information acquisition unit 260a and the possessed-commodity-information display unit 260b, between the reference-commodity-selection-information reception unit 260c and the reference-commodity-selection-information transmission unit 260d, between the relative-evaluation-information acquisition unit 260e and the relative-evaluation-information display unit 260f, and between the individual-commodity-evaluation acquisition unit 260g and the individual-commodity-evaluation display unit 260h. In addition, the possessed-commodity-information acquisition unit 260a, the reference-commodity-selection-information transmission unit 260d, the relative-evaluation-information acquisition unit 260e, and the individual-commodity-evaluation acquisition unit 260g are each arranged to be able to communicate with the commodity-information provision apparatus 220 through the network 90.

4.3.4 Operations of System

The operations of the commodity-information provision system as the second embodiment of the present invention are explained below in detail. The main operations of the commodity-information provision system as the second embodiment of the present invention can be divided into first and second sequences of operations. The first sequence of operations corresponds to collection of the commodity-comparison information, and the second sequence of operations corresponds to provision of level-up information to users by using the collected commodity-comparison information. Since the first sequence of operations for collecting the commodity-comparison information in the second embodiment are substantially the same as those in the first embodiment, only the second sequence of operations for providing the level-up information to users is explained below.

FIG. 34 is a flow diagram of an example of the second sequence of operations performed in the commodity-information provision system as the second embodiment of the present invention for providing level-up information to purchasers.

In step S71, a possessed-commodity-information display screen which indicates a commodity possessed by a user who uses one of the terminals (the aforementioned at least one second terminal in the second to fourth, sixth, and seventh aspects of the present invention and the aforementioned terminal in the fifth aspect of the present invention) is displayed on the terminal. Hereinbelow, the terminals corresponding to the at least one second terminal in the second to fourth, sixth, and seventh aspects of the present invention and the aforementioned terminal in the fifth aspect of the present invention are represented by the terminal 260, and details of the operation in step S71 are explained later.

In step S72, level-up information is provided by the commodity-information provision apparatus 220 to the terminal 260. Details of the operation in step S72 are also explained later.

In step S73, processing for purchasing a commodity is performed for a commodity selected by the user. Specifically, on-line processing for purchasing a commodity by using the Internet or the like is performed.

FIG. 35 is a flow diagram of an example of a detailed sequence of operations realizing the operation in step S71 in the sequence of FIG. 34.

In step S81, the possessed-commodity-information provision unit 220f in the commodity-information provision apparatus 220 extracts possessed-commodity information. Specifically, the possessed-commodity-information provision unit 220f extracts possessed-commodity information stored in the possessed-commodity-information storage unit 220e or in a database (not shown) which is possessed by, for example, a shop.

In addition, in step S82, the possessed-commodity-information provision unit 220f extracts personal information from the personal-information storage unit 220a. The personal information extracted in the second embodiment is personal information on users who possess commodities indicated in the possessed-commodity information extracted in step S81. For example, the personal information extracted in the second embodiment includes addresses of the users.

Then, in step S83, the possessed-commodity-information provision unit 220f transmits the extracted possessed-commodity information to the terminal 260 through the network 90. At this time, the personal information on (for example, the addresses of) the users extracted in step S82 is used.

In step S84, the possessed-commodity information transmitted from the commodity-information provision apparatus 220 through the network 90 is received by the possessed-commodity-information acquisition unit 260a in the terminal 260, and is then transferred to the possessed-commodity-information display unit 260b, which displays the received possessed-commodity information in step S85, for example, as illustrated in FIG. 36.

FIG. 36 is a diagram illustrating an example of a possessed-commodity-information display screen 311 displayed by the possessed-commodity-information display unit 260b in the terminal 260. As illustrated in FIG. 36, the possessed-commodity-information display screen 311 includes a commodity selection area 311a and a level-up-advice button 311b. The commodity selection area 311a indicates a plurality of commodities which the user of the terminal 260 possesses, and the level-up-advice button 311b is clicked when the user wishes to acquire level-up information. When the possessed-commodity-information display screen 311 is displayed, the operation goes to step S72 in FIG. 34.

FIGS. 37 and 38 are flow diagrams of an example of a detailed sequence of operations realizing the operation in step S72 in the sequence of FIG. 34.

In step S91, the reference-commodity-selection-information reception unit 260c in the terminal 260 receives reference-commodity-selection information which is input by the user of the terminal 260. For example, the user of the terminal 260 chooses as a reference commodity one of the commodities indicated in the commodity selection area 311a in the possessed-commodity-information display screen 311 of FIG. 36, clicks the indication of the selected commodity in the commodity selection area 311a, and clicks the level-up-advice button 311b. Thus, the reference-commodity-selection information indicating the selected commodity is input into the terminal 260. Then, the reference-commodity-selection information is transferred to the reference-commodity-selection-information transmission unit 260d, and the operation goes to step S92.

In step S92, the reference-commodity-selection-information transmission unit 260d transmits the reference-commodity-selection information received in step S91, to the commodity-information provision apparatus 220 through the network 90.

In step S93, the reference-commodity-selection-information acquisition unit 220h in the commodity-information provision apparatus 220 receives the reference-commodity-selection information transmitted from the terminal 260 through the network 90.

Then, in step S94, the commodity-comparison-map production unit 220i produces a commodity-comparison map. For example, the commodity-comparison-map production unit 220i produces a commodity-comparison map in which the reference commodity included in the reference-commodity-selection information is located at an origin, and leveled-up commodities are indicated around the reference commodity. The leveled-up commodities are commodities which are leveled up from the reference commodity. For example, when the commodities are books, the leveled-up commodities are books which are suitable for obtaining more profound knowledge.

In the commodity-comparison map produced in step S94, at least one relationship between a commodity which is possessed by the user and other commodities which are leveled up from the commodity which is possessed by the user is indicated by the relative locations (coordinates) of the indications of the respective commodities, where the coordinate axes of the commodity-comparison map correspond to the leveled-up features of the commodities, respectively. Thus, the level-up information on the commodities are visually indicated with commodity possessed by the user as a reference. For example, when the commodities are books, first, a commodity-comparison map is produced based on the evaluation criteria "profoundness of content" and "extent of content" in a similar manner to step S40 in the sequence of FIG. 20 in the first embodiment of the present invention. The commodity-comparison information used in production of the commodity-comparison map is limited to information which includes information on commodities each of which is more highly evaluated based on at least one evaluation criterion than the reference commodity indicated by the reference-commodity-selection information acquired by the reference-commodity-selection-information acquisition unit 220h in step S93. Therefore, the commodity-comparison map indicates at least one relative evaluation of commodities which are more highly evaluated based on at least one evaluation criterion than the reference commodity, in comparison with at least one evaluation of the reference commodity.

The commodity-comparison map produced in step S94 is then transferred to the relative-evaluation-information production unit 220j, and the operation goes to step S95. In step S95, the relative-evaluation-information production unit 220j produces relative-evaluation information which indicates at least one relative evaluation of commodities, by using the commodity-comparison map produced in step S94. The relative-evaluation information is information arranged for display of the commodity-comparison map and input of information in a GUI (graphical user interface) environment or the like on the terminal 260 (corresponding to the aforementioned at least one second terminal in the second to fourth, sixth, and seventh aspects of the present invention and the aforementioned terminal in the fifth aspect of the present invention). The relative-evaluation information produced by the relative-evaluation-information production unit 220j is then transferred to the relative-evaluation-information transmission unit 220k, which transmits the relative-evaluation information to the terminal 260 through the network 90 in step S96.

In step S97, the relative-evaluation information transmitted from the commodity-information provision apparatus 220 is received by the relative-evaluation-information acquisition unit 260e in the terminal 260, and is then transferred to the relative-evaluation-information display unit 260f, which displays the relative-evaluation information in step S98, for example, as illustrated in FIG. 39.

FIG. 39 is a diagram illustrating an example of a level-up-information display screen 312 displayed by the relative-evaluation-information display unit 260f in the terminal 260.

The relative-evaluation display screen 312 in the example of FIG. 39 includes a commodity-comparison map 312a, a confirm button 312b, and a reference-commodity selection button 312c. The commodity-comparison map 312a is the commodity-comparison map generated by the commodity-comparison-map production unit 220i in step S94. The confirm button 312b is clicked by the user when the user confirms at least one commodity on which individual-commodity-evaluation information is to be displayed, where the individual-commodity-evaluation information indicates at least one relative evaluation of each of at least one commodity which is specified, for example, by a user. The reference-commodity selection button 312c is clicked by the user when the user re-selects a commodity as a reference commodity.

As illustrated in FIG. 39, the commodity-comparison map 312a is a diagram which visually indicates relationships between commodities in such a manner that the coordinate axes of the commodity-comparison map respectively correspond to the evaluation criteria used in evaluation of the commodities. The difference of the level-up-information display screen 312 in the second embodiment from the relative-evaluation display screen 115 in the first embodiment is that level-up information on commodities with respect to a commodity which is possessed by a user is visually indicated in such a manner that the coordinate axes of the commodity-comparison map 312a respectively correspond to features of the commodities leveled up from the commodity possessed by the user, and the leveled-up features of the commodities are represented by the relative locations of indications of the commodities in the coordinate system determined by the coordinate axes.

In the example of FIG. 39, the commodities are books, the ordinate corresponds to a degree of usefulness of each book for acquiring profound knowledge, and the abscissa corresponds to a degree of usefulness of each book for extending knowledge. Thus, the leveled-up features (i.e., the degrees of usefulness for acquiring profound knowledge and extending knowledge) of each commodity can be recognized from the coordinates (location) of the indication of the commodity in the commodity-comparison map 312a.

In the commodity-comparison map 312a, the respective commodities are indicated by commodity-indication icons 312aa to 312ah, and the relative locations (coordinates) of the commodity-indication icons 312aa to 312ah indicate the features of the books (commodities) leveled-up from the book E, which is the commodity possessed by the user and represented by the commodity-indication icon 312ae. For example, the commodity-indication icon 312ad representing the book D is located to the upper right of the commodity-indication icon 312ae representing the book E. That is, the commodity-indication icon 312ad representing the book D is located at a position corresponding to higher degrees of usefulness for acquiring profound knowledge and extending knowledge than those of the book D. The location of the commodity-indication icon 312ad relative to the location of the commodity-indication icon 312ae indicates that the book D is evaluated as a more useful book than the book E for acquiring profound knowledge and extending knowledge.

In addition, each line having an arrow and connecting two of the commodity-indication icons 312aa to 312ah indicates that there is a commodity-comparison information item indicating a result of a comparison between the two of the commodity-indication icons 312aa to 312ah, and the arrow points to one of the two commodities which is determined by the comparison to be superior. For example, between the books B and D, there are two commodity-comparison information items based on usefulness for acquiring profound knowledge, and one commodity-comparison information item based on usefulness for extending knowledge. That is, between the commodity-indication icons 312ab representing the books B and the commodity-indication icon 312ad representing the book D, there are two lines each having an arrow which points to the commodity-indication icon 312ab, and one line having an arrow which points to the commodity-indication icon 312ad. Thus, the commodity-comparison map 312a indicate that the book B is evaluated as a book superior to the book D in usefulness for acquiring profound knowledge, and the book D is evaluated as a book superior to the book B in usefulness for extending knowledge.

When the relative-evaluation information is displayed as above, the operation goes to step S99 in FIG. 37. In step S99, the user determines whether the user acquires individual-commodity-evaluation information or changes the reference commodity in the commodity-comparison map 312a. When the user wishes to acquire individual-commodity-evaluation information, the user clicks at least one of the commodity-indication icons 312aa to 312ah in the commodity-comparison map 312a corresponding to at least one commodity on which the user wishes to acquire individual-commodity-evaluation information, and subsequently clicks the confirm button 312b. In this case, the operation goes to step S100 in FIG. 38. On the other hand, when the user wishes to changes the reference commodity in the commodity-comparison map 312a, the user clicks the reference-commodity selection button 312c. In this case, the operation goes back to step S91 in FIG. 37.

In step S100, for example, the individual-commodity-evaluation acquisition unit 260g in the terminal 260 receives information indicating a request for individual-commodity-evaluation information, which is input into the terminal 260 by clicking the at least one of the commodity-indication icons 312aa to 312ah and the confirm button 312b in the commodity-comparison map 312a in step S99 as mentioned above. The information indicating the request for individual-commodity-evaluation information includes information indicating the at least one commodity (e.g., the book D) on which the user requests individual-commodity-evaluation information.

When the individual-commodity-evaluation acquisition unit 260g in the terminal 260 receives the information indicating the request for individual-commodity-evaluation information, the individual-commodity-evaluation acquisition unit 260g transmits the information indicating the request for individual-commodity-evaluation information to the commodity-information provision apparatus 220 through the network 90 in step S101.

Then, in step S102, the information indicating the request for individual-commodity-evaluation information, which is transmitted from the terminal 260 through the network 90, is received by the individual-commodity-evaluation provision unit 220m in the commodity-information provision apparatus 220, and is then transferred to the individual-commodity-evaluation production unit 220l.

In step S103, the individual-commodity-evaluation production unit 220l produces individual-commodity-evaluation information. The individual-commodity-evaluation production unit 220l extracts from the commodity-comparison-information storage unit 220d commodity-comparison information relating to the at least one commodity (e.g., the book D) on which the user requests individual-commodity-evaluation information. In the extraction, the aforementioned information indicating the at least one commodity (e.g., the book D) on which the user requests individual-commodity-evaluation information is used as a search key. Then, the individual-commodity-evaluation production unit 220l processes the extracted commodity-comparison information so as to produce the individual-commodity-evaluation information. For example, when the book D is selected as a commodity on which the user requests individual-commodity-evaluation information, the individual-commodity-evaluation production unit 220l extracts commodity-comparison information on comparison between the book D and other commodities (which includes information and comments on the commodities compared with the book D and the like) from the commodity-comparison-information storage unit 220d, and generates individual-commodity-evaluation information as information arranged for display of the extracted commodity-comparison information on the terminal 260.

Next, in step S104, the individual-commodity-evaluation provision unit 220m transmits the individual-commodity-evaluation information generated in step S103 to the terminal 260 through the network 90.

In step S105, the individual-commodity-evaluation information transmitted from the commodity-information provision apparatus 220 through the network 90 is received by the individual-commodity-evaluation acquisition unit 260g in the terminal 260, and is then transferred to the individual-commodity-evaluation display unit 260h, which displays the individual-commodity-evaluation information in step S106.

In step S107, the user can choose processing for purchasing a commodity or re-selection of at least one commodity on which the user requests individual-commodity-evaluation information, in a similar manner to step S53 in the first embodiment of the present invention. When the user chooses the processing for purchasing a commodity, the processing for purchasing a commodity is performed in step S73 in the sequence of FIG. 34. On the other hand, when the user chooses reselection of at least one commodity on which the user requests individual-commodity-evaluation information, the operation goes back to step S100.

4.3.5 Advantages of Second Embodiment

The second embodiment of the present invention has the following advantages.

(1) In the second embodiment, the commodity-information provision apparatus 220 acquires possessed-commodity information indicating at least one commodity which each user possesses, and the commodity-comparison-map production unit 220i produces a commodity-comparison map. In the commodity-comparison map, level-up information on commodities leveled up from a commodity which is possessed by the user is visually indicated in such a manner that the coordinate axes of the commodity-comparison map correspond to the leveled-up features of the commodities, and relationships between the commodity possessed by the user and the leveled-up commodities are represented by the relative locations (coordinates) of the indications (commodity-indication icons) of the respective commodities in the coordinate system determined by the coordinate axes. Therefore, it is possible to provide users with level-up information which indicates what commodity is appropriate for each user to purchase next in consideration of the commodity possessed by the user.

(2) In the second embodiment, the level-up information provided to a user visually indicates commodities leveled up from a commodity possessed by the user. Therefore, the users can recognize the leveled-up commodities visually and intuitively.

(3) In the second embodiment, the commodity-information provision apparatus 220 acquires through the network 90 commodity-comparison information which is input from terminals and indicates results of comparisons between commodities, and stores the acquired commodity-comparison information in the commodity-comparison-information storage unit 220d. By using the commodity-comparison information stored in the commodity-comparison-information storage unit 220d, the commodity-information provision apparatus 220 produces a commodity-comparison map which visually indicates relationships between commodities in such a manner that at least one evaluation criterion used in evaluation of the commodities respectively corresponds to at least one coordinate axis of the commodity-comparison map. Then, by using the commodity-comparison map, the commodity-information provision apparatus 220 produces relative-evaluation information indicating results of at least one relative evaluation of the commodities, and transmits the relative-evaluation information to the terminal 260 through the network 90. Therefore, users can easily recognize the at least one relative evaluation of the commodities by viewing on the terminal 260 the relative-evaluation information supplied from the commodity-information provision apparatus 220.

(4) In the second embodiment, the relative-evaluation-information production unit 220j in the commodity-information provision apparatus 220 produces information arranged for display of the commodity-comparison map on the terminal 260, and the information is then transmitted to the terminal 260 through the network 90. Therefore, the users can recognize the at least one relative evaluation of the commodities visually and intuitively by viewing on the terminal 260 the relative-evaluation information supplied from the commodity-information provision apparatus 220 through the network 90.

(5) In the second embodiment, after the relative-evaluation information is displayed on the terminal 260, individual-commodity-evaluation information on each of at least one commodity specified by a user can be supplied from the commodity-information provision apparatus 220 to the terminal 260 through the network 90. Therefore, users can easily recognize details of at least one relative evaluation of each of at least one specific commodity by viewing the individual-commodity-evaluation information supplied from the commodity-information provision apparatus 220 through the network 90.

(6) In the second embodiment, the reference-commodity-selection-information acquisition unit 220h in the commodity-information provision apparatus 220 receives through the network 90 the reference-commodity-selection information which is input from the terminal 60 and indicates a reference commodity used as a reference in production of the level-up information, and the commodity-comparison-map production unit 220i produces a commodity-comparison map in which features of commodities leveled up from the reference commodity are indicated by the locations (coordinates) of indications of the commodities on the commodity-comparison map. Therefore, each user can easily view level-up information on commodities which the user wishes to purchase, by using the terminal 260.

4.3.6 Variations of Second Embodiment

The second embodiment of the present invention has the following variations.

(1) It is possible to forbid use of commodity-comparison information which is provided before a predetermined date and time in production of the commodity-comparison map.

(2) Although the commodity-comparison map in the second embodiment is displayed in two dimensions, the commodity-comparison map may be displayed in three or more dimensions.

(3) The evaluation criteria option items may be displayed in the form of a menu.

(4) A price for the individual-commodity-evaluation information may be charged to each user who receives the individual-commodity-evaluation information.

(5) The commodity-information provision system as the second embodiment of the present invention can be used as a portion of business functions of an on-line shopping site. Further, the commodity-information provision system can be used as a common service provided by an application service provider (ASP) to a plurality of on-line shopping sites.

4.4 Third Embodiment

A commodity-information provision system as the third embodiment of the present invention is explained below.

The third embodiment of the present invention is different from the first embodiment of the present invention in that the commodity-information provision system provides users with recommendation information. Therefore, the following explanations of the third embodiment of the present invention are concentrated on the differences from the first embodiment, and the same features as the first embodiment are not repeated. In particular, the configuration of the commodity-information provision system and the hardware constructions of the commodity-information provision apparatus and the terminals in the third embodiment are respectively identical to the corresponding constructions in the first embodiment. In addition, the functions of the terminals corresponding to the first terminal in the eighth to tenth aspects of the present invention are substantially identical to the functions of the terminals 30, 40, and 50 in the first embodiment of the present invention. Therefore, only the functions and operations of a commodity-information provision apparatus 420 and a terminal 460 which represents terminals corresponding to the second terminal in the eighth to tenth aspects of the present invention are explained below.

4.4.1 Functions of Apparatus 420

FIG. 40 is a diagram illustrating the functions of the commodity-information provision apparatus 420 in the commodity-information provision system as the third embodiment of the present invention.

As illustrated in FIG. 40, the commodity-information provision apparatus 420 comprises a personal-information storage unit 420a, a sales-history-information storage unit 420b, a commodity-comparison-information acquisition unit 420c, a commodity-comparison-information storage unit 420d, a possessed-commodity-information storage unit 420e, a commodity-comparison-map production unit 420i, a relative-evaluation-information production unit 420j, and a relative-evaluation-information transmission unit 420k.

The personal-information storage unit 420a stores personal information on users of the commodity-information provision system as the third embodiment of the present invention. The sales-history-information storage unit 420b stores information on sales histories of commodities which have been sold.

The commodity-comparison-information acquisition unit 420c acquires commodity-comparison information through a communication means (i.e., the network 90), where the commodity-comparison information indicates at least one result of at least one comparison between commodities. The comparison is made, for example, by the users, and the result of comparison (e.g., superiority or inferiority) is input through one of the terminals (corresponding to the aforementioned first terminal in the eighth to tenth aspects of the present invention) in the commodity-information provision system as the third embodiment of the present invention. The commodity-comparison-information storage unit 420d stores the commodity-comparison information acquired by the commodity-comparison-information acquisition unit 420c.

The possessed-commodity-information storage unit 420e stores possessed-commodity information. The possessed-commodity information is information on at least one commodity which is possessed by each user.

By using the commodity-comparison information stored in the commodity-comparison-information storage unit 420d, the commodity-comparison-map production unit 420i produces a commodity-comparison map which visually indicates at least one relationship between commodities in such a manner that at least one evaluation criterion used in evaluation of the commodities respectively corresponds to at least one coordinate axis in the commodity-comparison map. The relative-evaluation-information production unit 420j produces relative-evaluation information which indicates at least one relative evaluation of commodities, by using the commodity-comparison map produced by the commodity-comparison-map production unit 420i. As explained in detail later, the relative-evaluation information in the third embodiment of the present invention is recommendation information. The relative-evaluation-information transmission unit 420k transmits the relative-evaluation information produced by the relative-evaluation-information production unit 420j, to the one of the terminals (corresponding to the aforementioned second terminal in the eighth to tenth aspects of the present invention) through the network 90.

As illustrated in FIG. 40, the commodity-information provision apparatus 420 is arranged as follows:

(1) The commodity-comparison-information acquisition unit 420c can exchange information with the personal-information storage unit 420a, the sales-history-information storage unit 420b, and the commodity-comparison-information storage unit 420d.

(2) The commodity-comparison-information storage unit 420d can exchange information with the commodity-comparison-map production unit 420i and the relative-evaluation-information production unit 420j.

(3) The possessed-commodity-information storage unit 420e can exchange information with the commodity-comparison-map production unit 420i.

(4) The commodity-comparison-map production unit 420i can exchange information with the relative-evaluation-information production unit 420j.

(5) The relative-evaluation-information production unit 420j can exchange information with the relative-evaluation-information transmission unit 420k.

(6) The commodity-comparison-information acquisition unit 420c and the relative-evaluation-information transmission unit 420k can communicate with the terminals in the commodity-information provision system as the second embodiment of the present invention through the network 90.

4.4.2 Functions of Terminal 460

FIG. 41 is a diagram illustrating the functions of the terminal 460 in the commodity-information provision system as the third embodiment of the present invention. The terminal 460 represents the terminals corresponding to the second terminal in the eighth to tenth aspects of the present invention.

The terminal 460 comprises a relative-evaluation-information acquisition unit 460a and a relative-evaluation-information display unit 460b.

The relative-evaluation-information acquisition unit 460a acquires the aforementioned recommendation information through the network 90, where the recommendation information is transmitted as relative-evaluation information from the commodity-information provision apparatus 420 through the network 90. The relative-evaluation-information display unit 460b displays the recommendation information acquired by the relative-evaluation-information acquisition unit 460a.

As illustrated in FIG. 41, the terminal 460 is arranged so that information can be exchanged between the relative-evaluation-information acquisition unit 460a and the relative-evaluation-information display unit 460b, and the relative-evaluation-information acquisition unit 460a is arranged to be able to communicate with the commodity-information provision apparatus 420 through the network 90.

4.4.3 Operations of System

The operations of the commodity-information provision system as the third embodiment of the present invention are explained below in detail. The main operations of the commodity-information provision system as the third embodiment of the present invention can be divided into first and second sequences of operations. The first sequence of operations corresponds to collection of the commodity-comparison information, and the second sequence of operations corresponds to provision of recommendation information to users by using the collected commodity-comparison information. Since the first sequence of operations for collecting the commodity-comparison information in the third embodiment are substantially the same as those in the first embodiment, only the second sequence of operations for providing the recommendation information to users is explained below.

FIG. 42 is a flow diagram of an example of the second sequence of operations performed in the commodity-information provision system as the third embodiment of the present invention for providing recommendation information to purchasers.

In step S110, the commodity-comparison-map production unit 420$i$ produces a commodity-comparison map in a similar manner to that of the commodity-comparison-map production unit 220$i$ in the second embodiment. For example, the commodity-comparison map produced by the commodity-comparison-map production unit 420$i$ is a map which visually indicates the aforementioned level-up information, and has a similar form to that of the commodity-comparison map produced in the second embodiment. That is, the level-up information is produced by using as a reference commodity a commodity which is possessed by a user, and the information on the commodity is extracted from the possessed-commodity-information storage unit 420$e$.

The commodity-comparison map produced in step S110 is then transferred to the relative-evaluation-information production unit 420$j$, and the operation goes to step S111. In step S111, by using the commodity-comparison map, the relative-evaluation-information production unit 420$j$ produces recommendation information by arranging information on commodities leveled up from the reference commodity and leveled-up features of the commodities for display of the information on the leveled-up commodities and the leveled-up features on the terminal 460.

The recommendation information corresponds to the relative-evaluation information. The recommendation information produced as above is transferred to the relative-evaluation-information transmission unit 420$k$, which transmits the recommendation information to the terminal 460 through the network 90 in step S112. In step S112, the recommendation information transmitted from the relative-evaluation-information production unit 420$j$ is transmitted by the relative-evaluation-information transmission unit 420$k$ to the terminal 460 through the network 90.

In step S113, the recommendation information transmitted from the commodity-information provision apparatus 420 through the network 90 is received by the relative-evaluation-information acquisition unit 460$a$ in the terminal 460, and is then transferred to the relative-evaluation-information display unit 460$b$, which displays the recommendation information in step S114, for example, as illustrated in FIG. 43.

FIG. 43 is a diagram illustrating an example of a recommendation-information display screen 511 displayed by the relative-evaluation-information display unit 460$b$ in the terminal 460. The recommendation-information display screen 511 includes information for recommending to a user at least one commodity which is to be purchased next, in consideration of a commodity which the user possesses. In the example of FIG. 43, the user possesses the book E. In addition, the book H is recommended as a commodity suitable for a user which wishes to acquire more profound knowledge than that can be acquired from the book E, and the book C is recommended as a commodity suitable for a user which wishes to purchase a more easy-to-understand book than the book E.

The recommendation-information display screen 511 includes detail-request buttons 511$a$ to 511$d$. The detail-request buttons 511$a$ and 511$b$ are arranged in the area in which the recommendation of the book H is indicated. When the user requests acquisition of at least one commodity-comparison information item on comparison between the recommended book H and the book E possessed by the user, the detail-request button 511$a$ is clicked. When the user requests acquisition of all commodity-comparison information items on comparison between the recommended book H and other books, the detail-request button 511$b$ is clicked. The detail-request buttons 511$c$ and 511$d$ are arranged in the area in which the recommendation of the book C is indicated. When the user requests acquisition of at least one commodity-comparison information item on comparison between the recommended book C and the book E possessed by the user, the detail-request button 511$c$ is clicked. When the user requests acquisition of all commodity-comparison information items on comparison between the recommended book C and other books, the detail-request button 511$d$ is clicked.

When the recommendation information is displayed as above, the operation goes to step S115, in which it is determined whether or not the user requests detailed-evaluation information. The detailed-evaluation information is commodity-comparison information on a commodity recommended in the recommendation information displayed in step S114. That is, a request for detailed-evaluation information is input by clicking one of the detail-request buttons 511$a$ to 511$d$ in the recommendation-information display screen 511 illustrated in FIG. 43. When the user does not request detailed-evaluation information, for example, the processing in FIG. 42 is completed, and the operation goes to processing for purchasing a commodity. At this time, it is possible to lead the user to the processing for purchasing a commodity, for example, by indicating guidance. On the other hand, when the user requests detailed-evaluation information, the operation goes to step S116, in which the terminal 460 transmits detail-request information which indicates a request for detailed-evaluation information on a specific commodity, to the commodity-information provision apparatus 420 through the network 90.

Then, in step S117, the relative-evaluation-information transmission unit 420$k$ in the commodity-information provision apparatus 420 receives the detail-request information transmitted from the terminal 460 through the network 90, and transfers the detail-request information to the relative-evaluation-information production unit 420$j$.

In step S118, the relative-evaluation-information production unit 420$j$ extracts at least one commodity-comparison information item from the commodity-comparison-information storage unit 420$d$ in accordance with the detail-request information transferred from the relative-evaluation-information transmission unit 420$k$. For example, when the detail-request information is input by clicking the detail-request button 511$a$ in the recommendation-information display screen 511 illustrated in FIG. 43, the relative-evaluation-information production unit 420$j$ extracts from the commodity-comparison-information storage unit 420$d$ at least one commodity-comparison information item on comparison between the books E and H as the detailed-evaluation information.

When the detailed-evaluation information is extracted as above, the operation goes to step S119, in which the relative-evaluation-information transmission unit 420k transmits the detailed-evaluation information to the terminal 460 through the network 90.

In step S120, the detailed-evaluation information transmitted from the commodity-information provision apparatus 420 through the network 90 is received by the relative-evaluation-information acquisition unit 460a in the terminal 460, and is then transferred to the relative-evaluation-information display unit 460b, which displays the received detailed-evaluation information in step S121. The detailed-evaluation information may be displayed in the form of either a commodity-comparison map or a list.

4.4.4 Advantage of Third Embodiment

The third embodiment of the present invention has the following advantage.

In the third embodiment of the present invention, the relative-evaluation-information production unit 420j acquires possessed-commodity information, and produces recommendation information which is arranged for display of information on commodities leveled up from a commodity possessed by a user as well as leveled-up features of the commodities, where the commodity possessed by the user is indicated in the possessed-commodity information. Therefore, it is possible to efficiently provide the user with information on commodities which meet the user's needs. Thus, when a shop utilizes the commodity-information provision system as the third embodiment of the present invention, the shop can efficiently advertise commodities, and users of the commodity-information provision system can efficiently collect information on commodities.

4.4.5 Variations of Third Embodiment

The third embodiment of the present invention has the following variations.

(1) It is possible to forbid use of commodity-comparison information which is provided before a predetermined date and time in production of the commodity-comparison map.

(2) A price for the detailed-evaluation information (corresponding to the individual-commodity-evaluation information) may be charged to each user who receives the detailed-evaluation information.

(3) The commodity-information provision system as the third embodiment of the present invention can be used as a portion of business functions of an on-line shopping site. Further, the commodity-information provision system can be used as a common service provided by an application service provider (ASP) to a plurality of on-line shopping sites.

4.5 Other Matters (1) The functions of the commodity-information provision system as each of the first to third embodiments of the present invention can be realized by a server computer and at least one client computer. In this case, it is possible to provide a server program in which details of processing realizing the functions of each of the commodity-information provision apparatuses 20, 220, and 420 are described, and a client program in which details of processing realizing the functions of each of the terminals 30, 40, 50, 60, 70, 80, 260, and 460 are described. That is, when the above server program is executed on a server computer, the functions of each of the commodity-information provision apparatuses 20, 220, and 420 can be realized on the server computer. In addition, when the above client program is executed on a client computer, the functions of each of the terminals 30, 40, 50, 60, 70, 80, 260, and 460 can be realized on the client computer.

(2) Each of the above server program and client program can be recorded in a computer-readable storage medium. The computer-readable storage medium may be a magnetic storage device, an optical disk, an optical magnetic recording medium, a semiconductor memory, or the like. The magnetic storage device may be a hard disk device (HDD), a flexible disk (FD) drive, a magnetic tape storage device, or the like. The optical disk may be a DVD (Digital Versatile Disk), a DVD-RAM (Random Access Memory), a CD-ROM (Compact Disk Read Only Memory), a CD-R (Readable)/RW (ReWritable), or the like. The optical magnetic recording medium may be an MO (Magneto-Optical Disk) or the like.

In order to put each of the above server program and client program into the market, the program may be stored in a portable storage medium such as a DVD and a CD-ROM. Alternatively, the client programs can be stored in a storage device belonging to a server computer, and transferred to the respective client computers through a network.

The server program recorded in the portable storage medium may be installed in a storage device provided with the server computer. In this case, the server computer reads the server program from the storage device, and executes processing in accordance with the server program. Alternatively, the server computer may directly read the server program from the portable storage medium for executing processing in accordance with the server program.

The client program, which is recorded in the portable storage medium or transmitted from the server computer, may be installed in a storage device provided with the client computer. Then, the client computer reads the client program from the storage device, and executes processing in accordance with the client program. Alternatively, the client computer may directly read the client program from the portable storage medium for executing processing in accordance with the client program. Further, the client computer may sequentially execute processing in accordance with each portion of the client program when the computer receives the portion of the client program from the server computer.

(3) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(4) All of the contents of the Japanese patent application, No. 2001-166263 are incorporated into this specification by reference.

What is claimed is:

1. A method for providing information on commodities to a user by using a computer, comprising:
   acquiring a plurality of pieces of commodity-comparison information indicating results of comparison between individual commodities in a plurality of commodity evaluation criteria, from at least one first terminal through a communication means;
   storing in a storage device said commodity-comparison information acquired by said acquiring;
   producing, from said commodity-comparison information stored in said storage device, a commodity-comparison map displaying one commodity relative to another on the map; visually indicating relative superiority between said commodities in two specified evaluation criteria by plotting each of said commodities on a two-dimensional area with coordinate axes representing the evaluation criteria specified;

producing relative-evaluation information which indicates at least one relative evaluation of said commodities by using said commodity-comparison map; and transmitting said relative-evaluation information to one of at least one second terminal through a communication means.

2. A method according to claim 1, further comprising acquiring possessed-commodity information which a commodity possessed by said user; and wherein said commodity-comparison map is produced in by plotting said user-possessed commodity, together with other commodities superior thereto in either or both of the two evaluation criteria, as well as by expressly showing which coordinate axis direction represents greater superiority.

3. A method according to claim 2, wherein as a result of said producing, the relative-evaluation information is arranged for display of information with at least one of the other commodities and superior feature thereof.

* * * * *

UNITED STATES PATENT AND TRADEMARK OFFICE
CERTIFICATE OF CORRECTION

| | | |
|---|---|---|
| PATENT NO. | : 7,107,238 B2 | Page 1 of 1 |
| APPLICATION NO. | : 09/977200 | |
| DATED | : September 12, 2006 | |
| INVENTOR(S) | : Hiroshi Hatakama et al. | |

It is certified that error appears in the above-identified patent and that said Letters Patent is hereby corrected as shown below:

Column 52, line 67, after "map" insert --;-- and beginning with "displaying" make a new paragraph.
Column 54, line 10, before "superior" insert --a--.

Signed and Sealed this

Thirtieth Day of January, 2007

JON W. DUDAS
*Director of the United States Patent and Trademark Office*